(12) United States Patent
Bryson et al.

(10) Patent No.: US 10,726,621 B2
(45) Date of Patent: *Jul. 28, 2020

(54) TRAVERSAL SELECTION OF COMPONENTS FOR A GEOMETRIC MODEL

(71) Applicant: DreamWorks Animation LLC, Glendale, CA (US)

(72) Inventors: Stuart Bryson, Sydney (AU); Esteban Papp, Glendale, CA (US); Peter Farson, Glendale, CA (US); Alex Powell, Los Angeles, CA (US)

(73) Assignee: DreamWorks Animation LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/144,547

(22) Filed: Sep. 27, 2018

(65) Prior Publication Data

US 2019/0026941 A1 Jan. 24, 2019

Related U.S. Application Data

(63) Continuation of application No. 15/639,959, filed on Jun. 30, 2017, now Pat. No. 10,115,231.

(51) Int. Cl.
*G06T 19/20* (2011.01)
*G06T 19/00* (2011.01)
(Continued)

(52) U.S. Cl.
CPC .......... *G06T 17/20* (2013.01); *G06K 9/4638* (2013.01); *G06T 13/40* (2013.01); *G06T 15/50* (2013.01);
(Continued)

(58) Field of Classification Search
CPC .... G06F 3/04815; G06T 17/20; G06T 17/205
See application file for complete search history.

(56) References Cited

U.S. PATENT DOCUMENTS 6,396,522 B1 * 5/2002 Vu ................. G06F 3/04845
345/419
2005/0253845 A1 * 11/2005 Russ ................. G06T 17/005
345/473
(Continued)

FOREIGN PATENT DOCUMENTS

EP 1580674 9/2005
EP 3040946 7/2016

OTHER PUBLICATIONS

European Patent Office Application Serial No. 19196087.1, Search Report dated Nov. 22, 2019, 8 pages.
(Continued)

*Primary Examiner* — Ryan McCulley
(74) *Attorney, Agent, or Firm* — Lee, Hong, Degerman, Kang & Waimey PC

(57) ABSTRACT

Systems and methods for traversal selection of components of a geometric model are disclosed. An embodiment includes displaying a plurality of components corresponding to a geometric model, selecting a first component, receiving a first input indicating a first direction for selecting a next component, wherein the next component is connected to the first component by an edge, identifying one or more candidate edges connected to the first component for selecting the next component, determining an angle between an indicated direction vector corresponding to the indicated first direction and each of the one or more candidate edges, and selecting a second component as the next component, wherein the second component is connected to the first component via a particular candidate edge forming a smallest angle with the indicated direction vector.

35 Claims, 33 Drawing Sheets

(51) Int. Cl.
*G06T 17/20* (2006.01)
*G06K 9/46* (2006.01)
*G06T 13/40* (2011.01)
*G06T 15/50* (2011.01)

(52) U.S. Cl.
CPC ............ *G06T 19/003* (2013.01); *G06T 19/20* (2013.01); *G06T 2200/24* (2013.01); *G06T 2219/2004* (2013.01); *G06T 2219/2021* (2013.01)

(56) References Cited

U.S. PATENT DOCUMENTS

| | | | |
|---|---|---|---|
| 2005/0253846 A1* | 11/2005 | Russ | ........................ G06T 13/40 345/473 |
| 2006/0044308 A1 | 3/2006 | Akutsu | |
| 2006/0158459 A1* | 7/2006 | Ferguson | ................. G06F 9/451 345/619 |
| 2012/0293516 A1* | 11/2012 | Look | ..................... G06F 3/0236 345/443 |
| 2013/0212537 A1 | 8/2013 | Hall | |
| 2013/0328879 A1* | 12/2013 | Carbonneau | ........... G01C 21/32 345/440 |
| 2015/0248211 A1 | 9/2015 | Johnson et al. | |
| 2017/0115831 A1* | 4/2017 | Bosze | ................. A63F 13/2145 |

OTHER PUBLICATIONS

Bier, "Snap-Dragging: Interactive Geometric Desing in Two and Three Dimensions", XP-001091538, May 1988, 168 pages.

Cao et al., "What the Back of the Object Looks Like: 3D Reconstructions from Line Drawings without Hidden Lines", IEE Transaction on Patter Analysis and Machine Intelligence, vol. 30, No. 3, Mar. 2008, pp. 507-517, XP011195588.

* cited by examiner

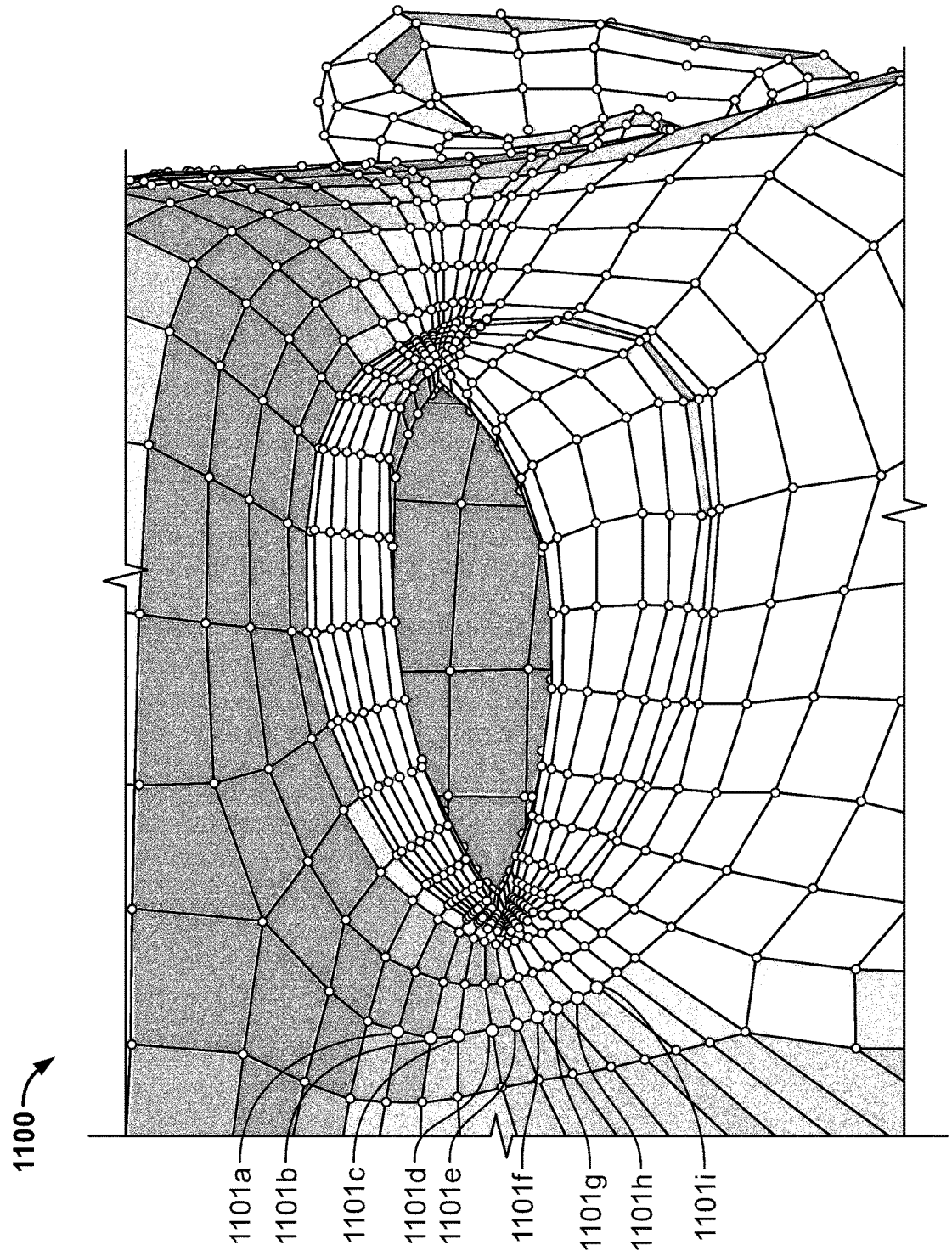

TRAVERSAL SELECTION OF COMPONENTS FOR A GEOMETRIC MODEL

CROSS-REFERENCE TO RELATED APPLICATION

This application is a continuation of U.S. patent application Ser. No. 15/639,959, filed on Jun. 30, 2017, now U.S. Pat. No. 10,115,231, the contents of which are incorporated by reference herein in their entirety.

BACKGROUND

Computer animation and other computer modeling combine two-dimensional (2D) or three-dimensional (3D) models of objects or characters and their corresponding programmed or keyframed movement. These models are constructed out of geometrical vertices, faces, and edges in a 3D coordinate system. One form of computer animation involves generating a 3D model made up of skeletal frame to dictate an object or character's movement. The skeletal frame is surrounded by a 3D model mesh representing the object or character's boundaries.

A 3D model mesh may include polygons, or faces, making up the surface of the mesh. The 3D model may also include edges which correspond to a delineation where two polygonal faces meet, and vertices representing the point of intersection between three or more edges. The faces, edges, and vertices, sometimes referred to as components, can be manipulated by animators to change the appearance of the character or object.

In some cases, the faces and edges may be extremely small for a particular animation model where a great amount of surface detail and movement is required, resulting in vertices which are spaced closely together or positioned within constrained areas within the mesh. For example, a 3D mesh representing a character's face may include thousands of vertices in order to create hundreds of unique facial details, and many of the facial vertices may be positioned in constrained areas of the mesh, such as inside the character's mouth.

In order to define a character's or object's appearance and control its movements, the 3D mesh is bound to an underlying system of skeletal frame elements and joints in a process referred to as rigging. This allows for an animator to control all components of an object or character including elements of the skeletal frame and mesh which are defined to move together via predefined relative associations via the rigging process.

In order to accomplish this, the rigging process as well as in other processes of the animation—may require the ability to select specific components within a 3D mesh with fine granularity in order to accurately define an object or a character's movements. However, existing solutions for accurately and consistently selecting components within a 3D mesh for rigging, and other computer processes (e.g., animation processes), selection of a particular component as defined only with respect to a single displayed perspective of the 3D mesh. In other words, in the existing solutions, if a particular component of a 3D mesh is not clearly displayed and visible to a user on an interface, the user is not provided with a way to accurately and consistently select the particular component.

Thus, the existing systems and methods are unable to provide a solution for accurately and consistently selecting components of a 3D model independent of a displayed perspective of the 3D model. Therefore, it may be advantageous for a system and method to allow for traversal and selection of components of a 3D model using surface topology.

SUMMARY

Embodiments of the present disclosure include systems and methods for traversal selection of components of a geometric model. In some embodiments, the traversal selection of components may be based on the topology of a 3D model instead of a displayed perspective of the 3D model for accurate and consistent traversal and selection of components. In some embodiments, vertices, edges, and/or faces of a 3D model may be selected in response to a directional input indicating a direction for traversal and selection of a next component.

The disclosure includes systems and methods for determining a direction corresponding to the directional input, determining stored information related to previous traversal and selections, identifying candidate components for selection of a next component for selection, and determining and selecting a next component based on the identified candidate components and the directional input.

In some embodiments, a direction indicated by the directional input may be compared to stored information related to previous component selections to determine a traversal direction for the next component selection. The stored information may provide directional bearing information related to a current traversal direction defined within a 3D space of the 3D model.

In some embodiments, the selection of a next component may append the next component to a grouping of selected components. In other embodiments, the next component may be selected and a previous component may be deselected for traversing across the 3D model.

An embodiment of a method of the present disclosure for selecting components of a geometric model based on model topology may include displaying a plurality of components corresponding to a geometric model; selecting a first component of the displayed plurality of components; receiving a first input indicating a first direction for selecting a next component of the plurality of components, wherein the next component is connected to the first component by an edge; identifying one or more candidate edges connected to the first component for selecting the next component; determining an angle between an indicated direction vector corresponding to the indicated first direction and each of the one or more candidate edges; and selecting a second component as the next component, wherein the second component is connected to the first component via a particular candidate edge forming a smallest angle with the indicated direction vector among all of the one or more candidate edges.

A system for selecting components of a geometric model based on model topology according to an embodiment of the present disclosure may include a memory and one or more processors configured to control a display to display a plurality of components corresponding to a geometric model; select a first component of the displayed plurality of components; receive a first input indicating a first direction for selecting a next component of the plurality of components, wherein the next component is connected to the first component by an edge; identify one or more candidate edges connected to the first component for selecting the next component; determine an angle between an indicated direction vector corresponding to the indicated first direction and each of the one or more candidate edges; and select a second component as the next component, wherein the second component is connected to the first component via a particular candidate edge forming a smallest angle with the indicated direction vector among all of the one or more candidate edges.

An apparatus for selecting components of a geometric model based on model topology according to an embodiment of the present disclosure may include means for displaying a plurality of components corresponding to a geometric model; selecting a first component of the displayed plurality of components; receiving a first input indicating a first direction for selecting a next component of the plurality of components, wherein the next component is connected to the first component by an edge; identifying one or more candidate edges connected to the first component for selecting the next component; determining an angle between an indicated direction vector corresponding to the indicated first direction and each of the one or more candidate edges; and selecting a second component as the next component, wherein the second component is connected to the first component via a particular candidate edge forming a smallest angle with the indicated direction vector among all of the one or more candidate edges.

A machine-readable non-transitory medium of the present disclosure may have stored thereon machine-executable instructions for displaying a plurality of components corresponding to a geometric model; selecting a first component of the displayed plurality of components; receiving a first input indicating a first direction for selecting a next component of the plurality of components, wherein the next component is connected to the first component by an edge; identifying one or more candidate edges connected to the first component for selecting the next component; determining an angle between an indicated direction vector corresponding to the indicated first direction and each of the one or more candidate edges; and selecting a second component as the next component, wherein the second component is connected to the first component via a particular candidate edge forming a smallest angle with the indicated direction vector among all of the one or more candidate edges.

An embodiment of a method for selecting components of a geometric model may include displaying a plurality of face components corresponding to a geometric model; selecting a first face component of the displayed plurality of face components; receiving a first input indicating a first direction for selecting an adjacent next face component of the plurality of face components; identifying one or more candidate face components adjacent to the first face component for selecting the next face component; determining an angle between an indicated direction vector corresponding to the indicated first direction and each of one or more face vectors originating from a center of the first face component to a center of each of the one or more candidate face components; and selecting a second face component as the next face component, wherein a face vector corresponding to the second face component forms a smallest angle with the indicated direction vector among all of the one or more face vectors.

A system for selecting components of a geometric model based on model topology according to an embodiment of the present disclosure may include a memory and one or more processors configured to control a display to display a plurality of face components corresponding to a geometric model; select a first face component of the displayed plurality of face components; receive a first input indicating a first direction for selecting an adjacent next face component of the plurality of face components; identify one or more candidate face components adjacent to the first face component for selecting the next face component; determine an angle between an indicated direction vector corresponding to the indicated first direction and each of one or more face vectors originating from a center of the first face component to a center of each of the one or more candidate face components; and select a second face component as the next face component, wherein a face vector corresponding to the second face component forms a smallest angle with the indicated direction vector among all of the one or more face vectors.

An apparatus for selecting components of a geometric model based on model topology according to an embodiment of the present disclosure may include means for displaying a plurality of face components corresponding to a geometric model; selecting a first face component of the displayed plurality of face components; receiving a first input indicating a first direction for selecting an adjacent next face component of the plurality of face components; identifying one or more candidate face components adjacent to the first face component for selecting the next face component; determining an angle between an indicated direction vector corresponding to the indicated first direction and each of one or more face vectors originating from a center of the first face component to a center of each of the one or more candidate face components; and selecting a second face component as the next face component, wherein a face vector corresponding to the second face component forms a smallest angle with the indicated direction vector among all of the one or more face vectors.

A machine-readable non-transitory medium of the present disclosure may have stored thereon machine-executable instructions for displaying a plurality of face components corresponding to a geometric model; selecting a first face component of the displayed plurality of face components; receiving a first input indicating a first direction for selecting an adjacent next face component of the plurality of face components; identifying one or more candidate face components adjacent to the first face component for selecting the next face component; determining an angle between an indicated direction vector corresponding to the indicated first direction and each of one or more face vectors originating from a center of the first face component to a center of each of the one or more candidate face components; and selecting a second face component as the next face component, wherein a face vector corresponding to the second face component forms a smallest angle with the indicated direction vector among all of the one or more face vectors.

BRIEF DESCRIPTION OF THE DRAWINGS

The above and other aspects and features of the present disclosure will become more apparent upon consideration of the following description of embodiments, taken in conjunction with the accompanying drawing figures.

FIGS. 11A and 11B are illustrations of a method for expansion traversal selection of vertices of a geometric model according to an embodiment of the present disclosure.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for selection of components for a geometric model, including 2D and 3D models using surface topology. While this disclosure is presented in the context of 3D animation applications, it is not limited thereto, and other implementations of the systems, medium, and methods described herein are contemplated, including selection and modification of geometric models within a 2D or 3D coordinate system, as well as for various interactive geometric modeling applications involving production and modification of geometric models, including, but not limited to, rigging, animation, architecture, automotive design, consumer product design, virtual reality applications, augmented reality applications, game development, visual effects, 3D printing, and the like. Any reference in this disclosure to a geometric model or components thereof, within a 3D model or 3D space will be understood to include the disclosure as applicable to 2D models and 2D spaces.

In this disclosure, the term "object" or "model" may include any suitable computer representation or geometric model of part or all of an entity, such as a character, a landscape, an inanimate object, or any other virtual, modeled, and/or animated entity. Objects may be constructed, for example, out of geometrical vertices, edges, and faces in a 2D or 3D coordinate system.

A "component" may include one of a set of elements used to determine the shape, movement, appearance, and/or absolute or relative positioning of a 3D model, including but not limited to vertices, edges, and faces of a 2D or 3D model. Any description of the present disclosure with respect to one of a vertex, an edge, or a face will be understood to apply equally and/or analogously to the others of a vertex, an edge, or a face where applicable, as will be understood by one of ordinary skill in the art, and use of one term over another within this disclosure will not be deemed to be limiting to only the term being used.

Figure 1:
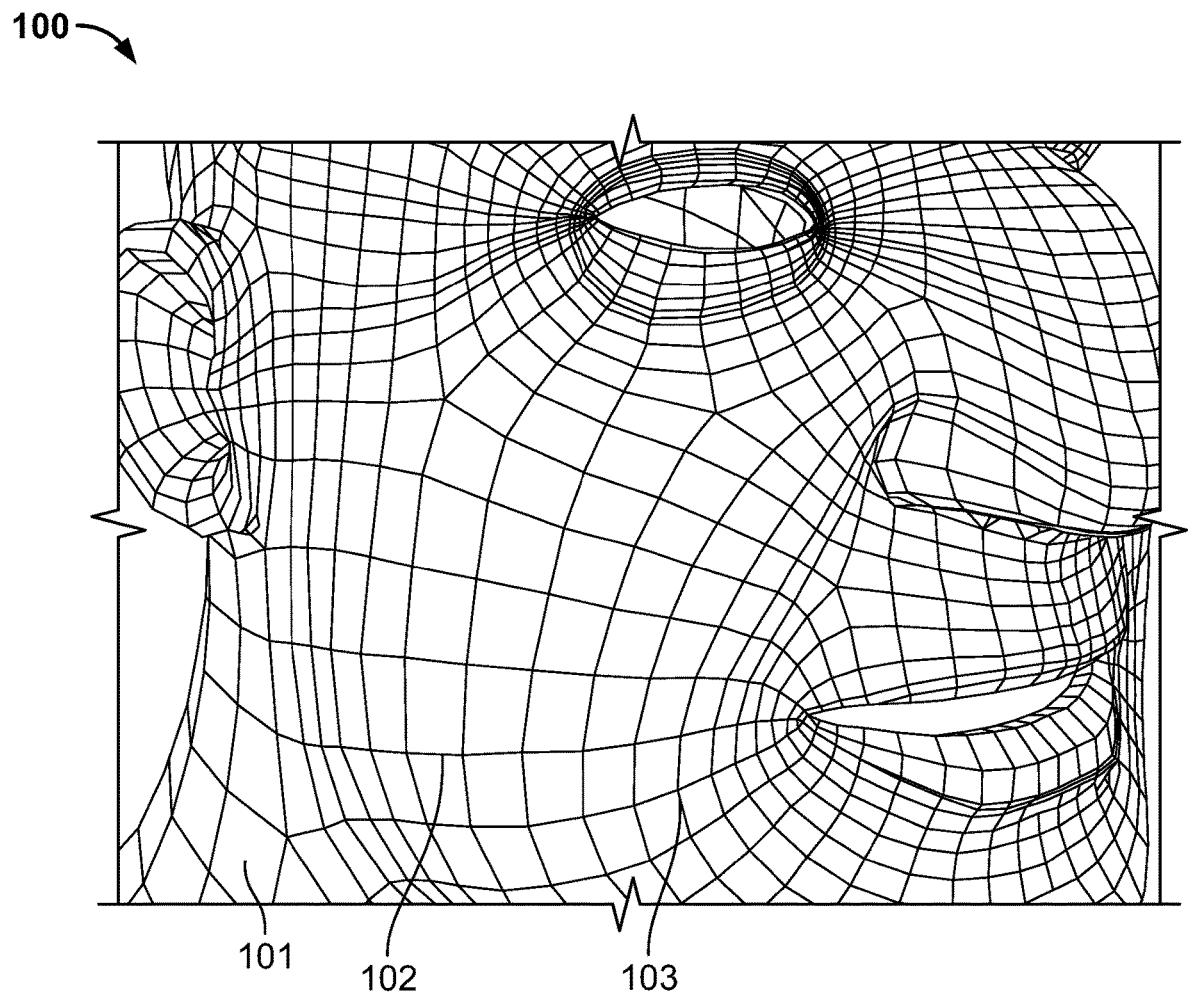
FIG. 1 is an illustration of a geometric model displayed in accordance with the existing art.

Referring to FIG. 1, an example of a 3D model 100 is shown depicting a portion of a character's face as known in the existing art. The 3D model may be comprised of a large number of polygons, or faces 101 making up and defining a surface of the character's face. An edge 102 of the 3D model may be defined where two faces meet, and a vertex 103 may be defined where three or more edges intersect. Each of the faces, edges, and vertices may represent individual components which may be selected, moved, positioned, and linked to define the shape, appearance, and/or movement of the character's face to produce animations including facial movements, gestures, speech movement, and the like.

As shown in FIG. 1, detailed portions of the character's face, such as around the eyes, ears, nose, and mouth may require a large number of faces, edges, and vertices within a small amount of space, resulting in very tightly positioned components of the 3D model. In some existing animation solutions, a user of an animation system may be required to select one or more components of the 3D model using only the displayed perspective of the model in an interface, such as the perspective shown in FIG. 1. In other words, FIG. 1 may represent the interface view presented to a user which must be used to select one or more components of the 3D model. This may make it extremely difficult to accurately and consistently select particular desired components to achieve a specific shape, movement, or appearance of the character's face where the desired components are positioned tightly together or positioned in locations which are difficult to access using an interface that relies on the displayed perspective.

In some cases, the components may not even be visible to the user in order for them to be selected. For example, in FIG. 1, numerous components may be positioned inside the character's mouth corresponding to the character's teeth, tongue, lips, and the like. In the existing art, a user may be required to perform numerous operations in order to be able to view, access, and select these various components, such as zooming-in, changing the viewing angle, changing transparency on some other aspects of the character's face, and the like. Further in some cases, where the existing art allows for directional input to traverse the 3D model in a particular direction, the components may still not be accurately and consistently selected as the existing art relies solely on the displayed perspective of the 3D model. Therefore, accurate and consistent selection of components using directional key inputs around extremely detailed portions of the 3D model which may include intricate curves and undulations is not possible.

Figure 2A:
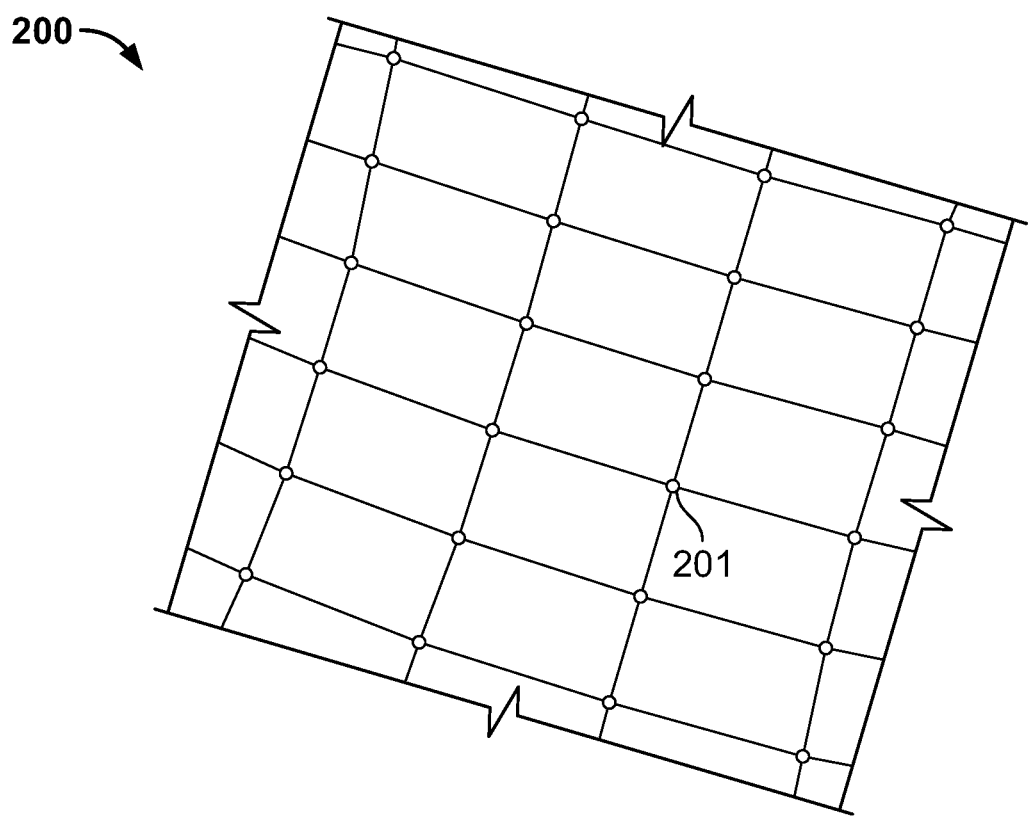
FIGS. 2A, 2B, 2C, and 2D are illustrations of a method for selecting vertices of a geometric model where no previous traversal information is stored in a memory according to an embodiment of the present disclosure.

Referring now to FIGS. 2A-2D, an example of a portion of a 3D model 200 is depicted to describe an embodiment of a method for selecting components of the 3D model. The portion of the 3D model shown in FIG. 2A depicts a plurality of polygons, or faces, of the 3D model where each of the faces includes four sides, where each side corresponds to an edge, and the intersection of four edges corresponds to a vertex. In the example shown in FIG. 2A, the selection of vertices will be discussed.

The method may be executed at a terminal configured to perform the disclosed operations and display an interface on an associated display. For example, the method may be executed by a computer terminal and an interface may be displayed on a display of the computer terminal. The computer terminal may include a memory, including volatile and non-volatile memory, such as a hard drive, for storing information. The computer terminal may be wire-connected or wirelessly connected to a network, such as the Internet, and may perform communication with other terminals or components via the network, such as with server computers, network storage units, third party services and databases, and the like. In other embodiments, the terminal may correspond to other hardware, such as a laptop computer, mobile phone, tablet computer, or the like. Other examples of hardware configured to execute methods of the present disclosure are discussed in further detail below, however, one of ordinary skill in the art will appreciate that the discussion included herein is not to be limiting, and other hardware, terminals, and/or devices may be used in implementing the embodiments of the present disclosure.

The method may include selecting an initial vertex 201 of the 3D model. The selection may be intended to initiate selection of a group of vertices, or the selection may be to select a starting point for traversing the vertices of the 3D model to select a particular vertex or particular group of vertices. The initial vertex 201 may be selected in response to an input generated via an input device or input unit. In some embodiments, the initial vertex 201 may be selected using an input interface and/or device such as a mouse, a stylus, touchpad, touchscreen, keyboard, virtual reality interface, and the like.

After selection of the initial vertex 201, a next vertex may be selected by traversing the components of the 3D model. For example, a next vertex may be selected after selection of the initial vertex 201 by traversing an edge connecting the initial vertex to the next vertex. The next selection may be performed by an input indicating a next traversal direction received via the input interface and/or device, as discussed above. For example, the input may correspond to a movement of the mouse, a directional input via the stylus, or for example a directional key input via the keyboard. For the purposes of this disclosure, the directional inputs will be discussed with respect to key inputs via a keyboard, such as up, down, left, and right arrow keys. However, it will be appreciated by one of ordinary skill in the art that other input interfaces and/or devices may be utilized in the disclosure, including but not limited to a mouse, a stylus, touchpad, touchscreen, keyboard, virtual reality interface, and the like.

In the example of FIG. 2A, the directional input may correspond to an "up" arrow key input via the keyboard (hereinafter "up key input"). In some embodiments, as will be discussed further herein, the indicated direction of the up key input may be set to correspond to a particular vector within the 3D model space and the vector may be stored for continued traversal of the 3D model. Where at least one previous traversal of components of the 3D model has been performed, a vector indicating a directional bearing of the 3D model traversal (hereinafter a "bearing vector") may be stored which sets a particular direction within the 3D model space to correspond to a particular direction indicated by a direction key input. Thus, as will be discussed further herein, when a first traversal occurs, at least one bearing vector is stored to indicate a particular "forward" direction (corresponding to the first indicated direction) with respect to the 3D space. In other words, the forward direction (corresponding to the "up" direction input in FIG. 2A) will be defined from the perspective of the 3D model topology instead of the display perspective, thereby disconnecting selection of components from the display perspective and removing reliance on the displayed portion of the 3D model.

Returning to the example of FIG. 2A, as the up key input represents a first selection for a next vertex after selection of the initial vertex, no traversal direction or bearing vectors (discussed in examples further below) may be stored to provide any reference for continuing a traversal direction within the 3D model space. Accordingly, the selection of the next vertex may utilize the indicated direction with respect to the displayed perspective (otherwise referred to as "display direction").

Figure 2B:
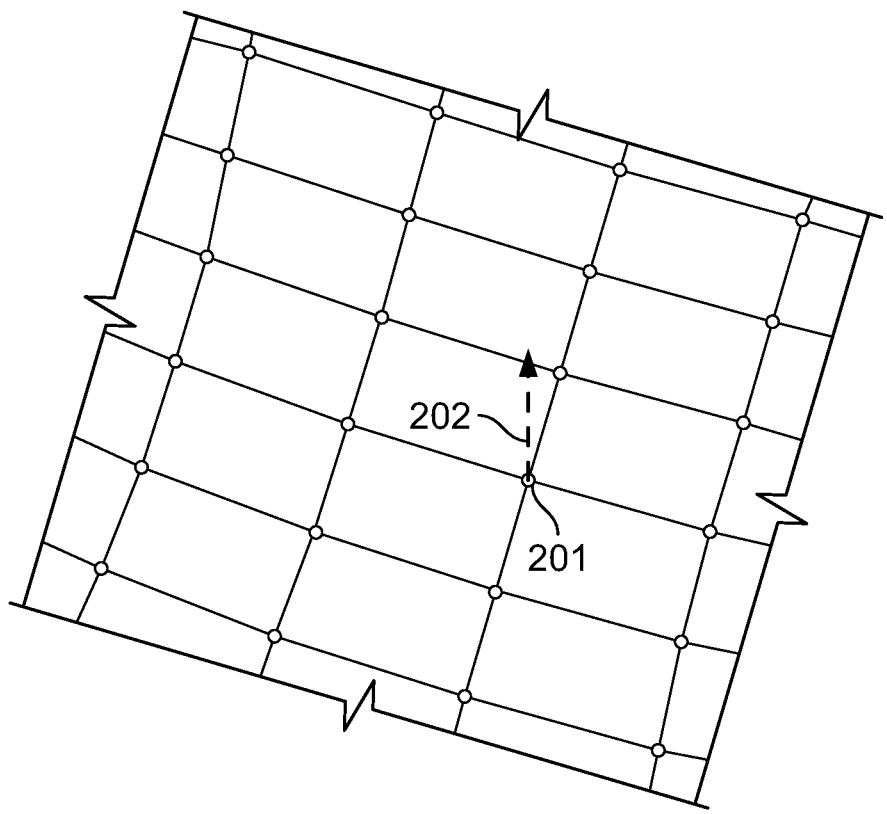

For example, referring to FIG. 2B, an "up" display direction 202 (upward vertical direction on the displayed portion of the 3D model) may be determined to correspond to the up direction indicated by the up key input. In other words, the display direction shown at 202 (up) corresponds to the same direction (up) with respect to the perspective of the 3D model that is currently being displayed at the time the up key input is received. In some embodiments, a left display direction or a right display direction may also be determined based on the up display direction 202 by adjusting the up display direction by 90 degrees in either direction.

Figure 2C:
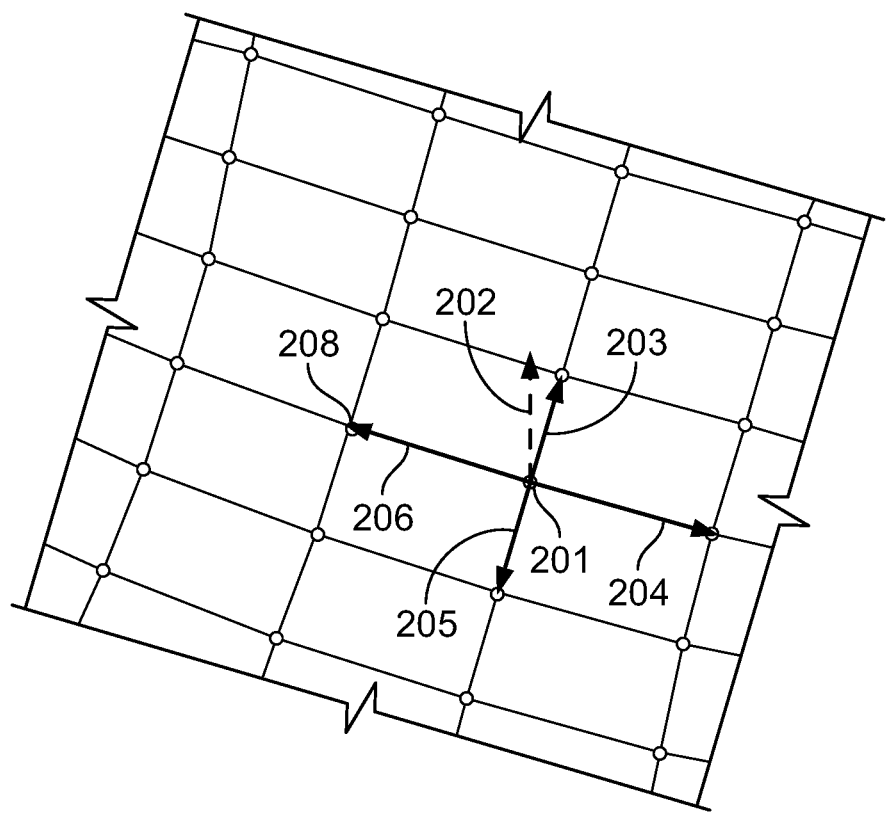

To determine which vertex should be selected as the next vertex, the method may further include determining all of the potential edges which may be traversed from the initial vertex to select a next vertex. In other words, candidate edges which are connected to the initial vertex may be identified for evaluation to determine which candidate edge should be traversed to select the next vertex given the up key input. Referring to FIG. 2C, candidate edges 203, 204, 205, 206 may be identified by identifying all edges that are connected to the initial vertex 201.

Using the identified candidate edges 203, 204, 205, 206, each edge is evaluated against the up display direction 202 to determine which edge is the best match for the desired direction indicated by the up key input. In some embodiments, an angle between the up display direction 202 and each candidate edge may be measured to determine which candidate edge forms the smallest angle with the up display direction 202. In other words, it is determined which candidate edge traversal is the closest to the up display direction 202.

Figure 2D:
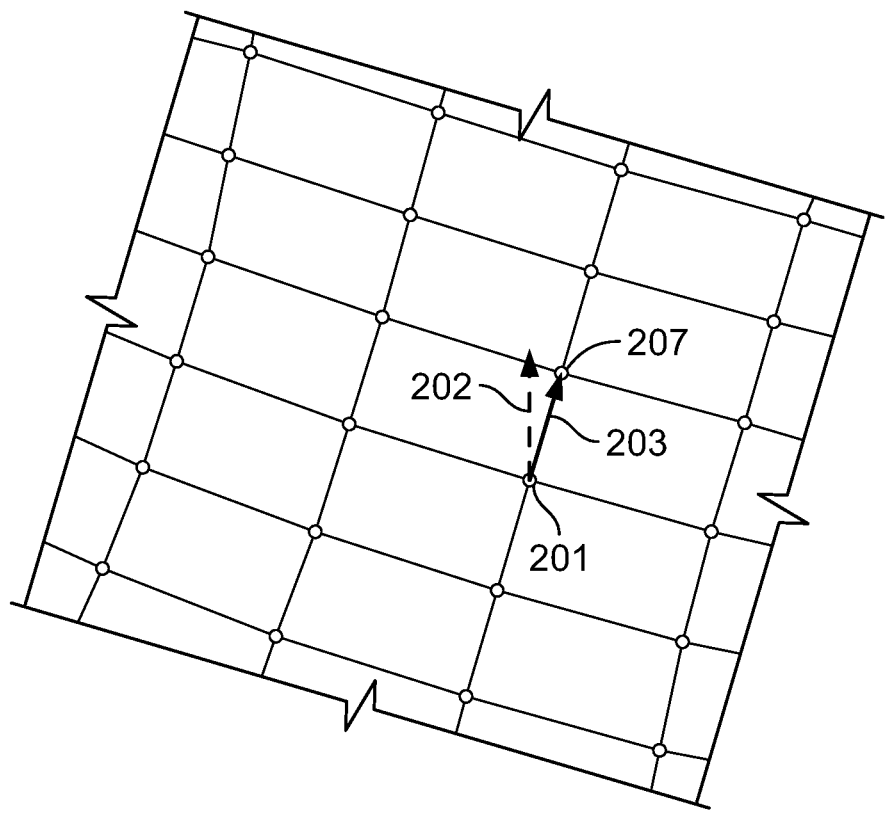

Referring to FIG. 2D, the candidate edge 203 which forms the smallest angle with the up display direction 202 may be selected, and accordingly the vertex 207 connected to the candidate edge 203 may be selected as the next vertex (hereinafter "second vertex").

In some embodiments, the second vertex 207 may be selected and the initial vertex 201 may be deselected. In other embodiments, the second vertex 207 may be added to the selection of the initial vertex 201, resulting in an increased selection of vertices. In some embodiments, the selection may be increased in response to an input for appending to the selection (hereinafter "selection appending input") which is received before, after, or during the directional input. For example, a selection appending input may correspond to another keyboard input which is received before, after, or during the key up input to select the second vertex. The selection appending input may include holding a "shift" key, "ctrl" key, or the like on the keyboard while the key up input is received, or in other cases, a key such as "caps lock" may be input before the key up input is received. In other cases, a key may be input after the key up input is received, such as the "S" key or "A" key after the key up input is received. It will be appreciated by those of ordinary skill in the art that these examples are not limiting, and other embodiments of inputs for increasing the selection may be implemented and are considered by this disclosure.

The selection method may include storing information of the second vertex 207 to keep track of selected or traversed vertices. The stored information may include identifying information of the second vertex 207, such as a unique numerical identifier. The identifying information of the second vertex may be stored as a reference to the particular attribute identifier associated with an object representation of the 3D model. In such embodiments, the 3D model may be generated, stored, and represented as an object in an object oriented representation, where each component may be generated, stored, and represented as an attribute or field of the 3D model object. For example, the 3D model may be represented as an object which includes a plurality of attribute values corresponding to the plurality of faces, edges, and/or vertices which make up the object appearance. Accordingly, the identifying information of the second vertex may be stored as a reference to the particular attribute identifier associated with the 3D model object.

In some embodiments, the information may be stored in a memory associated with a terminal that is executing the selection method of the present disclosure. The memory may correspond to a volatile or non-volatile memory, such as a hard drive, locally connected to a terminal executing the method, or in other embodiments, the memory may correspond to a memory in communication with the terminal executing the method, for example a memory associated with a server, or a memory coupled to a network. In yet other embodiments, the terminal may be in wireless communication with the memory, for example, where the terminal corresponds to a mobile phone, tablet computer, or the like, and the memory corresponds to a cloud server or central server memory. These examples are not to be limiting, and other implementations are contemplated by this disclosure, as will be understood by those of ordinary skill in the art.

The stored information of the second vertex 207 may additionally include the edge 203 ("previously traversed edge") which was traversed for the selection of the second vertex 207 from the initial vertex 201. In some embodiments, the stored information of the second vertex 207 may also include the up display direction 202 indicated by the directional key input, otherwise referred to as the "previous indicated direction." In addition to the direction indicated by the up key input, another global direction value that is not associated with any stored vertex may be stored to represent a current traversal direction. As will be discussed further below, these stored data points may be utilized to determine a traversal context and history for selecting the desired vertices of the 3D model.

In some embodiments, the method may further include setting one or more bearing vectors representing current directional settings of the 3D model traversal based on the perspective of the previous vertex (the initial vertex 201). The stored bearing vectors may provide directional information within the 3D model space which provides 3D directional information with respect to the direction selected by the previous directional input (the key up input). Thus, 3D model space directional information may be provided by the stored bearing vectors.

For example, referring to back to FIG. 2D, the vector corresponding to edge traversal 203 (referred to as the "up bearing vector") may be stored to represent the direction corresponding to the up key input with respect to the traversal perspective which resulted in the traversal to the second vertex 207. The stored information of the second vertex 202 may include the up bearing vector 203 to define 3D directions for subsequent directional inputs within the 3D model space, specifically using the directional perspective based on the initial vertex and the traversal to the second vertex 207. Thus, the traversal of the 3D model topology may be independent from the displayed perspective of the 3D model following the first traversal to select the second vertex 207 since the up bearing vector 203 may be stored in the memory to thereafter correspond to an up key input. Therefore, after the selection of the second vertex 207, another up key input may be determined to correspond to the up bearing vector 203 instead of the up display direction 202, since the direction of "up" based on the perspective of the traversal path now corresponds to up bearing vector 203.

In some embodiments, the stored information of the second vertex 207 may include a second bearing vector corresponding to another direction defined within the 3D model space. For example, since the vector 203 of FIG. 2C corresponding to the edge between the initial vertex 201 and second vertex 207 is defined as the "up" or "forward" direction, another bearing vector may be defined and stored for a "left" direction. Referring to FIG. 2C, another bearing vector 206 (of FIG. 2C) may be defined as a "left" bearing vector within the 3D model space. The left bearing vector 206 may correspond to the edge traversal between initial vertex 201 and connected vertex 208, where connected vertex 208 is connected to the initial vertex 201 towards a left side of the initial vertex 201, given an "up" or forward direction of up bearing vector 203.

Since the remaining directional bearing vectors may be calculated based on the up bearing vector in combination with the left bearing vector (e.g., a down bearing vector is the opposite of the up bearing vector, and the right bearing vector is the opposite of the left bearing vector), only one of the left or right bearing vectors may be determined and stored. However, in some embodiments, directional bearing vectors for all up, left, right, and down directions, or for three of the directions, may be defined and stored.

Thus, in an embodiment, the stored information of the second vertex 207 may include the directional bearing vectors 203, 206 for representing the "up" direction and the "left" direction within the 3D model space to provide directional definition of the vertex traversal. As discussed in further detail below, the directional bearing vectors 203, 206 allows for the selection traversal to be independent from the display perspective of the 3D model. Accordingly, a user may be able to accurately and consistently traverse components of a 3D model independently of the display perspective, such that a directional key input, such as an up or a left key input, may result in a traversal of components with respect to a current traversal path and a topology of the 3D model surface, as defined by the various faces, edges, and vertices of the 3D model.

Figure 3:
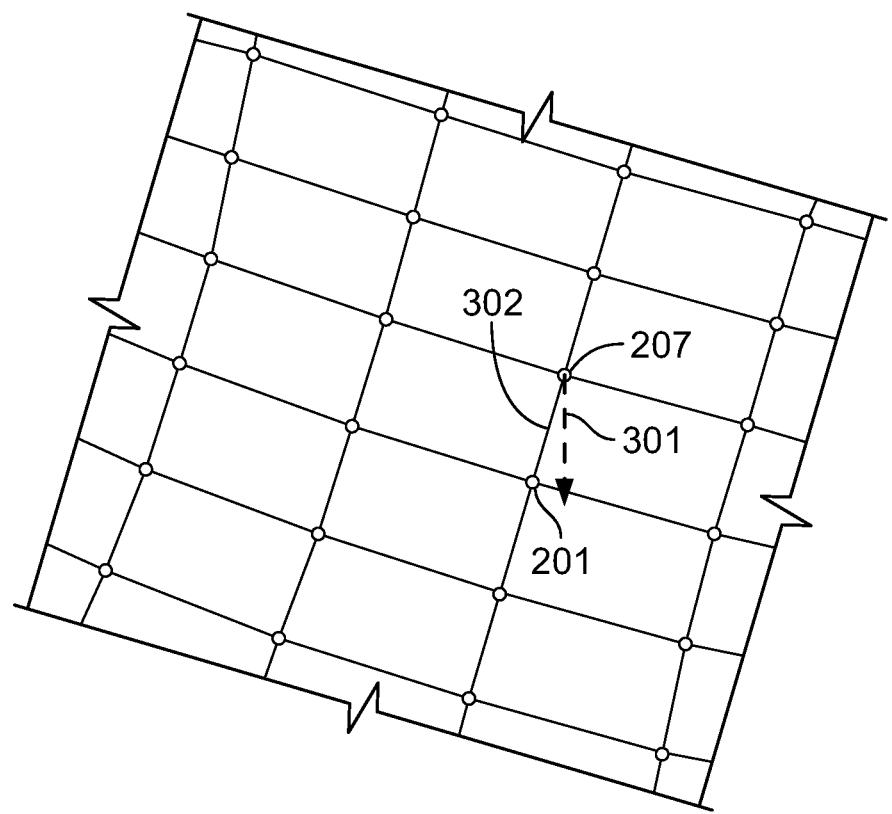
FIG. 3 is an illustration of a method for selecting vertices of a geometric model according to another embodiment of the present disclosure.

Referring now to FIG. 3, another embodiment of a method of selecting a next vertex is discussed. In a continuation of the example of FIGS. 2A-2D above, where the second vertex 207 is selected, a new direction key may be received (e.g., down arrow key input, or simply down key input). An embodiment of the method may include a check of the memory to determine whether information of the currently selected vertex (the second vertex 207) is stored, using the unique identifier of the second vertex. If the memory returns information of the second vertex 207, the previous indicated direction stored in association with the second vertex 207 may be checked to see if it is the same, opposite, or different than the direction indicated by the new direction key input (down), referred to herein as the "new indicated direction" 301.

Continuing from the example of FIGS. 2A-2D, the information of the second vertex 207 included the previous indicated direction, which was up in correspondence with the first up key input. Accordingly, the check in the memory may determine that information of the second vertex 207 is stored, and further that the previous indicated direction of the second vertex 207 was "up." Based on the new indicated direction 301 of "down," it may be determined that the new direction key input is simply intended to go in the opposite direction as the previous indicated direction associated with the stored second vertex 207.

Since it is determined that going backwards from the second vertex 207 is desired, the method may further check the stored previously traversed edge associated with the second vertex 207, which is stored as the edge (302 of FIG. 3) between the initial vertex 201 and the second vertex 207. Based on the stored edge 302, it may be determined that the initial vertex 201 should be selected as the next vertex since the new direction key input is going backwards from the selection of the second vertex.

In some embodiments, since the initial vertex is now selected again, information of the initial vertex selection may be stored for future use and reference, including the unique identifier of the initial vertex, the new indicated direction associated with the selection of the initial vertex, the edge between the second vertex and the initial vertex, bearing vectors defining directions relative to the 3D model space, and the like. In some embodiments, since a vertex may be selected twice, the memory may obliterate any existing memory entry for the newly selected vertex and replace the existing stored entry with the new selection entry. In other embodiments, each memory entry for each selection may be assigned a unique identifier such that information of all selections, including selection of the same vertex more than once, is stored in the memory. In such cases, the memory may utilize a combination of the selection information to generate a unique identifier for classification and storage of each unique vertex selection. For example, a hash function may be used to generate a unique or nearly-unique identifier for each selection, which utilizes various keys associated with each selection, including selected vertex, the from-vertex, the traversed edge, the indicated direction input, timestamp, and the like.

Another embodiment of a method of selecting a next vertex is discussed with reference to FIGS. 4A-4D. In a continuation of the example of FIGS. 2A-2D above, where the second vertex 207 is selected, a newly received indicated direction key may be received (e.g., another arrow up key input), not depicted in FIG. 4A. As discussed, the memory may be checked to determine whether information of the currently selected vertex (the second vertex 207) is stored, using the unique identifier of the second vertex. If the memory returns information of the second vertex 207, the indicated direction stored in association with the second vertex 207 (up) may be checked to see if it is the same, opposite, or different than the newly received indicated direction (up). In this example, since the stored direction associated with the second vertex is the same as the newly received indicated direction, it may be presumed that the newly received indicated direction key is intended to move forward in the same direction to select another next vertex from the second vertex 207.

Figure 4A:
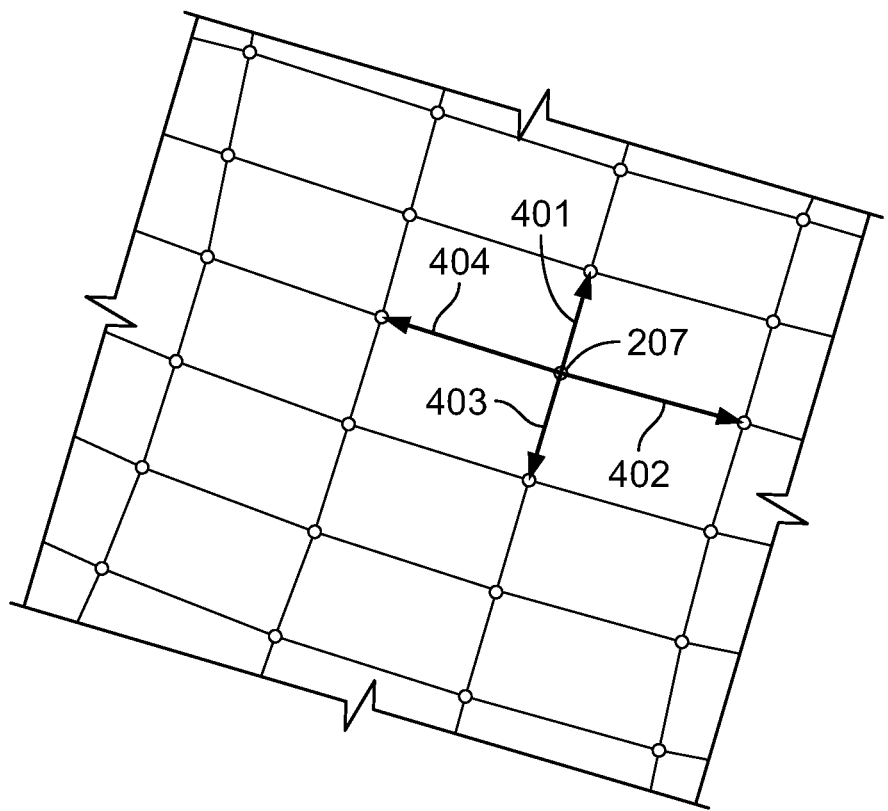
FIGS. 4A, 4B, 4C, 4D, and 4E are illustrations of a method for selecting vertices of a geometric model where previous traversal information is stored in a memory according to another embodiment of the present disclosure.
Figure 4B:
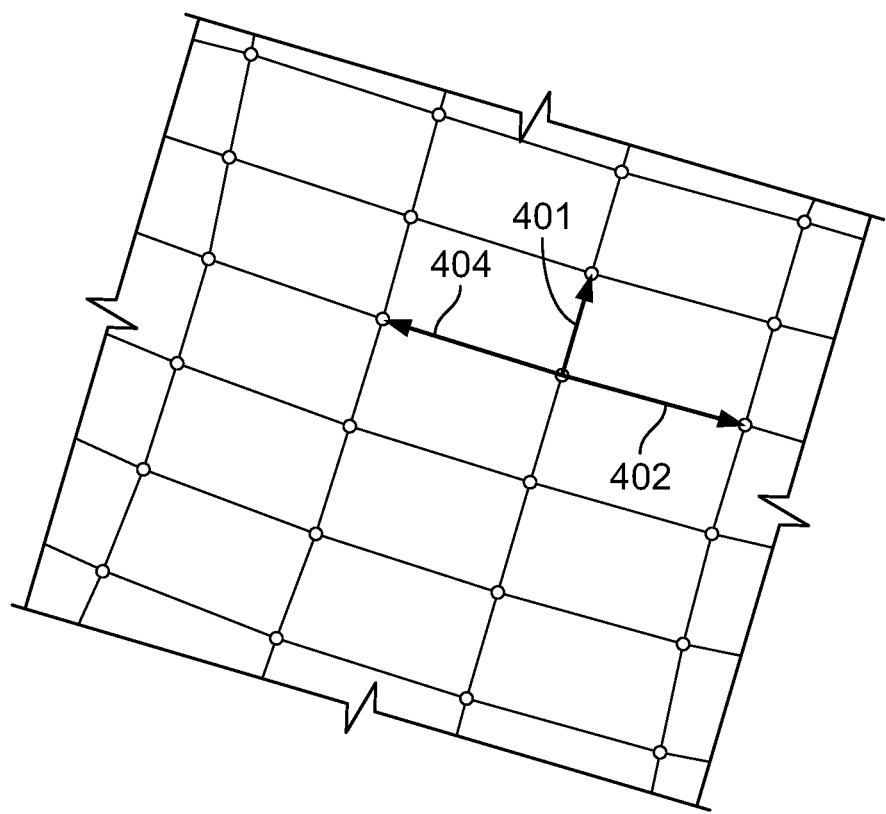

As shown in FIG. 4A, the candidate edges 401, 402, 403, 404 adjacent to the second vertex 207 may be identified. In FIG. 4B, the edge 403 corresponding to traversing back to the initial vertex may be eliminated from the candidate edges since it has already been determined that the traversal is moving forward (not backwards).

Figure 4C:
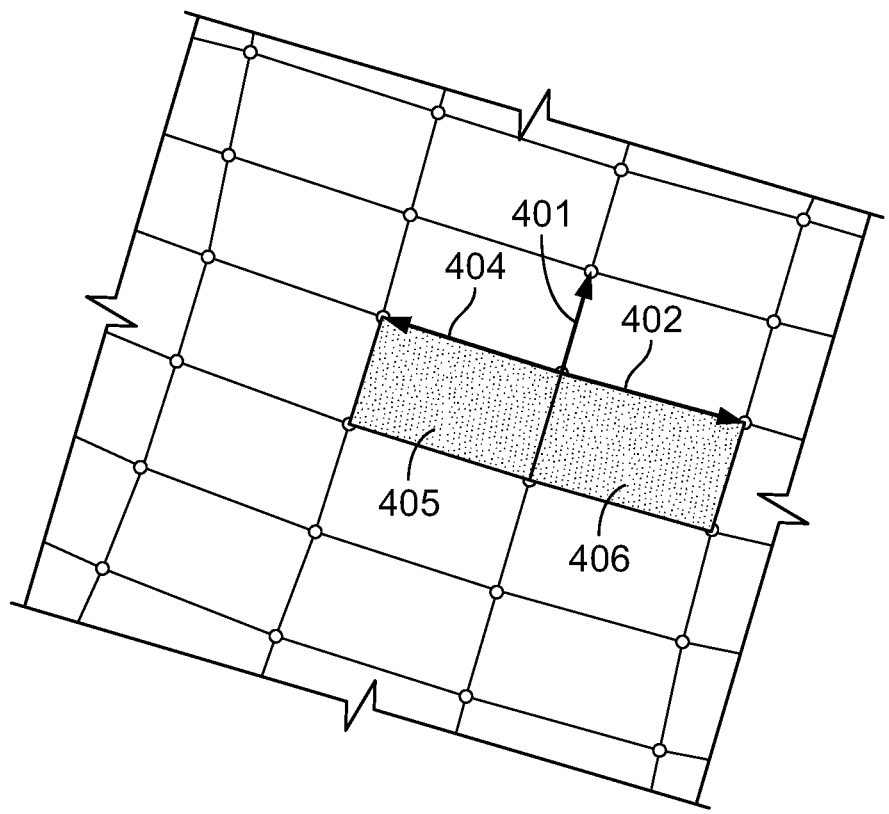

Next, as shown in FIG. 4C, all of the faces 405, 406 that are adjacent to the edge used for going backwards (between the initial vertex and the second vertex) are identified. Since the traversal is moving forward—not backwards or changing direction in a left or right direction—it is presumed that the new edge for traversal will not be adjacent to any faces that are adjacent to the previously traversed edge. In other words, the traversal for selecting the next vertex will not be turning a corner about a face shared with the previously traversed edge, and thus all edges adjacent to any of the faces shared by the previously traversed edge are eliminated, as shown in FIG. 4D.

Figure 4D:
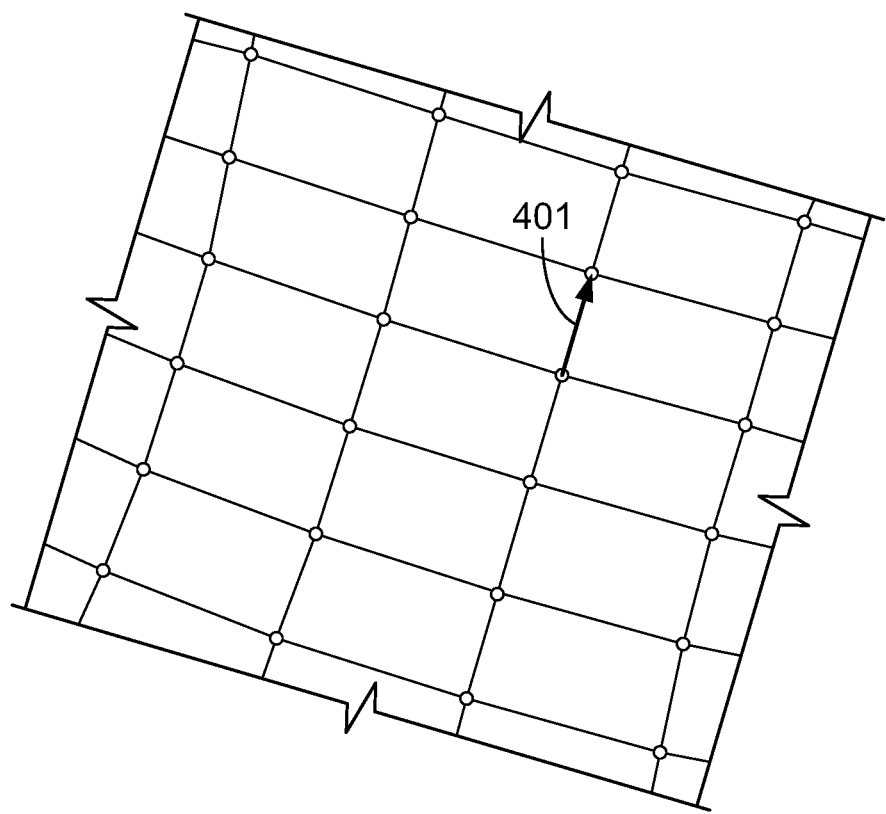

As shown in FIG. 4D, there may be only one candidate edge 401 remaining after the other edges have been eliminated using the determinations above. However, in some cases, as will be discussed further below, more than one candidate edge may be remaining. Accordingly, the method may further include associating the newly received indicated direction with a vector within the 3D model space, and then comparing the vector with the remaining candidate edges. The stored bearing vectors associated with the second vertex may be referenced.

Figure 4E:
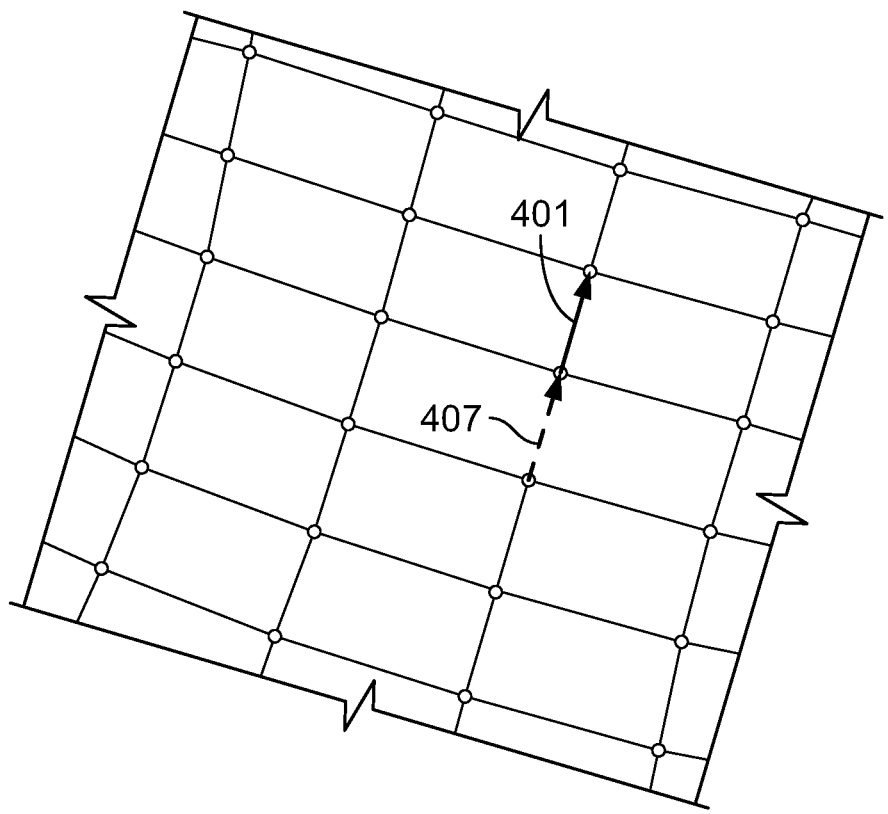

For example, as the newly received indicated direction corresponded to another up arrow key input, the stored bearing vector 407 for the "up" direction from the perspective of the traversal within the 3D model space may be retrieved, as shown in FIG. 4E. The stored bearing vector 407 for the up direction may correspond to the edge traversal direction 203 as shown in FIG. 2D, since that traversal direction 203 defined the "up" direction for the selection of the second vertex. The stored bearing vector 407 for the up direction may be compared with each of the remaining candidate edges (only 401 in FIG. 4D) to determine which candidate edge forms the smallest angle with the stored bearing vector 407 for the up direction.

In the example shown in FIGS. 4D and 4E, the selected candidate edge 401 is in fact the only remaining candidate edge. Notwithstanding, one of the candidate edges is determined as the best fit when compared with up bearing vector 407, i.e., a vector that represents the newly indicated direction key within the 3D model space from the perspective of the current bearing. Thus, the reliance on defining the newly received indicated direction with respect to the display perspective is removed, and selection of the next vertex can be made or appended in response to continued input of a directional key which continues the traversal along the same bearing. Thus, in the example discussed above, consecutive inputs of the "up" key will traverse the 3D model to select vertices along a path of edges as dictated by the topology of the 3D model—regardless of the direction with respect to the display perspective.

Figure 5A:
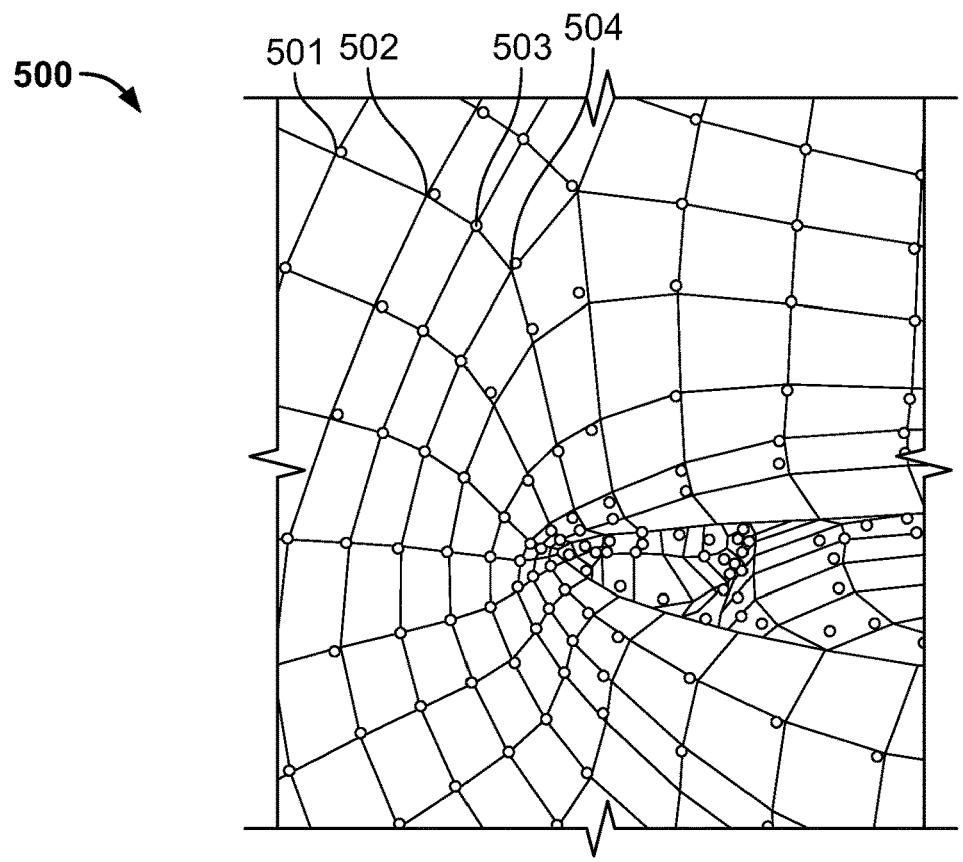
FIGS. 5A, 5B, 5C, and 5D are illustrations of a method for selecting vertices of a geometric model according to another embodiment of the present disclosure.

Another example is shown in FIGS. 5A-5E. FIG. 5A is another portion showing vertices of a portion 500 of a 3D model. Based on the examples above, it is presumed that the traversal has recently traversed from vertex 501 to 502 in response to a right key input (right arrow key input), then from 502 to vertex 503 in response to another right key input, then from 503 to vertex 504 in response to another right key input, with 504 currently selected. The traversal from 501 to 502 may have represented the first traversal, and as such, the first right key input (to select vertex 502 from 501) may have been defined with respect to the display perspective—and not based on a stored directional bearing vector.

As previously discussed, the traversals may correspond to selection of a new vertex with de-selection of the previous vertex, or the traversals may correspond to selection and appending of the new vertex to the previous vertex and all previously selected vertices to increase a selection of vertices.

Figure 5B:
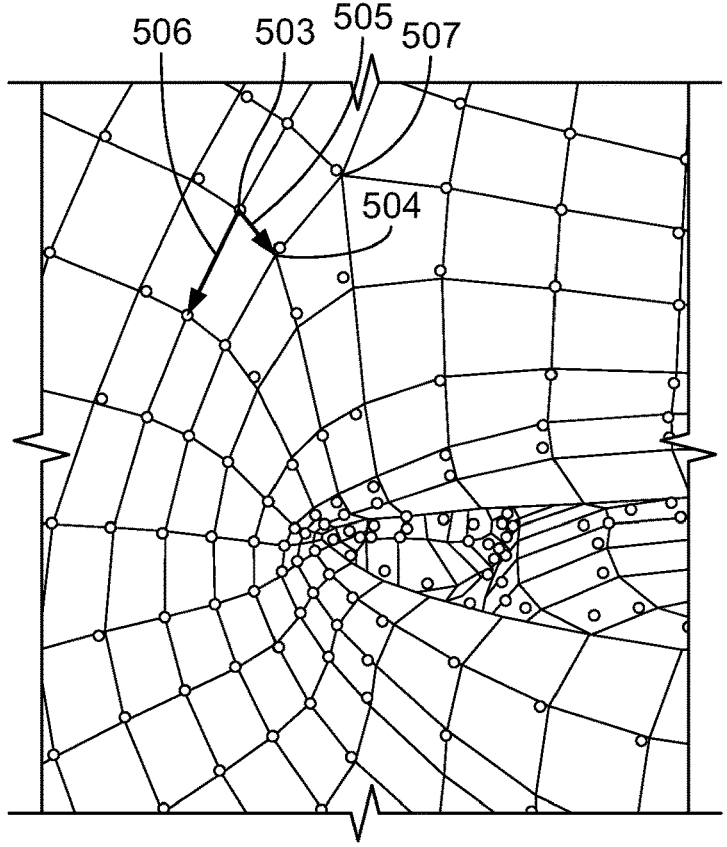

As shown in FIG. 5B, since the previous traversal was from 503 to 504, the bearing vectors stored in the memory associated with stored vertex 504 may include vector 505 defined as the "right" direction and vector 506 defined as the "down" direction. Thus, if another right key input is received to select a next vertex from vertex 504, the "right" direction vector corresponding to the newly received directional key input will be retrieved as vector 505.

It is noted that if the selection of the next vertex relied on the direction of the right key input as defined with respect to the display perspective, which would correspond to a horizontal right arrow extending from vertex 504 (as in the existing art), vertex 507 may be erroneously selected. However, this selection does not follow the topology of the 3D model and does not allow for a logical selection of a group of vertices as defined by the 3D model.

Figure 5C:
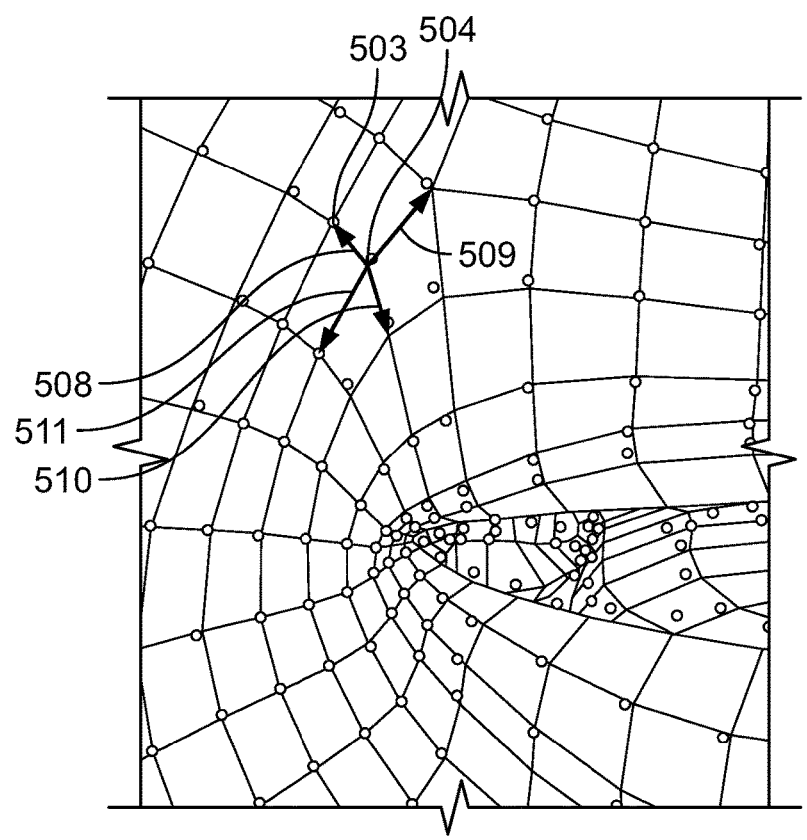

Instead, as previously described, candidate edges 508, 509, 510, 511 may be identified for the selection of the next vertex as shown in FIG. 5C. Since the newly received right key input represents a continued "forward" traversal direction (since it is the same as the previous traversal direction of "right") the candidate edge 508 for traversing backwards (the edge between vertex 503 and 504) may be eliminated. Further, by identifying the faces that are adjacent to the previously traversed edge (the edge between 503 and 504) as discussed in the example of FIGS. 4A-4D, additional candidate edges 509 and 511 may also be eliminated.

Figure 5D:
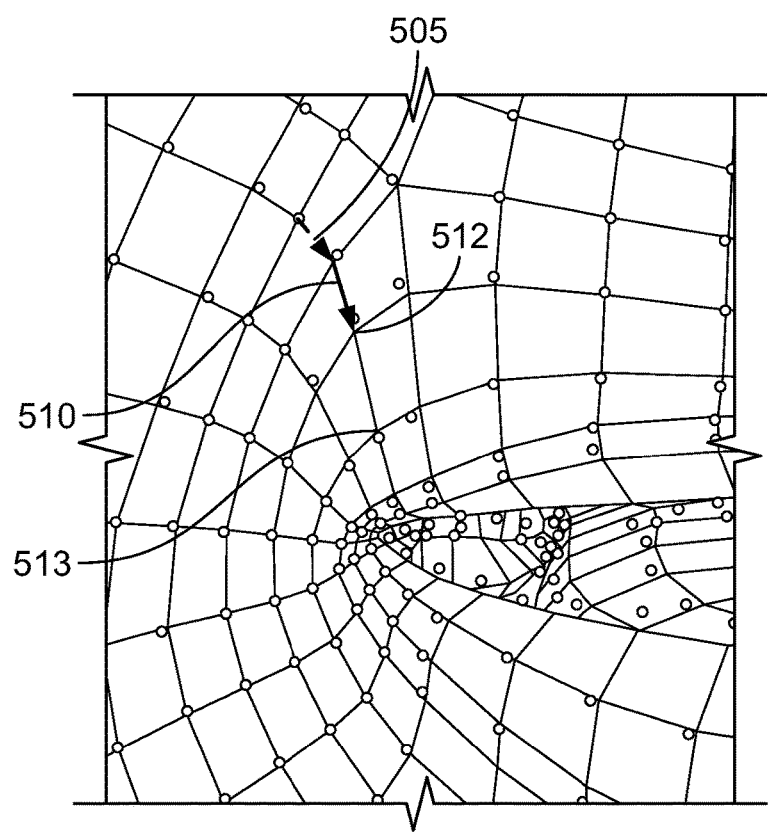

As shown in FIG. 5D, this leaves only candidate edge 510 remaining, however, each of the remaining candidate edges (edge 510) is checked to determine which results in the smallest angle of difference with bearing vector 505 corresponding to the indicated "right" direction within the 3D model space. Since edge 510 is identified as resulting in the smallest angle of difference, corresponding vertex 512 is selected as the next vertex, shown in FIG. 5D.

Similar operations may be performed for the selection of another next vertex 513 after vertex 512 in response to another right key input. As shown in FIGS. 5A-5D, the traversal from vertex 501 to 513 may be performed by consecutive inputs of a right key input, despite the display perspective showing that a displayed traversal direction has clearly been changed (from right to down). Since reliance on the displayed perspective is removed and the direction of traversal is utilized to navigate the topology of the 3D model itself, a change in the key input direction is not required to enable a user to accurately and consistently select a logical next component based on the actual 3D model.

Figure 6A:
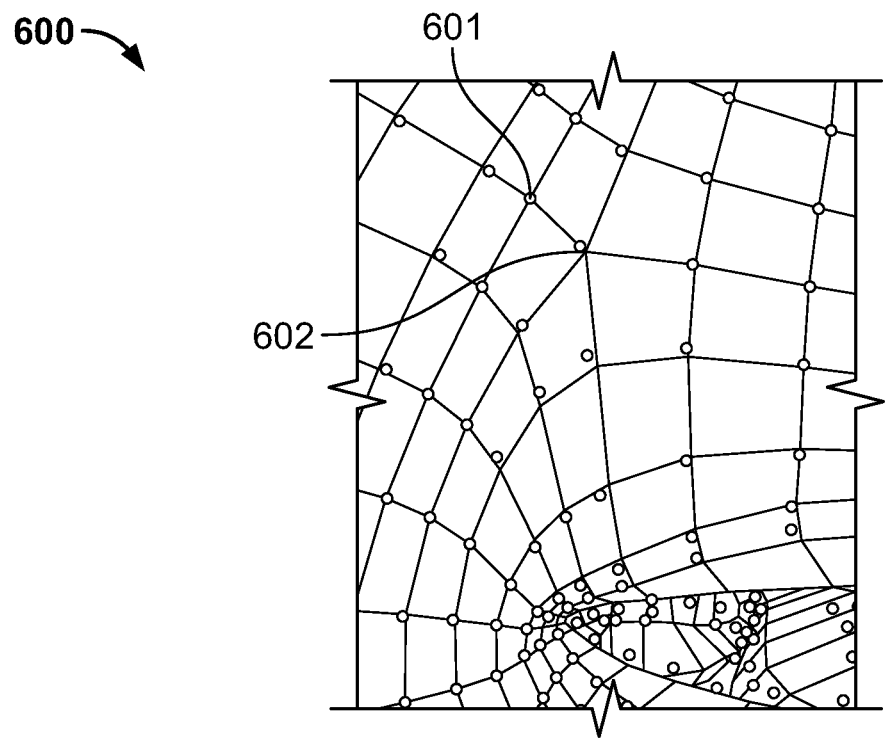
FIGS. 6A, 6B, 6C, 6D, 6E, 6F, and 6G are illustrations of a method for selecting vertices of a geometric model with a vertex having a valence higher than four according to an embodiment of the present disclosure.
Figure 6B:
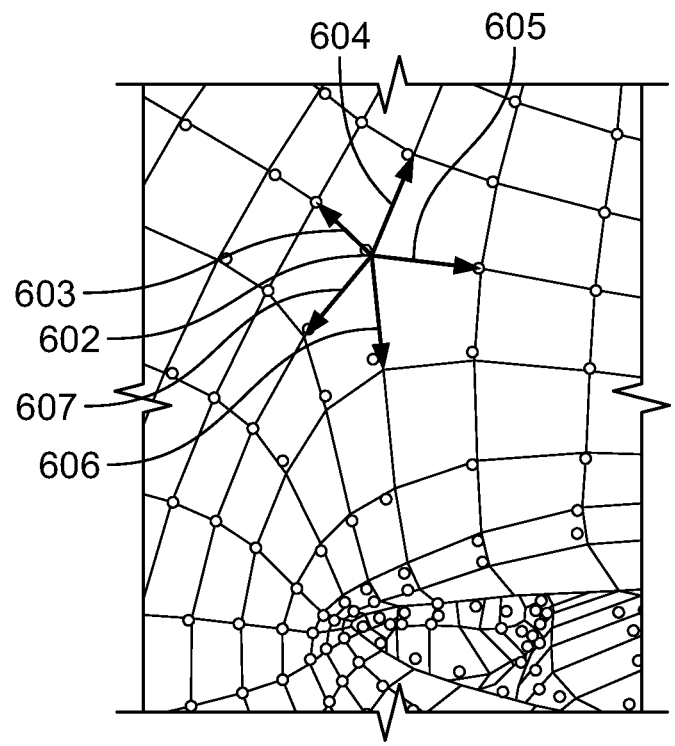

Referring now to FIGS. 6A-6G, an example of a traversal given a vertex with 5 connected edges (a valence higher than 4) is provided. FIG. 6A shows the same portion of the 3D model 600 as discussed in FIGS. 5A-5E, however it is presumed in this example that vertex 602 is currently selected, which was selected from vertex 601 in response to a right key input. If another right key input is received to continue traversing "forward," five candidate edges 603, 604, 605, 606, 607 may be identified from vertex 602, as shown in FIG. 6B.

Figure 6C:
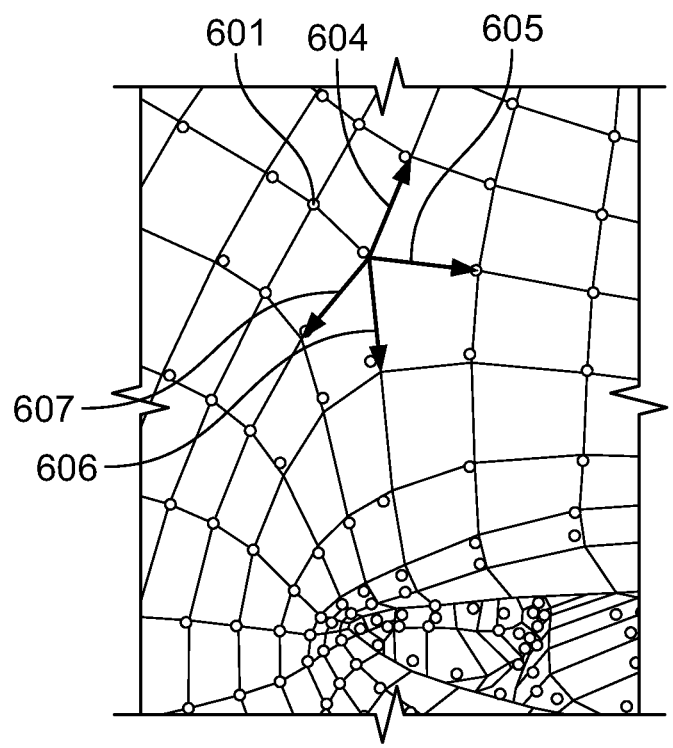

Since the another right key input is the same direction as the previous traversal direction (right) retrieved from the memory, it is determined that the right key input is not intended to go backwards to vertex 601, and thus candidate edge 603 may be eliminated, as shown in FIG. 6C.

Figure 6D:
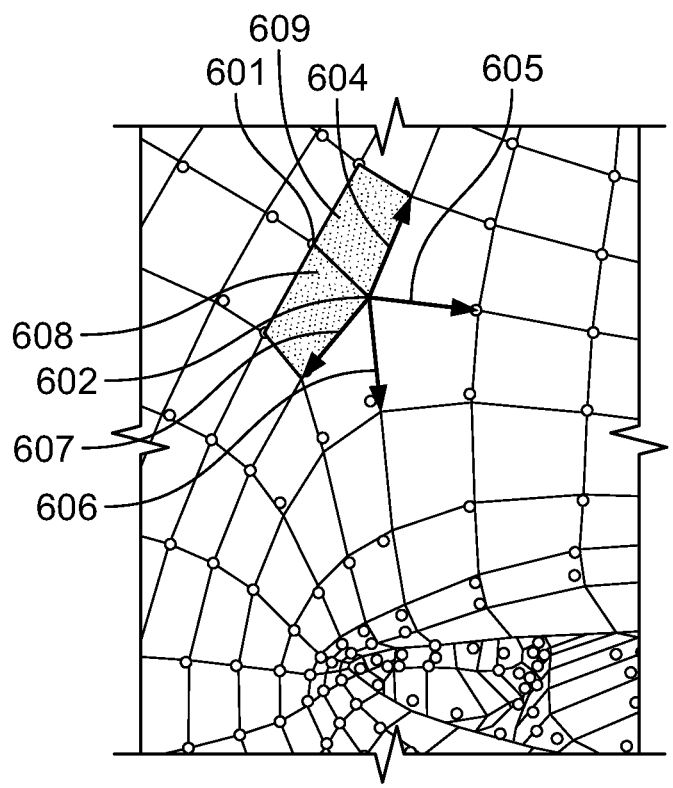

Further, the faces 608, 609 adjacent to the previously traversed edge (the edge between vertex 601 and 602) may be identified as shown in FIG. 6D, as previously discussed. Accordingly, all edges adjacent to faces 608, 609 may be eliminated since the traversal is not changing direction (no corners of a face are being turned by the traversal), and thus candidate edges 604, 607 may be eliminated, as shown in FIG. 6E.

Figure 6E:
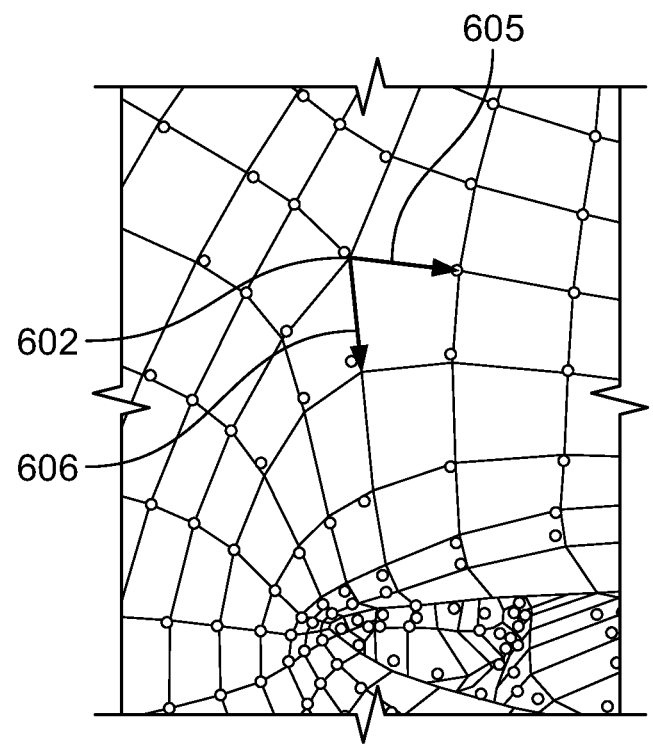
Figure 6F:
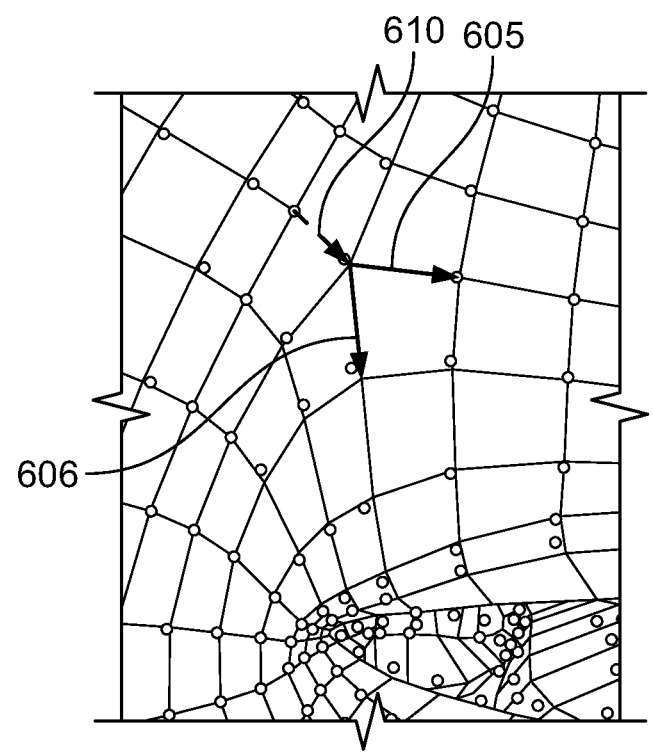
Figure 6G:
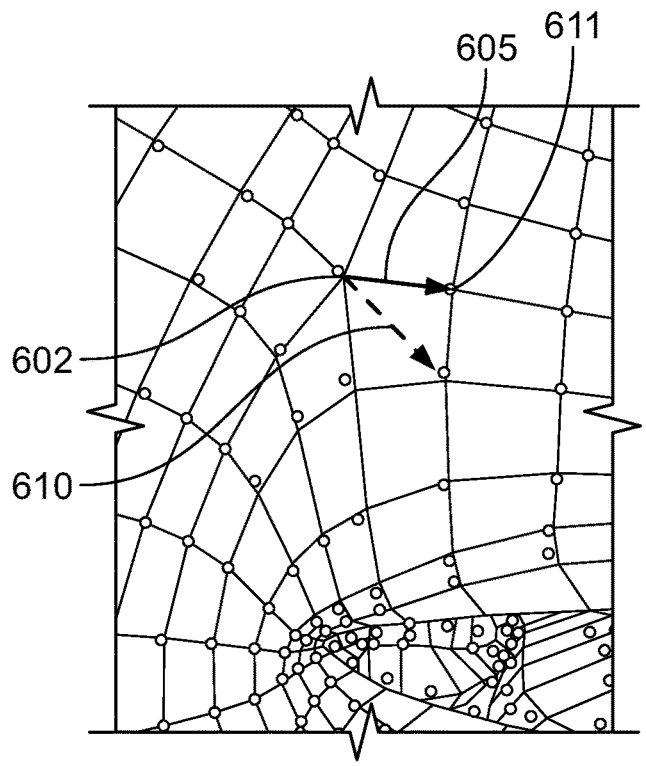

Since vertex 602 has a valence of five, two candidate edges 605, 606 may be remaining, as shown in FIG. 6E. Based on the stored bearing vectors associated with vertex 602, the bearing vector 610 corresponding to the "right" direction may be utilized to determine which candidate edge represents the best fit in view of the traversal direction and the right key input, as shown in FIG. 6F. In some embodiments, the bearing vectors may be adjusted so that the origin of the bearing vectors is a currently selected component to allow for easier comparison with the candidate edges. For example, in FIG. 6G, right bearing vector 610 may be adjusted so that its origin is vertex 602 for comparison with candidate edges 605, 606 (of FIG. 6F). It may be determined that candidate edge 605 forms the smallest angle of difference with right bearing vector 610, and thus candidate edge 605 may be determined to be the best fit, as shown in FIG. 6G. Accordingly, vertex 611 may be selected as the next vertex.

Figure 7A:
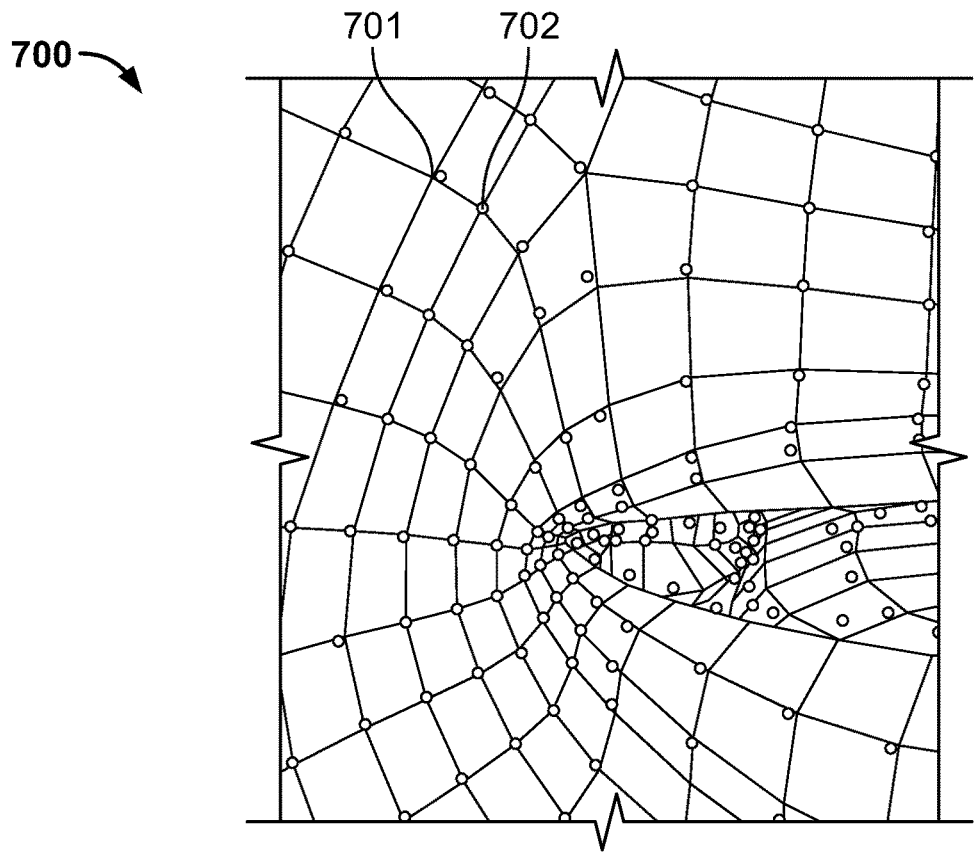
FIGS. 7A, 7B, 7C, 7D, 7E, 7F, and 7G are illustrations of a method for selecting vertices of a geometric model by changing a traversal direction according to an embodiment of the present disclosure.

Another example of a selection traversal will be discussed with reference to FIGS. 7A-7G showing a traversal including a change of traversal direction. FIG. 7A shows the portion of the 3D model 700 discussed in FIGS. 5 and 6, however, in this example it is presumed that vertex 702 is currently selected, which was selected by traversing from vertex 701 in response to a right key input. With vertex 702 selected, if a down arrow key input is received (down key input) a direction of traversal will be changed from right to down.

The memory is searched for information associated with vertex 702, and once located, the indicated direction associated with vertex 702 (right) is determined. Since the newly received indicated direction (down) is different than the stored indicated direction associated with vertex 702, it is determined that the traversal is not proceeding forward and also not going backwards, but instead changing a direction.

Figure 7B:
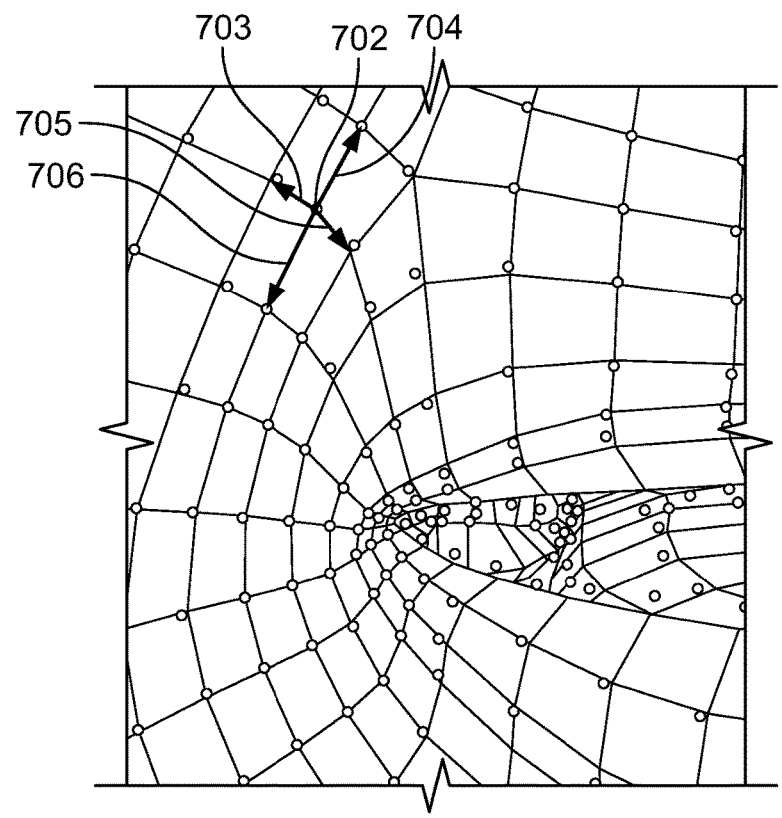
Figure 7C:
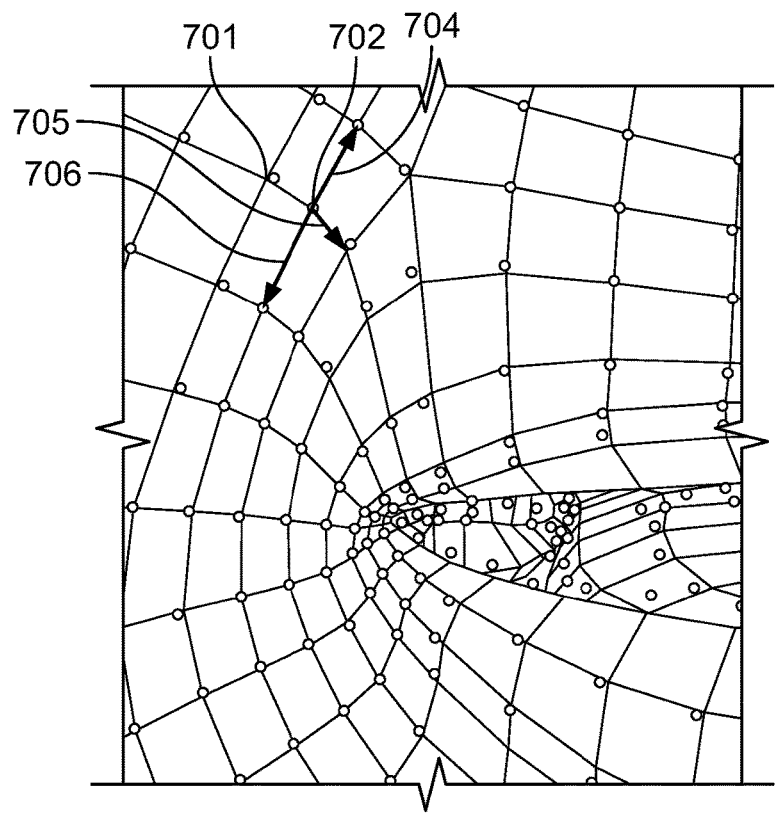

As discussed in the previous examples, candidate edges 703, 704, 705, 706 connected to vertex 702 may be identified as shown in FIG. 7B. Of the candidate edges, the candidate edge 703 corresponding to moving in a backwards direction (edge between vertex 701 and 702) may be eliminated, as shown in FIG. 7C.

Figure 7D:
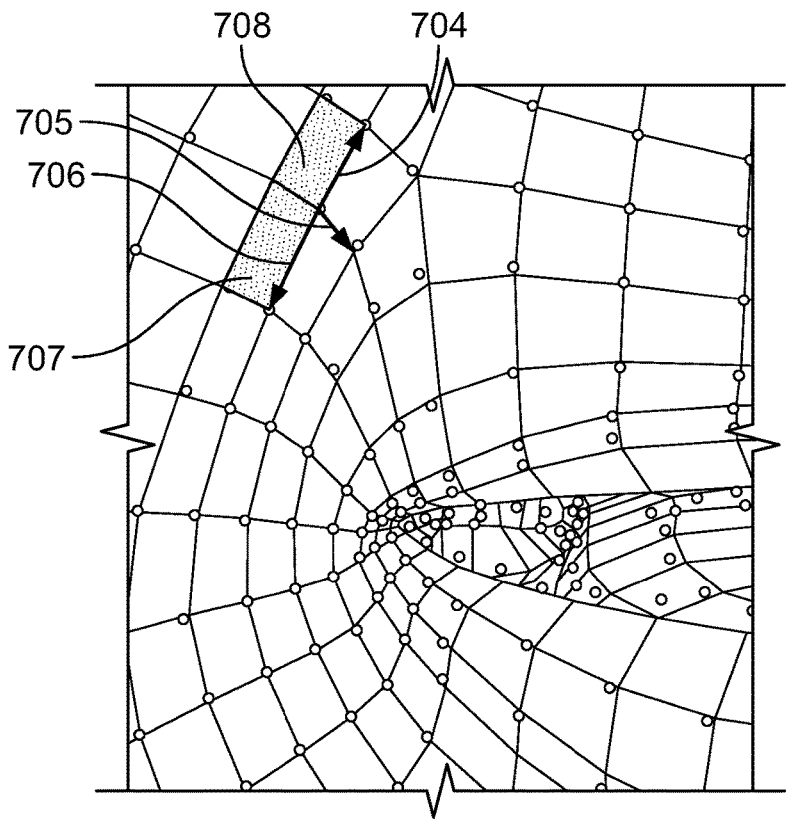
Figure 7E:
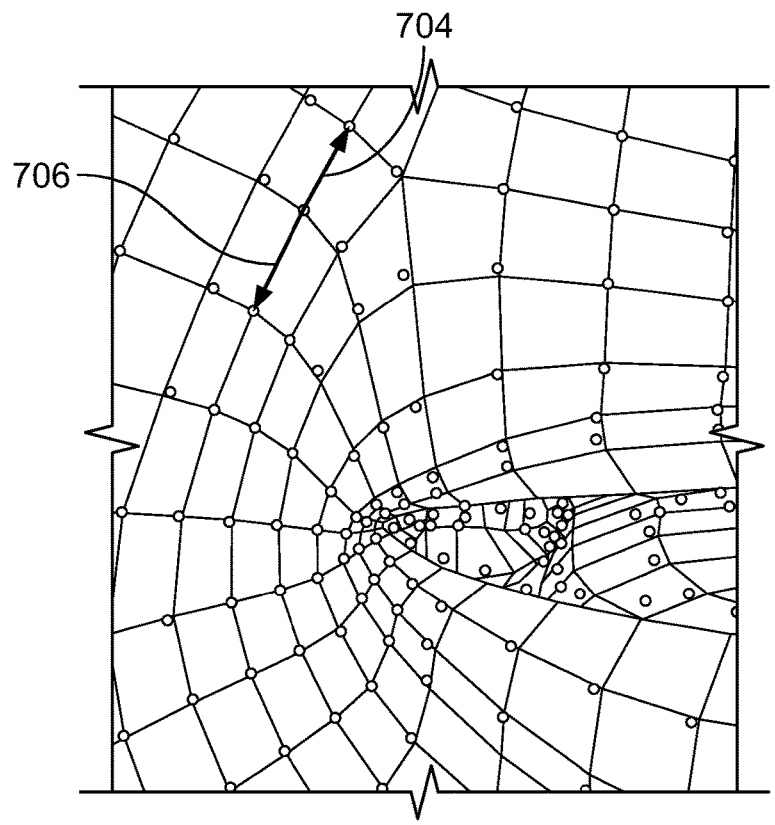

Further, the faces 707, 708 adjacent to the previously traversed edge may be identified as shown in FIG. 7D. However, in this case, since a change of direction is occurring at vertex 702, all edges which are not adjacent to faces 707, 708 must be eliminated. The change of direction corresponds to the turning of a corner of a face 707 or 708, thus the next traversed edge must share a face 707 or 708 with the previously traversed edge. This results in candidate edge 705 being eliminated, as shown in FIG. 7E. Accordingly, only candidate edges 704, 706 may remain for selecting a next vertex in response to a change of direction input at vertex 702.

Figure 7F:
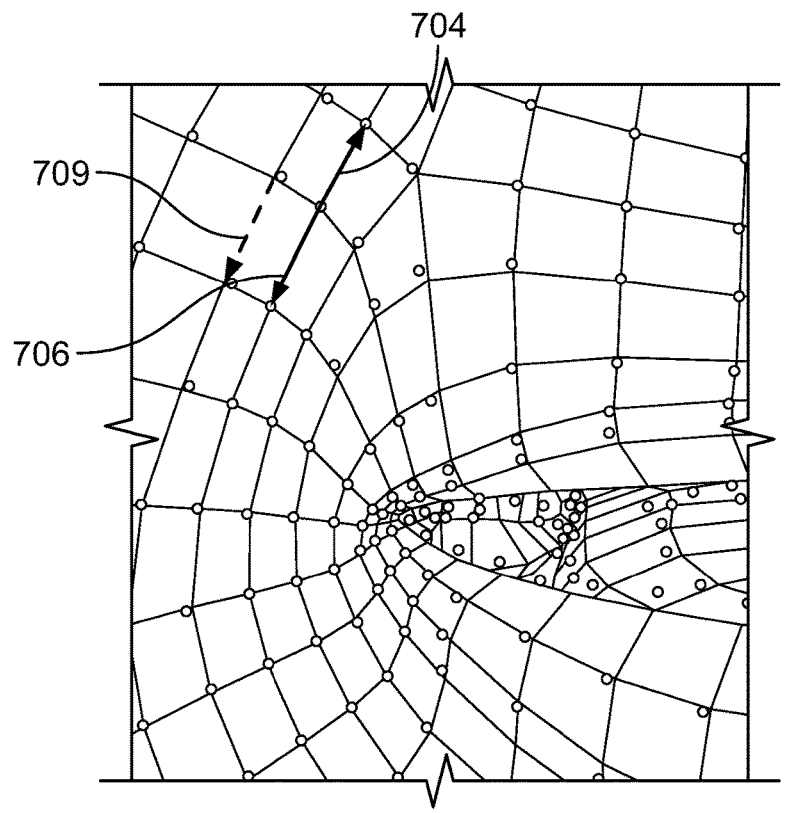
Figure 7G:
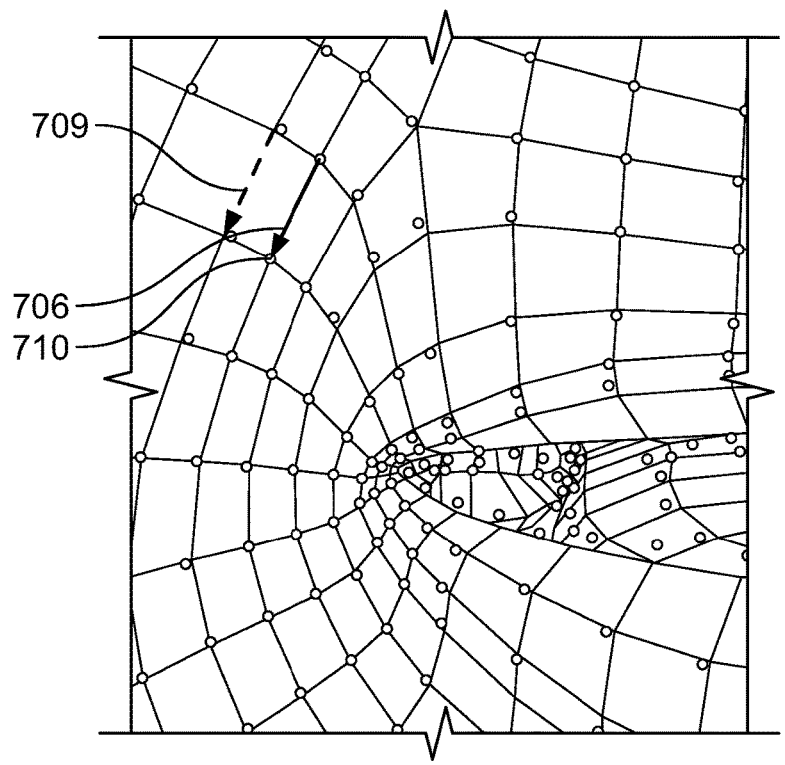

Since the newly received indicated direction is "down", the stored bearing vector 709 corresponding to the down direction associated with vertex 702 may be retrieved, as shown in FIG. 7F. In some embodiments, the bearing vector 709 for the down direction may be calculated based on stored bearing vectors for two other directions, such as up and left, or up and right. Based on the bearing vector 709 for the indicated down direction, each remaining candidate edge 704, 706 is compared to determine a best fit against the bearing vector. In some embodiments, a smallest angle difference is determined between each of the candidate edges 704, 706 and the bearing vector 709. Since candidate edge 706 forms the smallest angle difference with bearing vector 709, candidate edge 706 may be selected for traversal, resulting in selection of vertex 710 as the next vertex after changing direction at vertex 702, as shown in FIG. 7G. As discussed, bearing vector 709 may be adjusted so that the origin is currently selected vertex 702 of FIG. 7C to facilitate comparison between the bearing vector and the candidate edges.

Figure 8A:
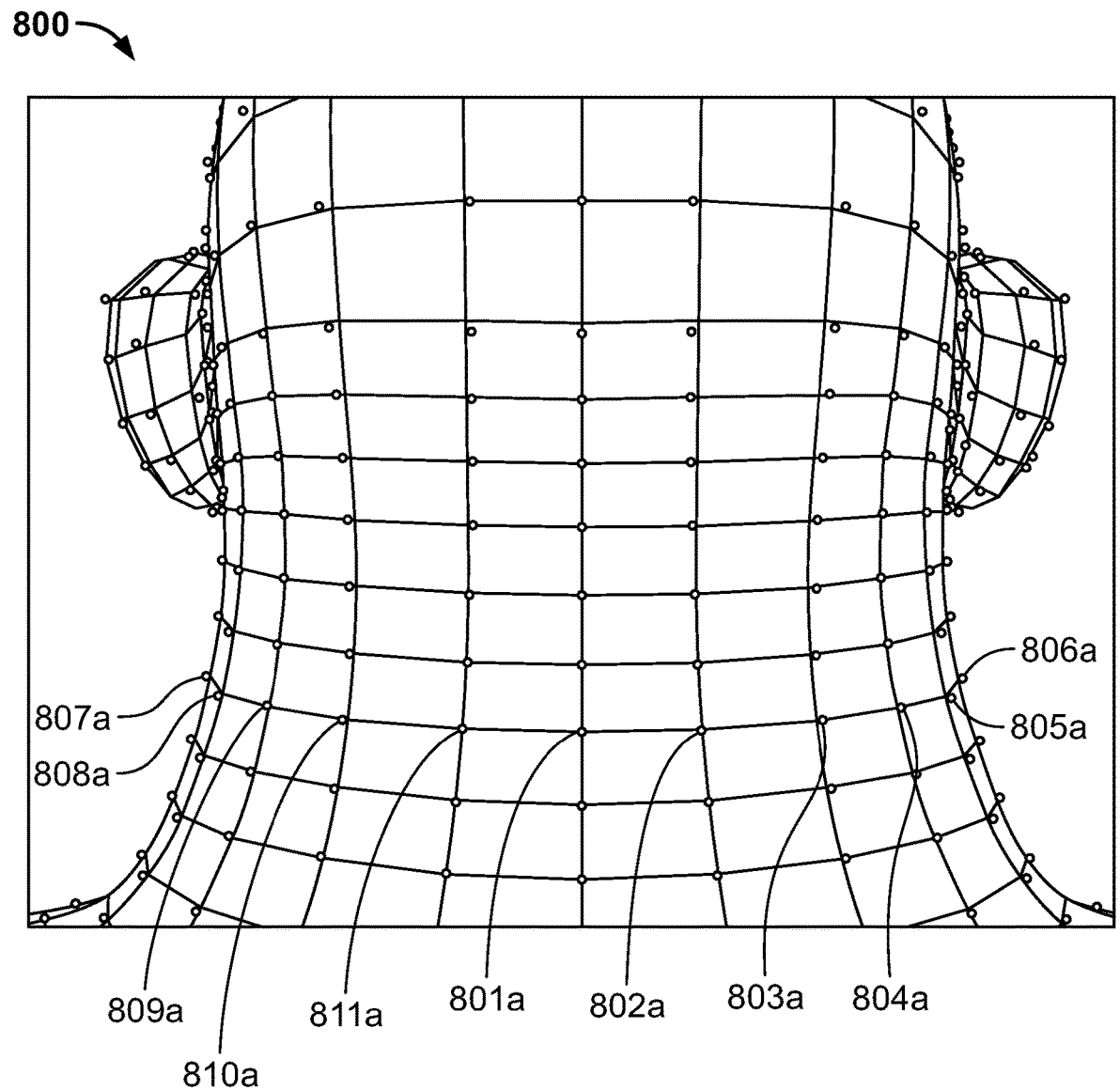
FIGS. 8A, 8B, and 8C are illustrations of a method for selecting groups of components of a geometric model according to an embodiment of the present disclosure.
Figure 8B:
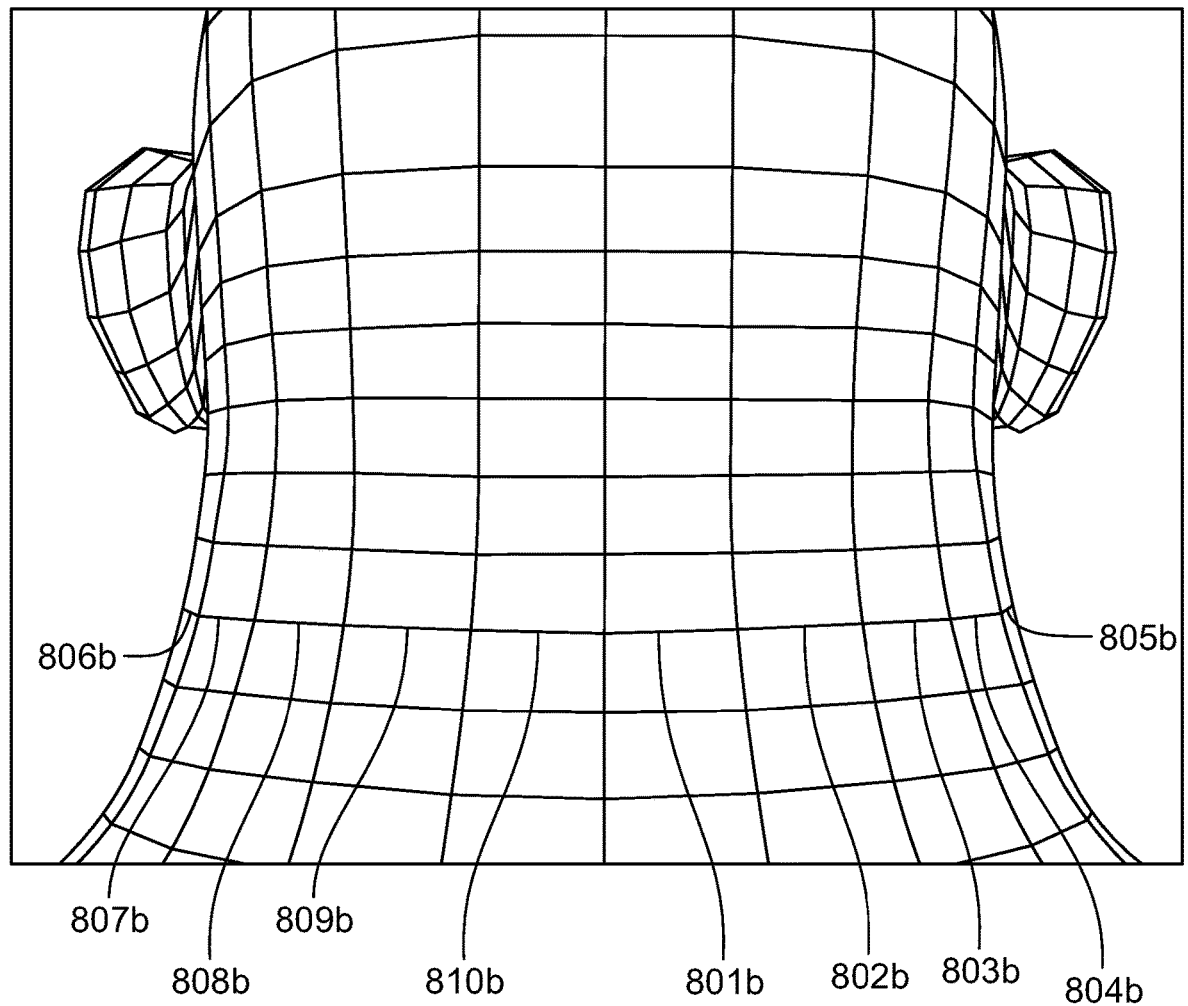
Figure 8C:
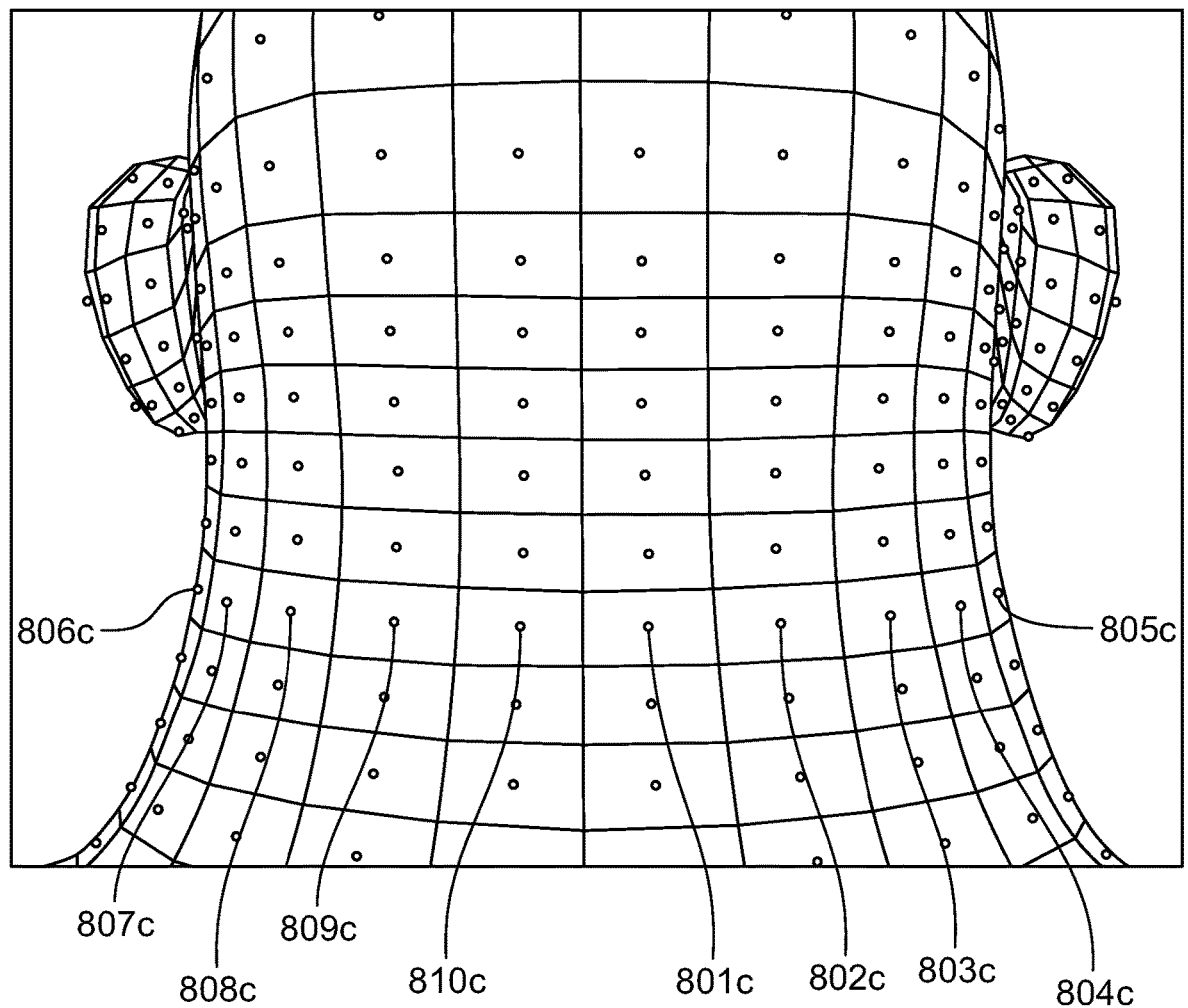

FIG. 8A-8C show examples of group selection of components according to embodiments of the present disclosure. Referring now to FIG. 8A, the back of a head and neck of a character represented as a 3D model 800 is depicted. Using the selection methods discussed above, a user may be able to select all of the vertices around the character's neck without having to change the display perspective of the 3D model as displayed at a terminal, in one instance. For example, if vertex 801*a* is initially selected—in some cases by a mouse click, keyboard selection, stylus selection, touchscreen selection, or the like, as previously discussed—a directional key input may expand the selection of vertices and append the additional vertices to the selection of the initial vertex 801*a*.

For example, from a selection of initial vertex 801*a*, if a right key input is received, the directional input may be defined relative to the display perspective since no stored data exists for previous traversals or bearing vectors. As discussed in the previous examples, the right key input may select the second vertex 802*a*, and store selection information associated with the second vertex 802*a*, including previous traversal direction, previous traversed edge, directional bearing vectors, and the like, as discussed. Upon selection of the second vertex 802*a*, it may be appended to a group selection of vertices, such that the selection is increased to include both the initial vertex 801*a* and the second vertex 802*a*.

If another subsequent right key input is received while second vertex 802*a* is selected, the same operations may be performed as discussed above, including determining a previous indicated direction, comparing the previous indicated direction to determine that the traversal is moving "forward" (continuing in the same traversal bearing), identifying all candidate edges, eliminating the edge corresponding to traversing backwards to initial vertex 801*a*, identifying faces adjacent to the previously traversed edge, eliminating edges adjacent to the identified faces, and comparing each remaining candidate edge with a direction bearing vector corresponding to the new indicated direction to determine the candidate edge having the best fit, or smallest angle of difference. In the example of FIG. 8A, since the selection is moving the same direction, vertex 803*a* will be selected and appended to the vertices group selection.

If consecutive right key inputs are received such that the selection is continually expanded in the same direction within the 3D model space, the vertices that form a ring around the 3D model's neck may be selected. Thus, after selecting vertex 803*a*, vertices 804*a*, 805*a*, 806*a* will be selected. In response to another right key input at vertex 806*a*, a vertex toward the front of the 3D model's neck may be selected, even though it is not visible in the display perspective. Since the directional key inputs are being defined with respect to directional vectors within the 3D model space and with respect to the traversal perspective along the 3D model topology, the components on the front side of the 3D model is not required to be viewable in the display perspective.

Additionally, since the indicated direction (right) of the right key inputs are disconnected from the display perspective, a right key input will still result in selection of a next vertex along the ring around the neck even at the front of the 3D model which is not currently visible in the display perspective of FIG. 8A. This is despite the traversal direction of next vertices within the display perspective actually being in the left direction (if the 3D model was viewed with full transparency).

Accordingly, if the right key inputs are continually received, the selection will continue to traverse the 3D model topology appending vertices along the ring of vertices around the neck. Eventually, the selection will reach vertex 807*a* and continue to vertices 808*a*, 809*a*, 810*a*, 811*a* until it meets again with selected vertex 801*a*, completing the ring selection.

As previously discussed, the embodiments and examples discussed herein may be applied similarly to the traversal and selection of edges of a 3D model. Referring to FIG. 8B, selection of a group of edges which form a ring around the 3D model's neck, similar to FIG. 8A, is shown. The initial edge 801*b* may be selected, and thereafter, each next edge may be selected with the same operations and determinations as discussed with respect to the vertex selection. Accordingly, the selection may wrap around the front of the 3D model, and emerge within the display perspective at edge 806*b*, and continue to 810*b* before meeting again with initial selected edge 801*b*.

Referring to FIG. 8C, selection of a group of faces which form a ring around the 3D model's neck, similar to FIGS. 8A and 8B, is shown. The initial face 801*c* may be selected, and thereafter, each next face may be selected with the same operations and determinations as discussed with respect to the vertex and edge selections. Accordingly, the selection may wrap around the front of the 3D model, and emerge within the display perspective at face 806*c*, and continue to 810*c* before meeting again with initial selected face 801*c*.

The grouped component selections of FIGS. 8A-8C may also be expanded as a group. For example, an interface may allow for a specific input to indicate that the grouped selection of components should be expanded in a particular direction. Accordingly, referring back to the example of FIG. 8A, once the ring of vertices around the neck is selected, the grouped selection expansion input (for example, a particular input key is held down while a direction key is input, an expansion input is received before, during, or after input of a direction key, or the like) may indicate that the ring above the selected ring should also be added to the grouped selection.

Thus, the grouped selection of vertices 801a-811a may be expanded to also include the ring of vertices above or below the grouped selection of vertices 801a-811a. Alternatively, the grouped selection of vertices may also be used to traverse the rings of vertices around the neck, whereby the directional input traverses the available rings of vertices by selecting a next new ring of vertices, and de-selecting the previously selected ring of vertices. The same grouped selection expansion or grouped selection traversal may be performed with respect to the grouped selection of edges or faces, as discussed in FIGS. 8B and 8C.

Figure 9A:
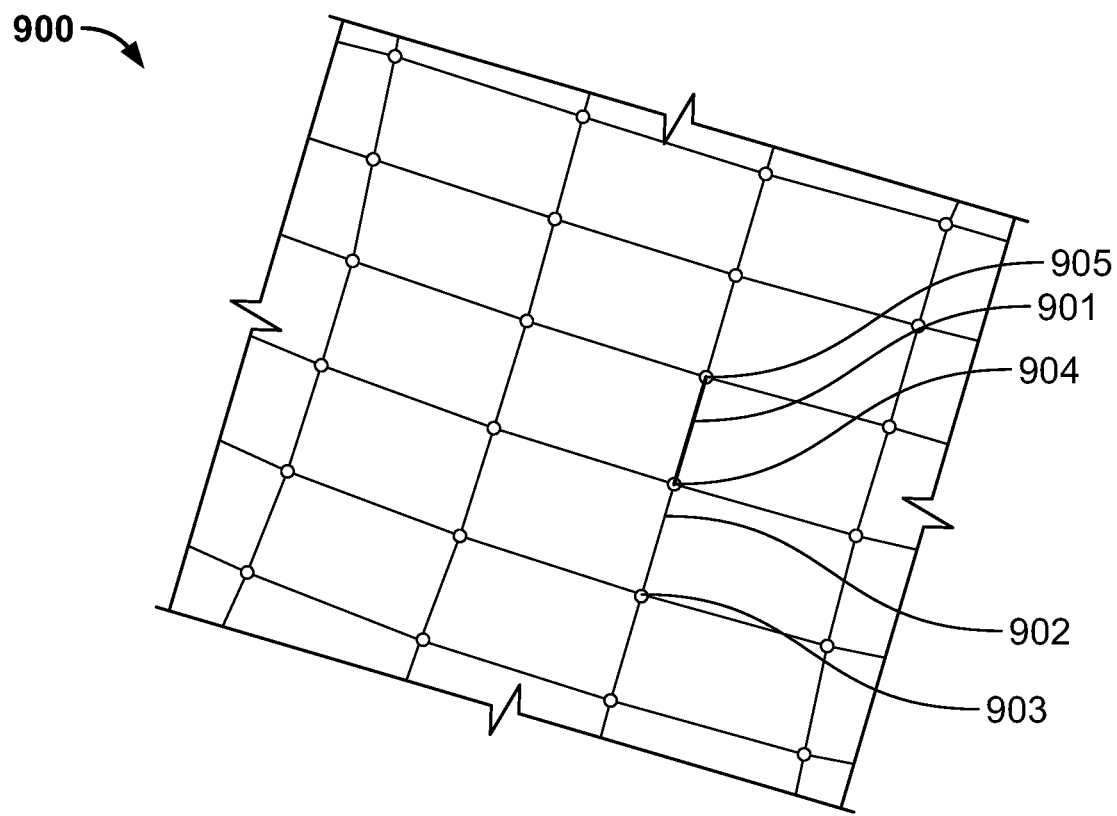
FIGS. 9A, 9B, 9C, 9D, 9E, and 9F are illustrations of a method for selecting edges of a geometric model according to an embodiment of the present disclosure.

As discussed, the above examples may apply similarly to selecting other types of components of a 3D mesh, including edges and faces. Referring now to FIG. 9A, an example of traversal selection of edges of a geometric model is shown. FIG. 9A shows a portion 900 of a geometric model including faces, edges, and vertices, which was similarly discussed with respect to the examples of FIGS. 2A-2D and 4A-4E. In the example of FIG. 9A, it is assumed that edges of the geometric model are being selected, and edge 902 (between vertices 903, 904) was previously selected, and that edge 901 (between vertices 904, 905) is currently selected after traversing from edge 902 to 901 in response to an up key input. Accordingly, the memory may include stored information associated with the selected edge 901, including the previous indicated direction "up", and may also include at least an up bearing vector corresponding to the edge 902 with a direction from vertex 903 to vertex 904.

In response to receiving a newly indicated direction key (e.g., another arrow up key input), the memory may be checked to determine whether information of the currently selected edge 901 is stored, using a unique identifier of the edge 901, such as a unique numerical edge identifier, similar to the identifier information discussed with respect to vertices in the previous examples. If the memory returns information of the selected edge 901, the indicated direction stored in association with the selected edge 901 (up) may be checked to see if it is the same, opposite, or different than the newly received indicated direction (up). In this example, since the stored direction associated with the selected edge 901 is the same as the newly received indicated direction, it may be presumed that the newly received indicated direction key is intended to move forward in the same direction to select another edge from the currently selected edge 901.

The memory may further include edge information corresponding to the "from edge", i.e., the edge which was previously selected prior to selection of the currently selected edge 901. In this case, since edge 901 was selected in response to a key up input, the "from edge" stored in association with edge 901 may be edge 902 (between vertices 903, 904). The "from edge," along with the stored indicated direction associated with currently selected edge 901, may be used to determine the vertex of edge 901 (either 904 or 905) from which the next edge will be based. For example, referring to FIG. 9B, the stored indicated direction (of the previous traversal) may be stored as a vector from vertex 904 to 905 (corresponding to edge 901). By comparing the stored indicated direction vector to the "from edge" 902, a vertex that is not shared between them may be identified as the vertex from which the next edge selection will be made. Accordingly, the next edge selection will be based from vertex 905, since vertex 904 is shared by the "from edge" 902 and the stored indicated direction vector corresponding to edge 901.

Figure 9B:
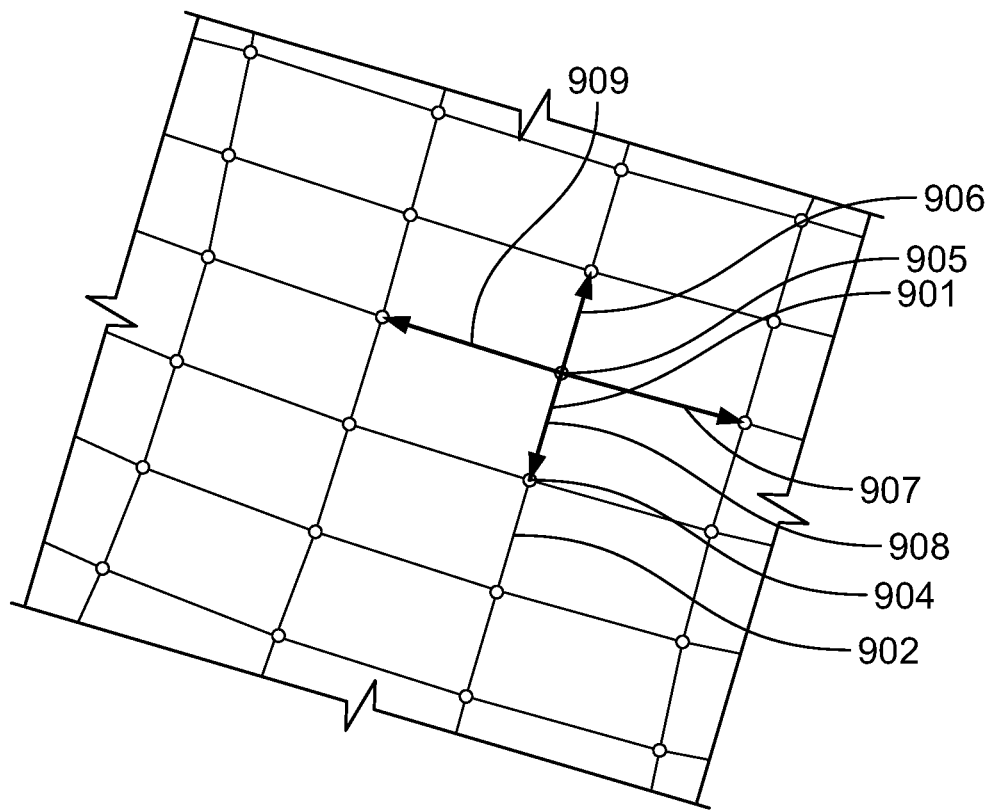
Figure 9C:
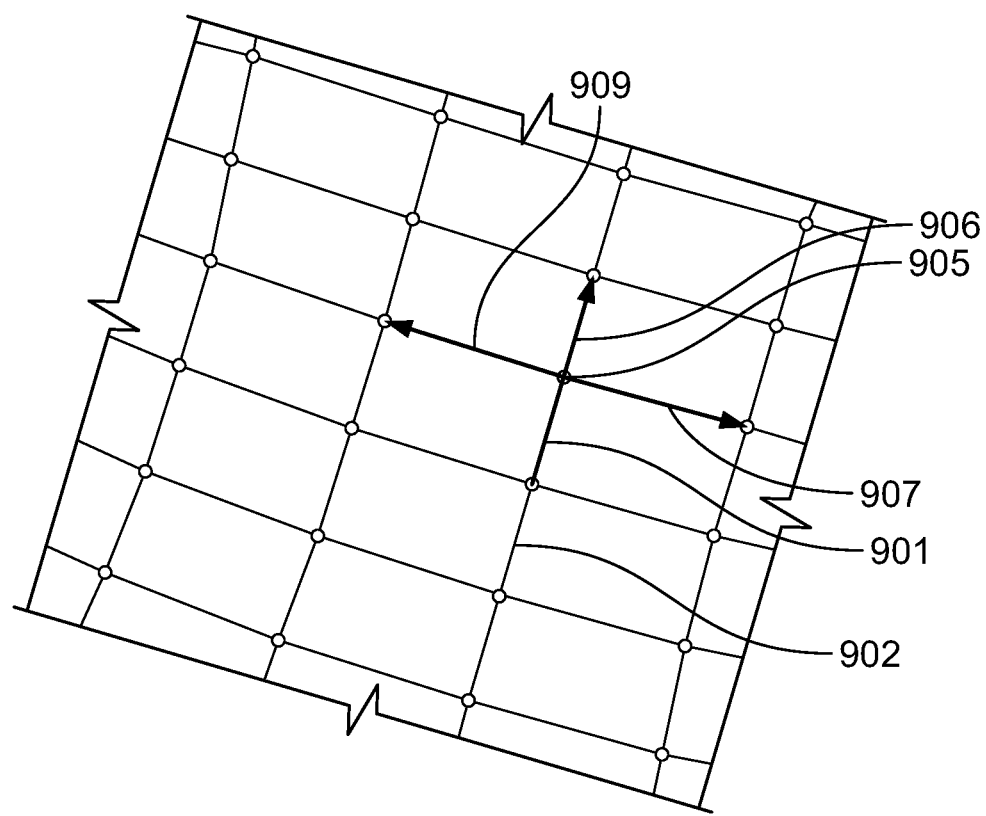

As shown in FIG. 9B, candidate edges 906, 907, 908, 909 may be identified based on vertex 905. In FIG. 9C, the edge 908 from FIG. 9B corresponding to traversing back to the previous edge 902 may be eliminated from the candidate edges since it has already been determined that the traversal is moving forward (not backwards).

Figure 9D:
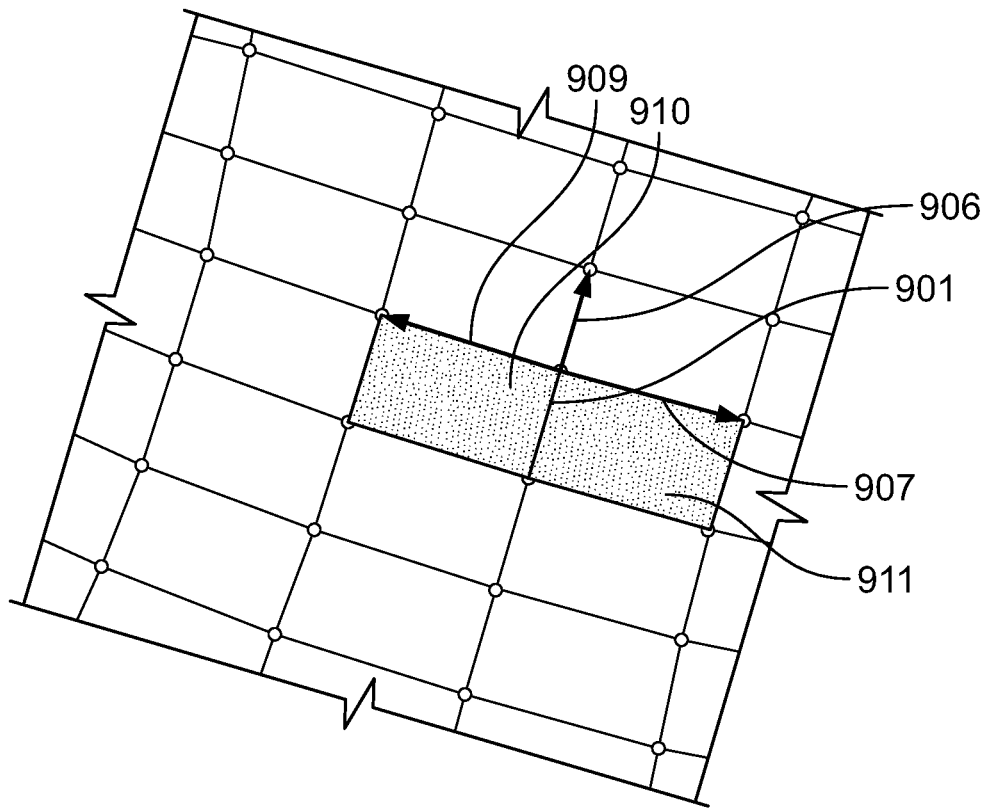

Next, as shown in FIG. 9D, all of the faces 910, 911 that are adjacent to the currently selected edge are identified. The next selected edge will not share a face with the currently selected edge 901 since sharing a face would require a change in direction (turning a corner of an edge), and it has been determined that the traversal is proceeding forward. Thus, all edges 907, 909 adjacent to any of the faces 910, 911 shared with the currently selected edge 901 are eliminated.

Figure 9E:
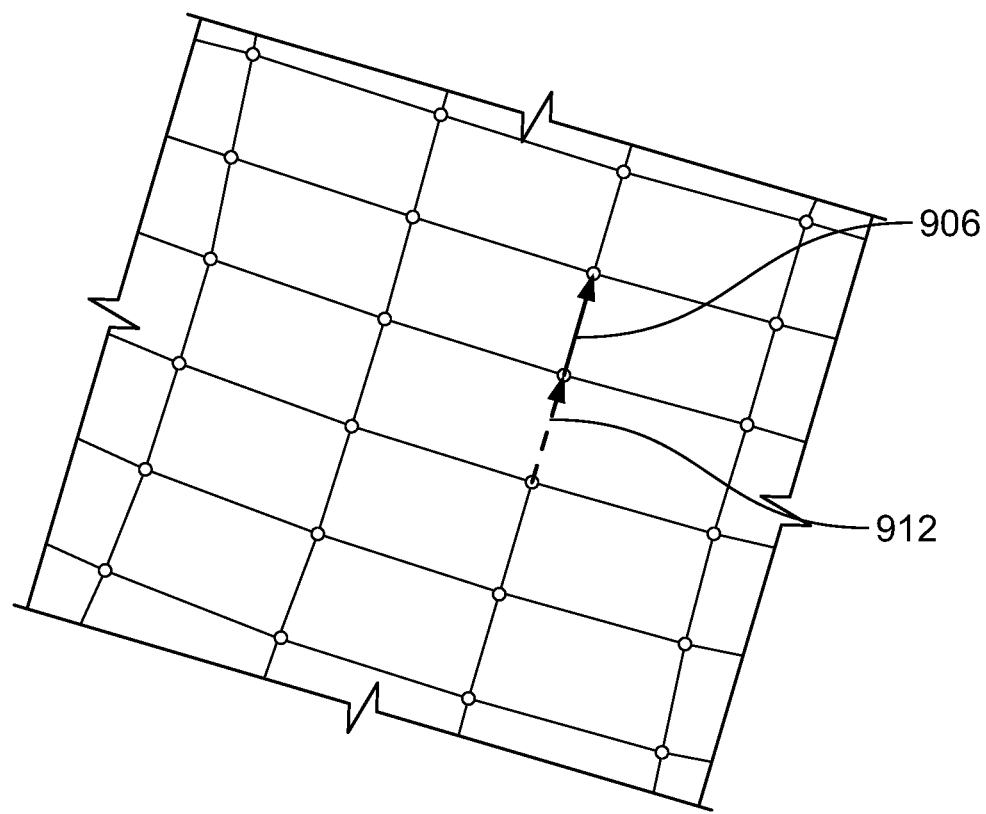

As shown in FIG. 9E, there may be only one candidate edge 906 remaining after the other edges have been eliminated using the determinations above. However, in some cases, more than one candidate edge may be remaining (for example, where a vertex has a valence higher than 4). Accordingly, the method may further include associating the newly received indicated direction with a vector within the 3D model space based on the stored bearing vectors associated with the currently selected edge, and then comparing the appropriate bearing vector with the remaining candidate edges.

Figure 9F:
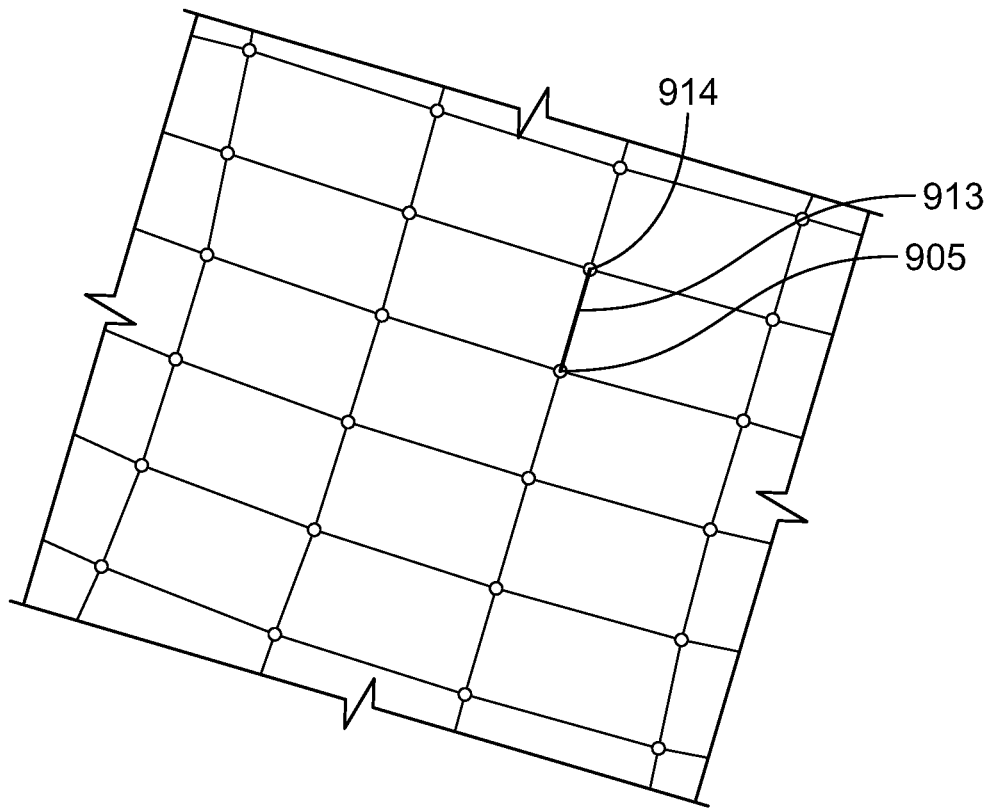

For example, as the newly received indicated direction corresponded to another up arrow key input, the stored bearing vector 912 for the "up" direction from the perspective of the traversal within the 3D model space may be retrieved, as shown in FIG. 9E. The stored bearing vector 912 may be compared with each of the remaining candidate edges (only 906 in FIG. 9E) to determine which candidate edge forms the smallest angle with the stored bearing vector 912 for the up direction. Accordingly, edge 913 is selected as the next edge between vertices 905 and 914, as shown in FIG. 9F.

Figure 10A:
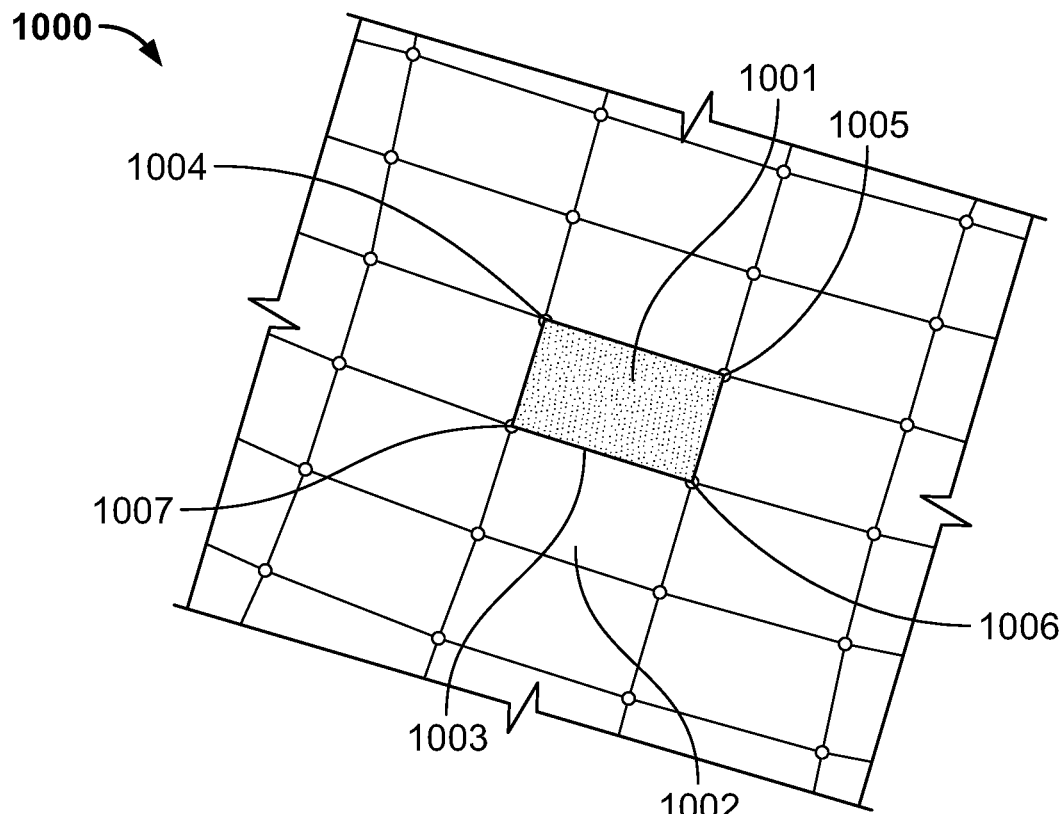
FIGS. 10A, 10B, 10C, and 10D, are illustrations of a method for selecting faces of a geometric model according to an embodiment of the present disclosure.

Referring now to FIG. 10A, an example of traversal selection of faces of a geometric model is shown. FIG. 10A shows a portion 1000 of a geometric model including faces, edges, and vertices, which was similarly discussed with respect to the examples of FIGS. 2A-2D, 4A-4E, and 9A-9F. In the example of FIG. 10A, it is assumed that faces of the geometric model are being selected, and face 1002 was previously selected, and that face 1001 is currently selected. For traversing faces of the geometric model, vertices and edges of the geometric model may be used and defined for identifying and storing traversal information. Thus in some embodiments, face 1001 may be currently selected in response to an up key input, and edge 1003 may be defined and stored as the "from edge." In other embodiments, traversal information may be defined, identified, and stored based on other identification or combinations of components, for example, based on vectors connecting centers of traversed faces, vectors defined based on an axis orthogonal to a shared edge between traversed faces, and the like.

Face 1001 may be identified and stored based on the vertices 1004, 1005, 1006, 1007 associated with face 1001, or in some embodiments, face 1001 may be identified as stored based on at least one edge of the face, such as edge 1003, or vertices 1006, 1007. A particular edge or at least two vertices may be used to identify, select, and store each face in a particular direction with respect to the particular edge or at least two vertices. For example, in FIG. 10A, it may be predetermined that edge 1003 refers to the face located above (in the display perspective), or located toward a particular direction (within the 3D model perspective), with respect to edge 1003. Accordingly, traversal of the faces of the geometric model may identify and store information of traversed edges associated with selected faces, such as "from edge" 1003 in the example of FIG. 10A.

Similarly, bearing vectors may be stored for traversing faces wherein the vertices and edges used for defining the bearing vectors may be predetermined to be positioned at a particular side or vertex of the faces being traversed. In the example of FIG. 10A, face 1001 may be selected from previous face 1002, where the up bearing vector is associated with the edge between vertices 1006 and 1005 to the right side (in the display perspective) of selected face 1001.

In other embodiments, the corresponding centers of each face may be used to determine or generate a "center connector" vector for each bearing vector. Accordingly, in the example of FIG. 10A, a center connector vector may be determined from the center of face 1002 to the center of face 1001 to evaluate candidate faces. In other embodiments, a bearing vector may be defined based on an axis orthogonal to a traversed edge, for example, a vector may be determined which is orthogonal to edge 1003 between face 1001 and face 1002. The orthogonal axis may be used to determine a bearing vector when one or more faces do not have a defined center point.

The memory may thus include stored information associated with the selected face 1001, including the previous indicated direction "up", and may also include at least an up bearing vector corresponding to the edge between vertex 1006 to vertex 1005.

In response to receiving a new indicated direction key (e.g., another arrow up key input), the memory may be checked to determine whether information of the currently selected face 1001 is stored, using a unique identifier of the face 1001, such as a unique numerical face identifier based on vertices 1004, 1005, 1006, 1007, similar to the identifier information discussed with respect to edges and vertices in the previous examples. If the memory returns information of the selected face 1001, the indicated direction stored in association with the selected face 1001 (up) may be checked to see if it is the same, opposite, or different than the newly received indicated direction (up). In this example, since the stored direction associated with the selected face 1001 is the same as the newly received indicated direction, it may be presumed that the newly received indicated direction key is intended to move forward in the same direction to select another face from the currently selected face 1001.

As discussed, the memory may further include stored "from edge" information, i.e., the edge which was previously used to select face 1001 from the previously selected face 1002. In this case, the "from edge" stored in association with face 1001 may be edge 1003 (between vertices 1006 and 1007). The "from edge," along with the stored indicated direction associated with currently selected face 1001, may be used to determine the vertices used to identify edges and faces to elimination when identifying candidate faces for selection.

Figure 10B:
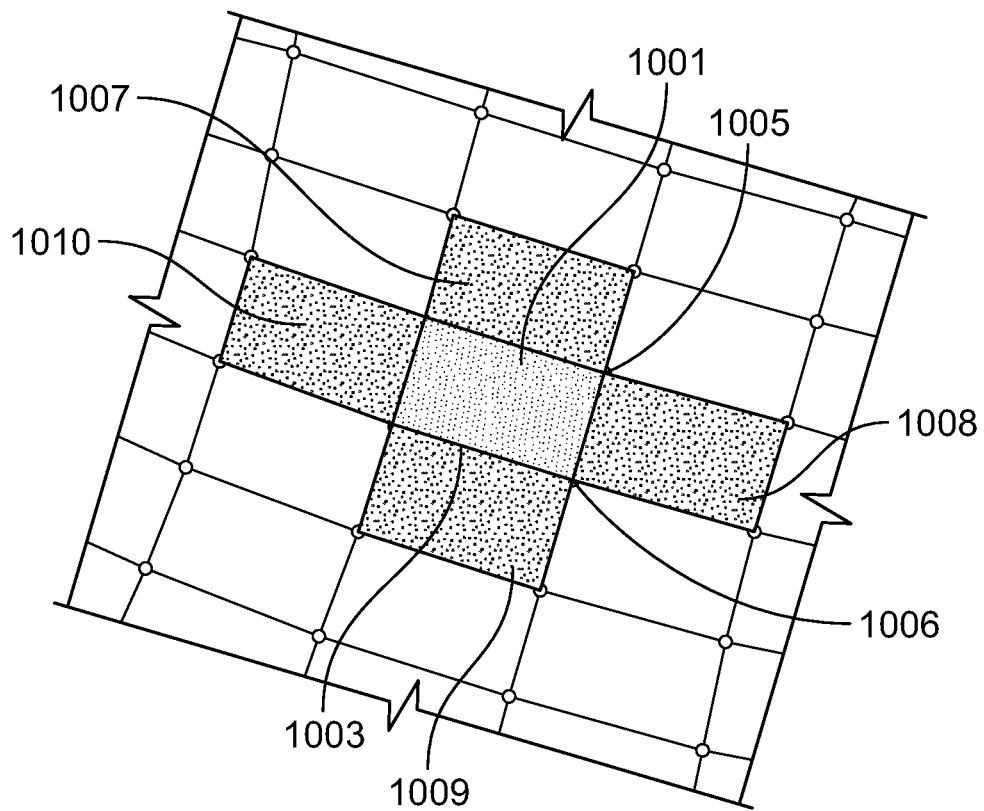

For example, referring to FIG. 10B, the stored indicated direction (of the previous traversal) may be stored as a vector from vertex 1006 to 1005. Since the newly received indicated direction is not moving backwards as determined based on the stored indicated direction, any candidate faces that share the "from edge" 1003 may be eliminated.

Figure 10C:
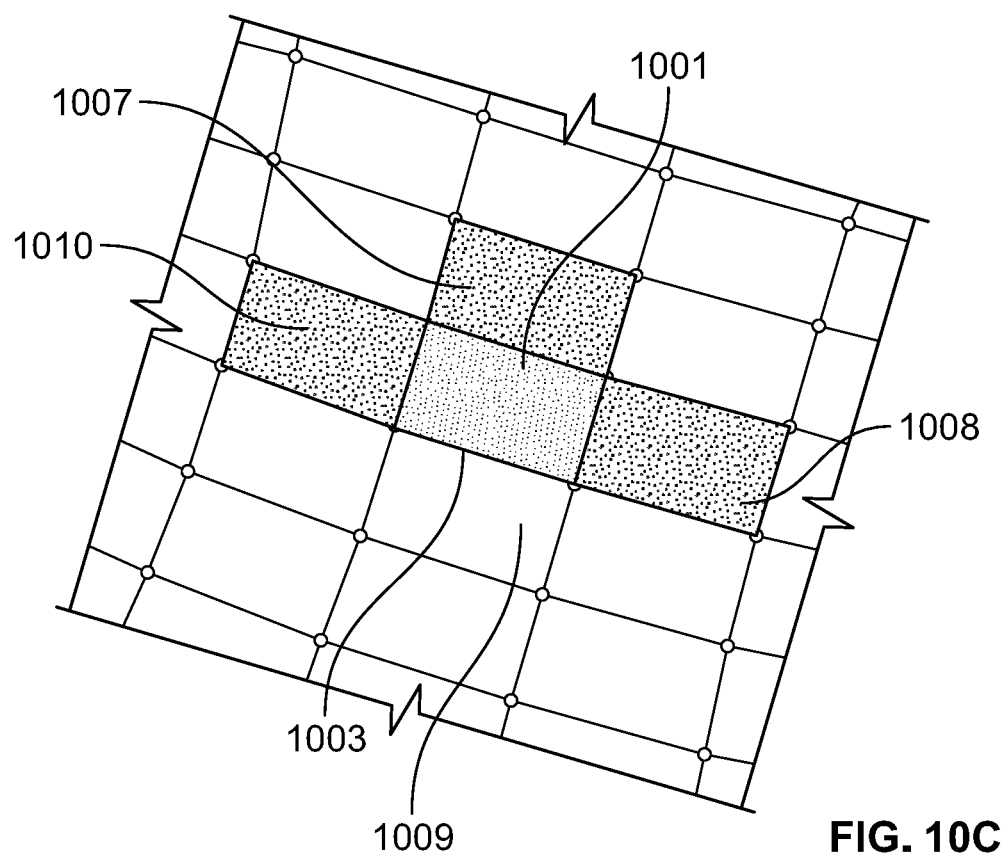

As shown in FIG. 10B, candidate faces 1007, 1008, 1009, 1010 may be identified based on currently selected face 1001. In FIG. 10C, the face 1009 corresponding to traversing back to the previous face may be eliminated from the candidate faces since it shares the "from edge" 1003. Additionally, all of the faces 1008, 1010 that share a vertex with the "from edge" are eliminated since the newly indicated direction is moving forward, and not changing directions.

Figure 10D:
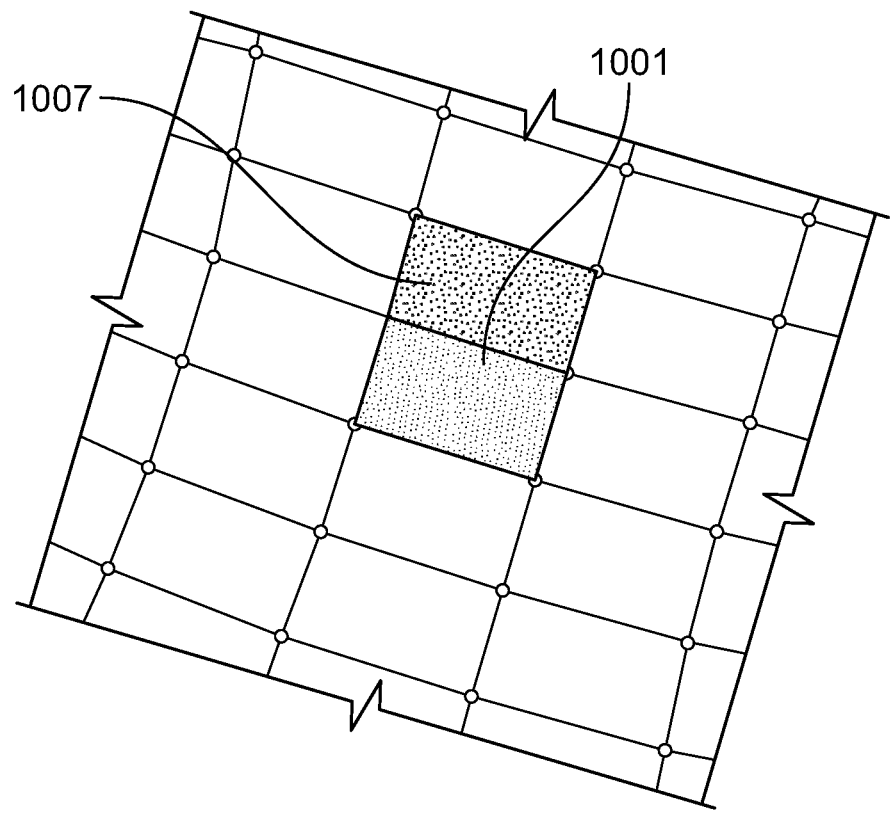

The next selected face will not share an edge or a vertex with the previous face since sharing an edge or vertex would require a change in direction (turning to a side of the currently selected face 1001), and it has been determined that the traversal is proceeding forward. Thus, all faces 1008, 1010 which share a vertex with the "from edge" 1003 are eliminated. As shown in FIG. 10D, there may be only one candidate face 1007 remaining after the other faces have been eliminated using the determinations above.

For comparison with the stored bearing vectors, an edge associated with a particular shared vertex of the currently selected face and each of the candidate faces may be used to determine a face vector for each candidate face traversal. For example, in FIG. 10D, a face vector from the upper right (or upper left) vertex of face 1001 (in the display perspective) and extending toward candidate face 1007 may be used for evaluating candidate face 1007 in comparison with the stored bearing vectors. In other embodiments, the corresponding centers of each face may be used to determine a face vector between the faces for each candidate face traversal. For example, in the example of FIG. 10D, a face vector may be determined from the center of face 1001 to the center of face 1007 to evaluate candidate face 1007 with respect to the stored bearing vector. In other embodiments, for example if no center is defined for a particular face, a face vector may be defined based on an axis orthogonal to a shared edge between face 1001 and face 1007. In the example of FIG. 10D, the face vector corresponding to candidate face 1007 may be most similar to the stored bearing vector for the up direction, and face 1007 may be selected as the next face selection.

In the above embodiments, each traversal selection of a next component has been discussed in response to a particular input received which indicates a desired direction of traversal selection. However, other embodiments of the present disclosure include traversal selection of components which is expanded in a particular direction with limited or no additional input. For example, in one embodiment, a component of a geometric model may be initially selected (with respect to the display perspective), and in response to a particular input or a selected option, a repeated traversal selection may be performed and expanded in one direction from the initially selected component. The expanded traversal selection may terminate at a set length, it may continue until it loops back to the initially selected component, or it may continue until it reaches a point where additional traversal selection is not possible. These embodiments may enable a user to quickly and easily select a group of components for modification of the geometric model.

Referring to FIG. 11A, an example of the expanded traversal selection is shown. A portion corresponding to an eye and ear of a character is shown at 1100. A user may initially select initial vertex 1101*a*, for example with a mouse, a pointer, a stylus, or the like, as discussed above. Using an input modification key (for example, holding down a SHIFT key, or selecting a selectable option for expansion traversal selection), the vertices in one direction from the initial vertex 1101*a*, and the selection may be expanded until a predetermined limit of selections is reached at 1101*i*.

In other embodiments, once a direction of traversal expansion is determined (for example, after a traversal selection from 1101*a* to 1101*b* in response to a directional key input), the selection may be expanded in response to an expansion input without requiring the expansion input to indicate the direction of selection. For example, if 1101*b* is added to the selection from 1101*a* in response to a "down" direction key input, the selection may be expanded in the same direction in response to an expansion input, for example, a "page down" or "page up" key input or any other predetermined keyboard key, or in response to a scroll input, such as a scroll input via a mouse wheel or a touch trackpad.

Figure 11B:
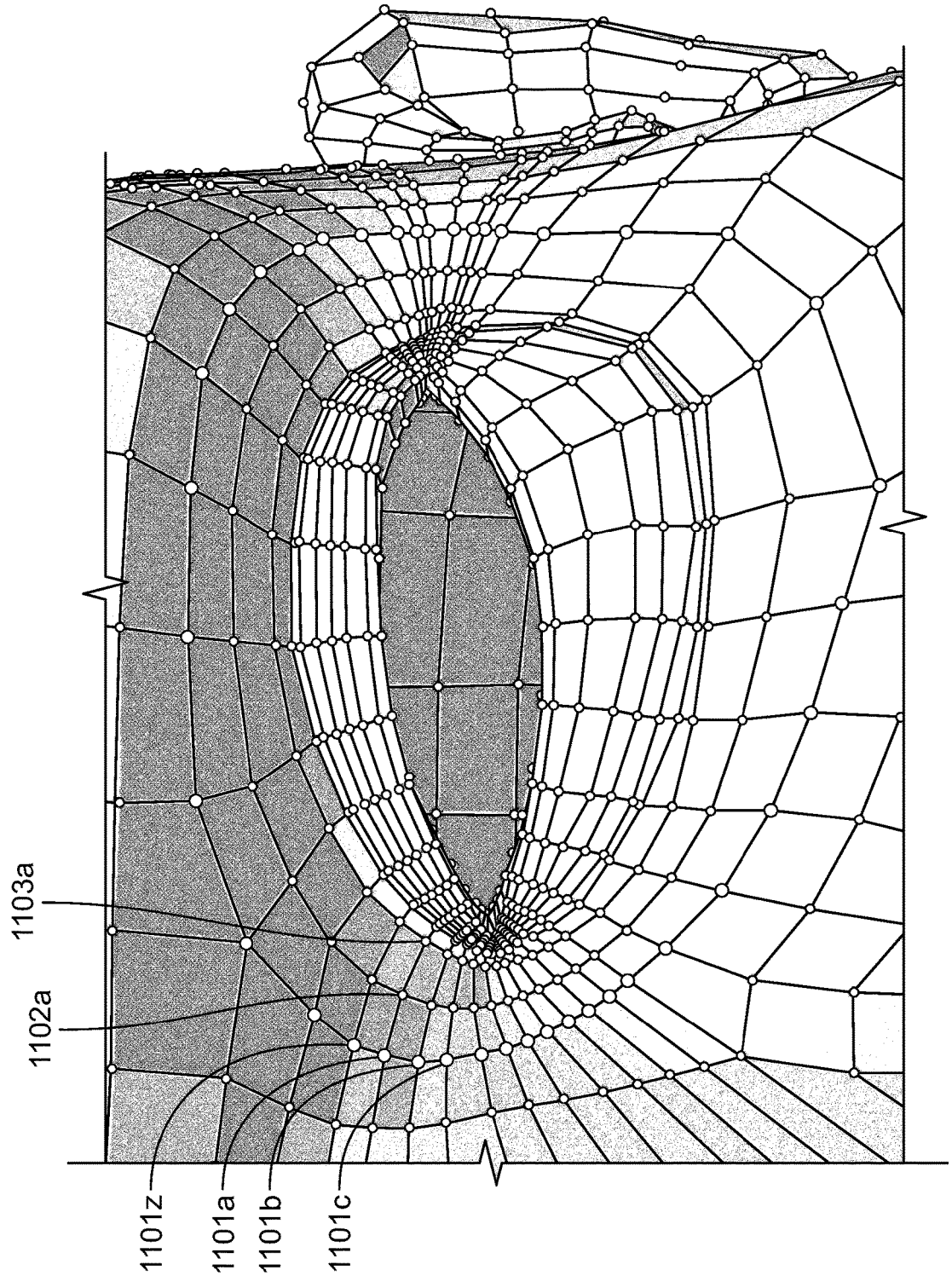

In other embodiments, the traversal selection may be automatically expanded in response to a single expand select input and continue until it reaches a point where additional traversal selection is not possible, or until the selection loops back to the initially selected component. Referring to FIG. 11B, an example of a traversal expansion selection is shown wherein the selection from FIG. 11A is expanded until the selection loops back to the initially selected vertex 1101*a*. In this example, after the initial selection of 1101*a*, a traversal expansion selection input may be received to perform selection of additional vertices in a direction toward 1101*b*. When the traversal expansion selection input is performed when a setting for unlimited expansion is set (or when the input is accompanied by an unlimited selection modifying input, for example, while holding down a particular key), the traversal expansion selection may automatically perform traversal selection in the selected direction (toward 1101*b*) and continue the traversal selection that particular direction. In the example shown in FIG. 11B, the selection will continue until it loops around the character's eye, and the selection may concluded with vertex 1101*z*, before returning to 1101*a*. In this manner, a user may quickly and easily select a ring of components around a particular feature of the character (such as an eye, or a loop around an arm or a leg) for modifying the geometric model.

In other embodiments, the direction of the traversal expansion selection may be changed. For example, referring again to FIG. 11B, instead of indicating the traversal expansion selection toward 1101*b*, the traversal expansion selection may be performed to the right (within display perspective), resulting in selection of vertices 1102*a*, 1103*a*, and so on. The direction of the traversal expansion selection may be selected based on any particular input for indicating a direction, or the direction of the expansion selection may be cycled through using an input such as a scroll input, where all of the vertices to be selected may be shown as highlighted when the particular direction is selected.

In some embodiments of the traversal expansion selection, the components to be selected may be displayed as highlighted or temporarily selected when an input for previewing the expansion selection in that direction is selected. The expansion selection may be modified during the highlighted preview mode, for example the limit of the expansion selection may be increased or decreased, thereby adding or subtracting components from the highlighted preview selection. When a particular previewed selection is acceptable, a user may input a final selection input (such as the ENTER key), to finalize the selection for modification of the geometric model.

The traversal expansion selection may also be used to select groups of other components of a geometric model, including edges and faces. For example, in FIG. 12A, an example of traversal expansion selection using edges is shown. In this example, edge 1201*a* may be initially selected. The traversal expansion selection may be performed toward the right of edge 1201*a*, resulting in selection of edges 1201*b*, 1201*c*, 1201*d*, and so on. The edges may be appended to the selection until the selection loops around and ends at edge 1201*z* which is connected to initially selected edge 1201*a*.

Figure 12A:
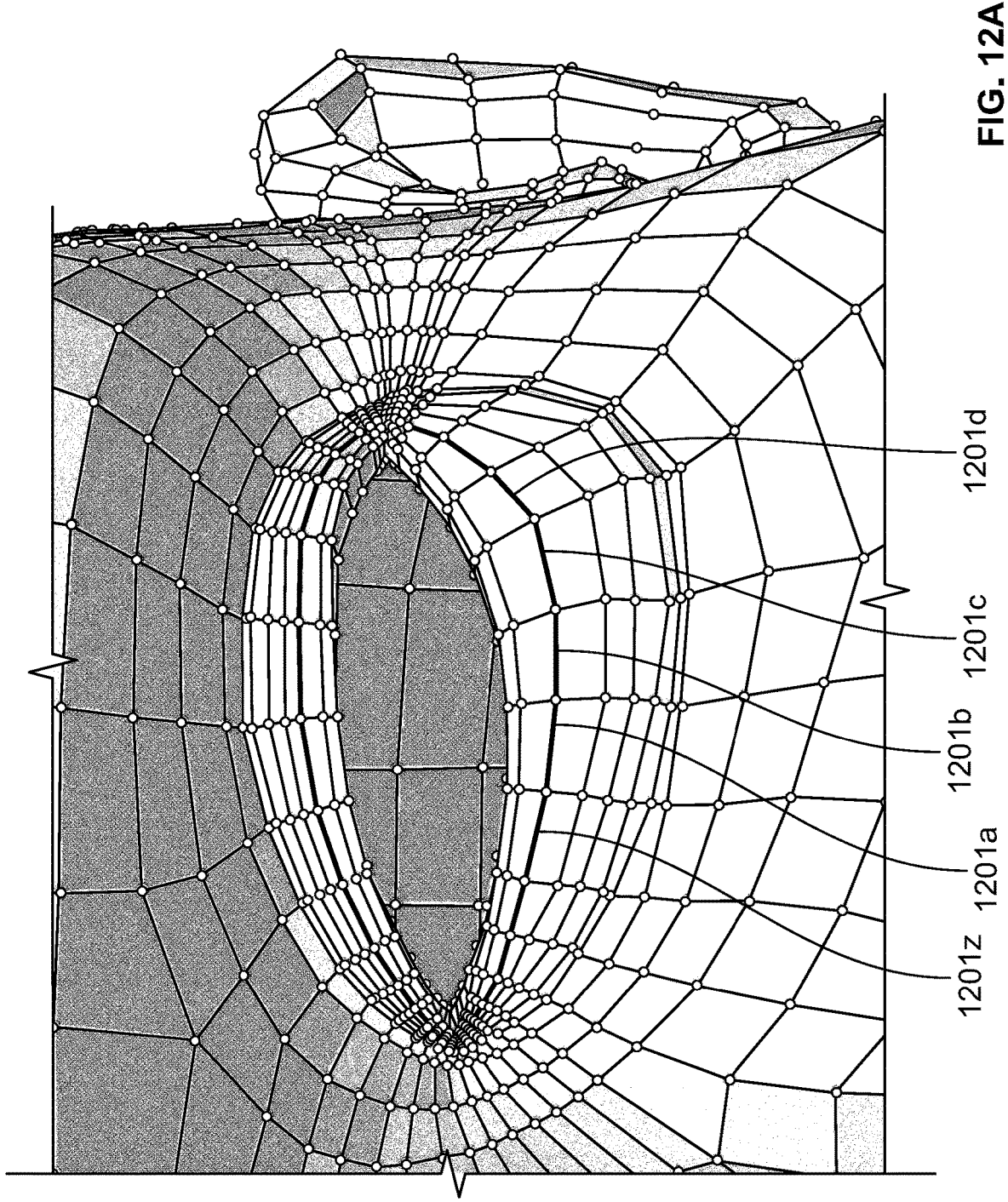
FIGS. 12A and 12B are illustrations of a method for expansion traversal selection of edges of a geometric model according to an embodiment of the present disclosure.
Figure 12B:
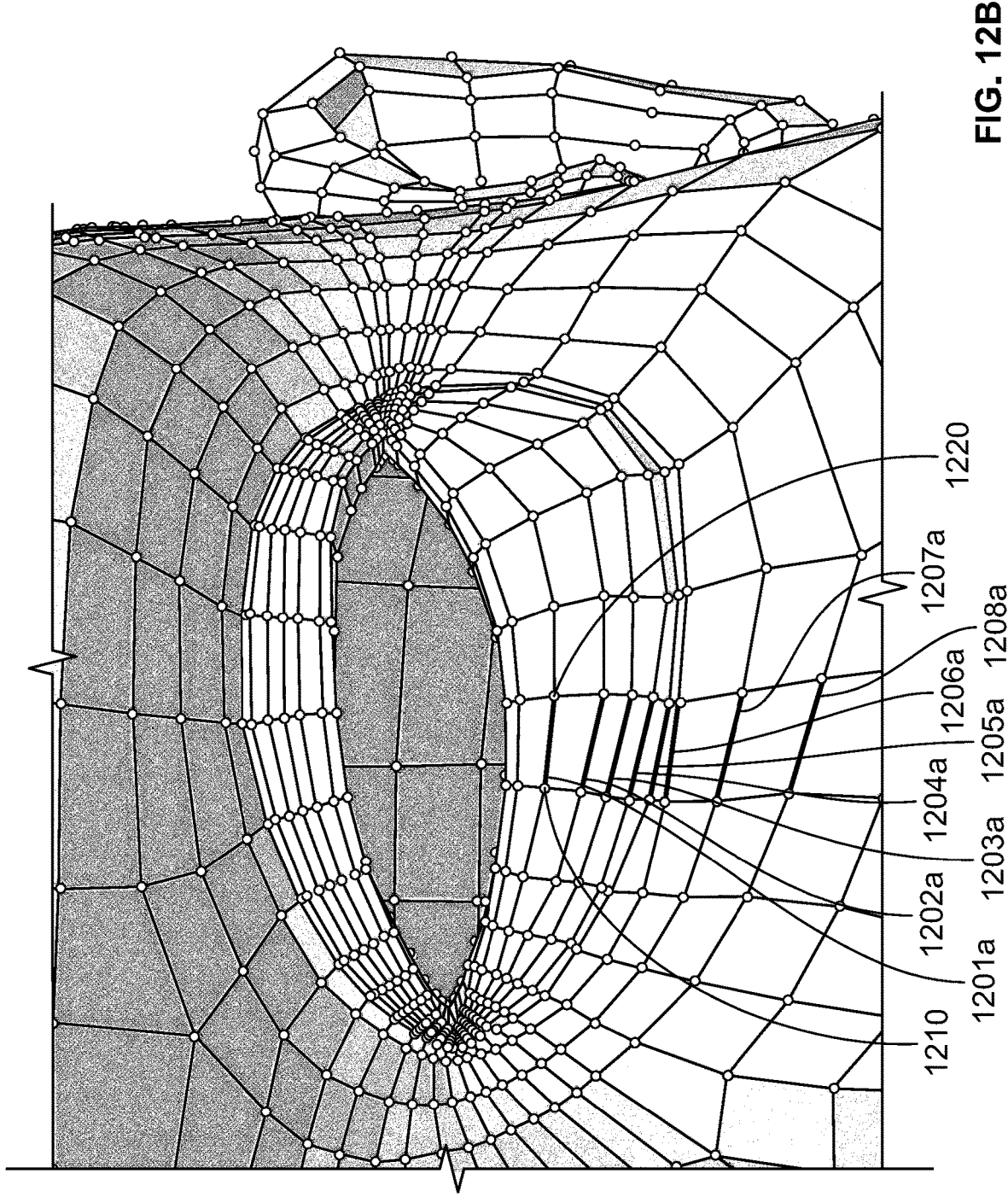

As discussed, the direction of the traversal selection expansion may also be changed. Referring to FIG. 12B, an example is shown where the traversal expansion selection as discussed in FIG. 12A is changed so that the selection direction proceeds down (in the display perspective) instead of to the right (as in FIG. 12A). After the initial selection of edge 1201*a*, if the traversal expansion selection is indicated to be performed in the down direction, the traversal selection may proceed to select edge 1202*a*, 1203*a*, 1204*a*, 1205*a*, and so on. This may be referred to as a "ladder edges" selection, since the selected edges resemble the rungs on a ladder. In other embodiments, changing the direction of the traversal expansion selection to "down" may simply select the edges that are connected in a downward direction to one of the vertices 1210, 1220 of edge 1201*a*, instead of selecting the ladder edges in that particular direction.

Figure 13A:
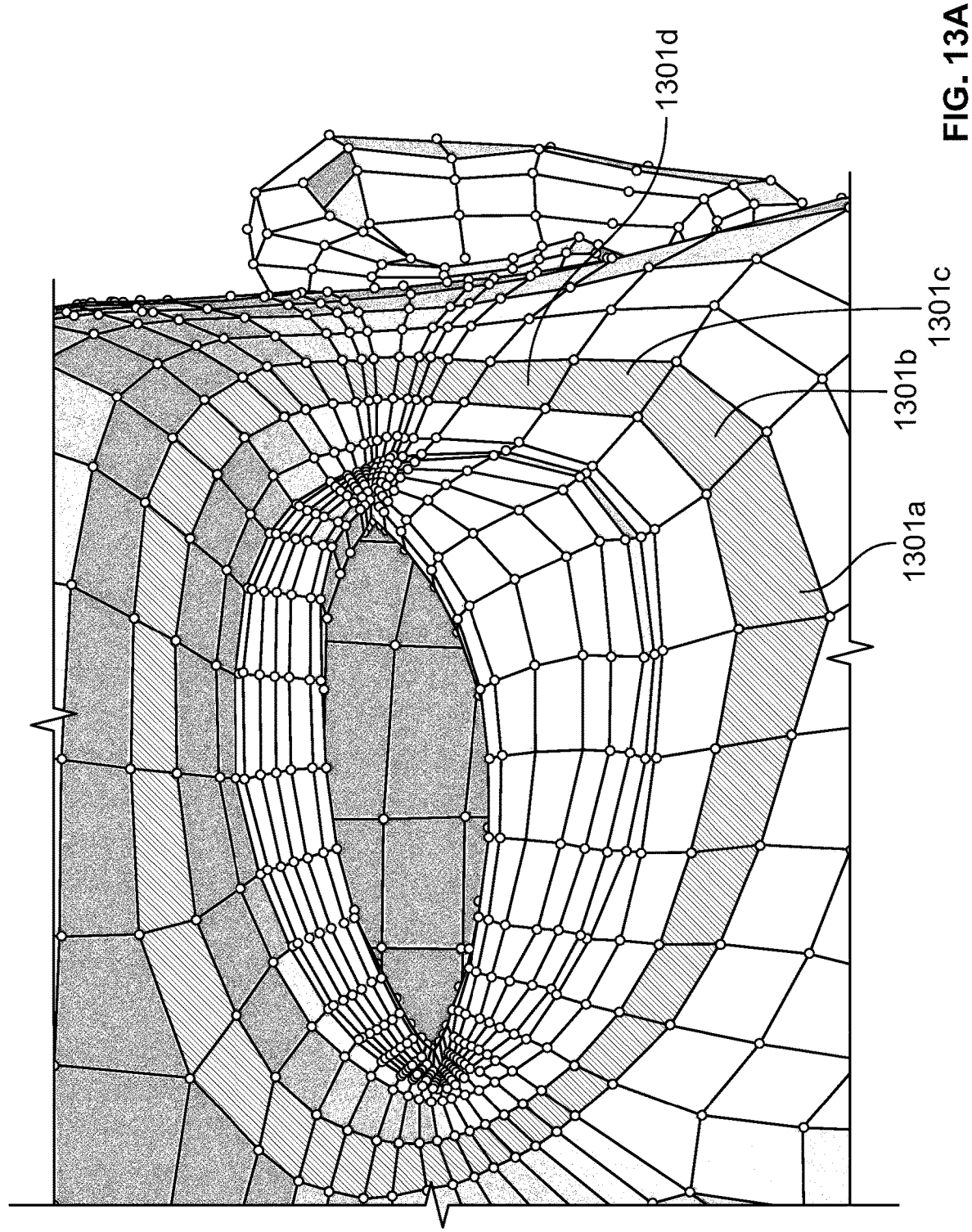
FIGS. 13A and 13B are illustrations of a method for expansion traversal selection of faces of a geometric model according to an embodiment of the present disclosure.

FIG. 13A shows an example of traversal expansion selection using faces. For example, face 1301*a* may be initially selected, and traversal expansion selection may be performed from the initially selected face 1301*a* in a particular direction. In the example of FIG. 13A, the traversal expansion selection may be performed in the right direction (in the display perspective) toward next faces 1301*b*, 1301*c*, 1301*d*, and so on, or it may be performed in the left direction (in the display perspective), resulting in the same selection of the ring of selected faces around the character's eye. As discussed, the selection of the ring of faces may be highlighted during a preview mode, and the selection may be finalized in response to a final selection input.

Figure 13B:
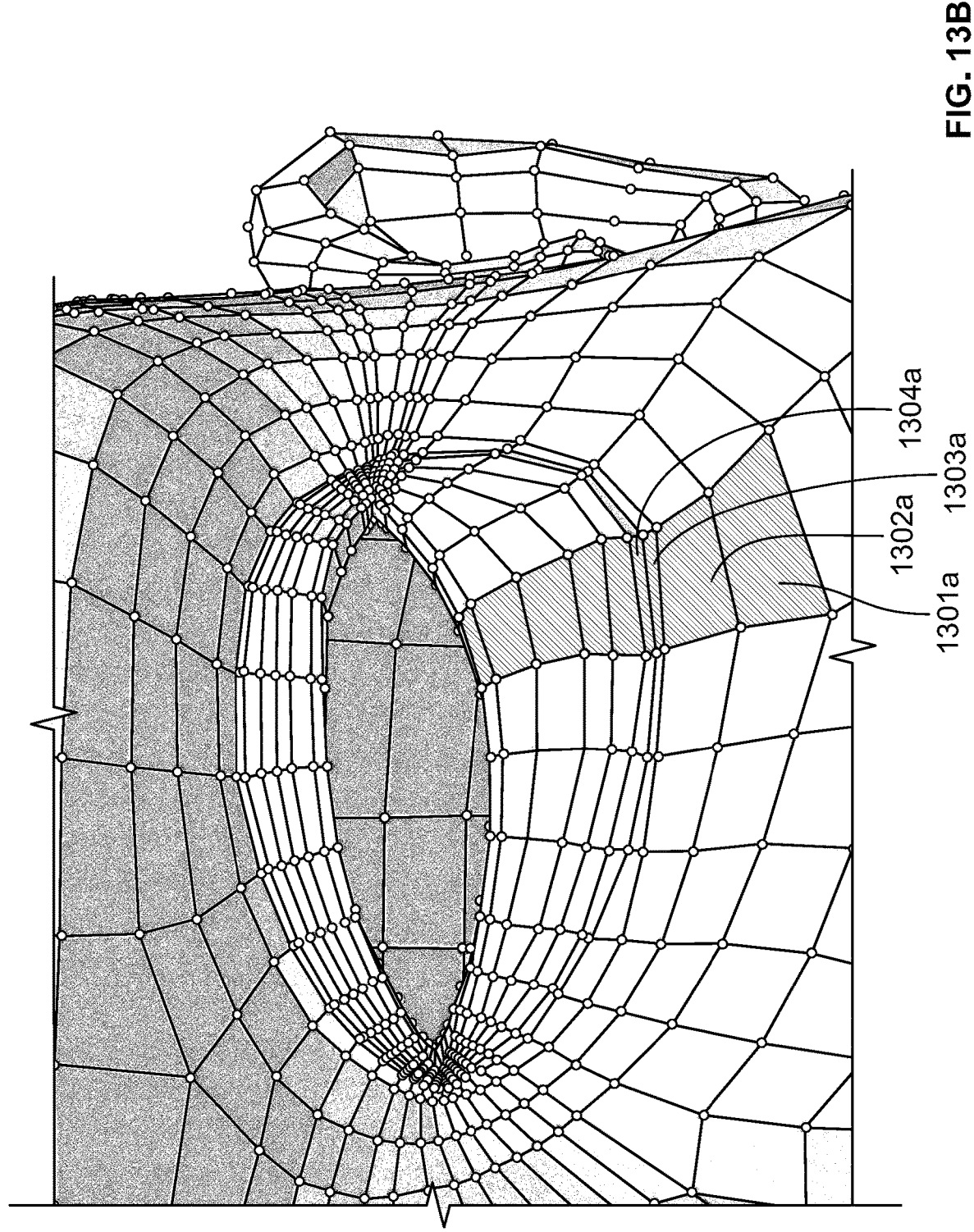

The traversal expansion selection of faces may also be changed in direction of the selection. For example, referring to FIG. 13B, the traversal expansion selection may be performed in an up direction (in display perspective) resulting in a selection of faces upward from 1301*a*, toward next faces 1302*a*, 1303*a*, 1303*a*, 1304*a*, and so on, as shown in FIG. 13B. The direction of selection may be cycled through, such that each change of direction results in a different previewed highlighted selection of faces.

Figure 14:
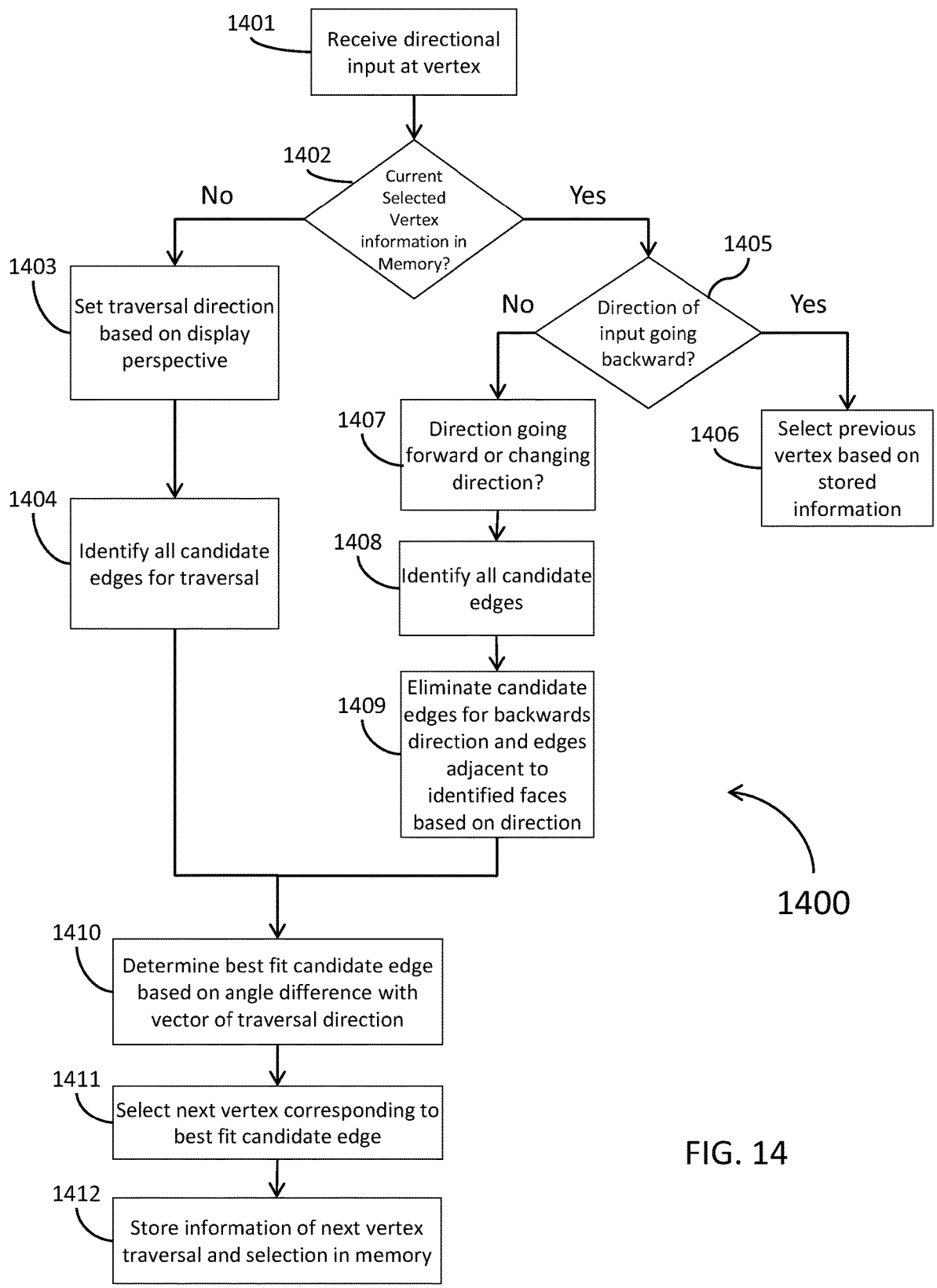
FIG. 14 is a flowchart illustration of a method for selecting components of a geometric model according to an embodiment of the present disclosure.

Referring now to FIG. 14, a flowchart 1400 depicting an example of an embodiment of the present disclosure is provided. At block 1401, a directional input may be received when a particular vertex is currently selected. As discussed in the example of FIG. 2A-2D, the selected vertex may be the initial vertex selected via an input including a mouse click, keyboard selection, touchscreen input, stylus input, virtual reality interface input, or the like. The directional input received may correspond to a directional arrow key input, a directional movement of a mouse, stylus, virtual reality interface device, or the like, as previously discussed.

Once the directional input is received, it is determined at block 1402 whether information of the currently selected vertex is stored in the memory. If the currently selected vertex was the initial vertex selected, as discussed with respect to FIG. 2A, information of the selected vertex may not be stored in the memory.

If no information of the selected vertex is in the memory, the method may proceed to block 1403, wherein the direction indicated by the directional input is set as the traversal direction with respect to the displayed perspective. For example, as in FIG. 2B, since no information of the initial vertex 201 is stored in memory, the direction indicated by the up key input is used as the traversal direction, which corresponds to an upward vertical direction as displayed in the display perspective.

Next, all candidate edges of the selected vertex are identified at block 1404. For example, in FIG. 2C, all edges

203, 204, 205, 206 connected to the selected vertex are identified as potential edges for traversal to select the next vertex.

Returning to block 1402, if information of the selected vertex is stored in the memory, the method proceeds to determination 1405 where a previously traversed direction is compared with the direction indicated by the received directional input. If the direction of the received directional input is opposite to the previously traversed direction, it is determined at 1405 that the selection is going backwards to the previously selected vertex. Accordingly, at block 1406, the previously selected vertex is selected as the next vertex.

If the direction of the received directional input is not the opposite of the stored previously traversed direction at 1405, a determination is made at 1407 whether the selection corresponds to the same direction as the previously traversed direction (as stored in the memory and associated with the currently selected vertex)—and therefore continuing "forward" as in the example of FIG. 4—or whether the selection corresponds to a different direction as the previously traversed direction—and therefore changing direction as in the example of FIG. 7. All candidate edges of the selected vertex are then identified at block 1408. For example, as discussed in the example of FIG. 4A, the candidate edges 401, 402, 403, 404 are identified that are potential edges for traversing to select the next vertex.

Thereafter at block 1409, some of the candidate edges are eliminated. For example, a candidate edge corresponding to traversing backward is eliminated, as discussed in the example of FIG. 4B. Further, if the direction indicated by the directional input is determined to be continuing "forward," edges corresponding to changing direction are eliminated at 1409. Accordingly, as discussed in the example of FIG. 4C, faces 405, 406 of the 3D model may be identified which are adjacent to the stored previously traversed edge (as stored in the memory and associated with the currently selected vertex), and all candidate edges which are adjacent to the identified faces 405, 406 are eliminated (402 and 404 in FIG. 4C) since the next traversal will not turn a corner of either of the identified faces.

Similarly, if the direction indicated by the directional input is determined to be changing direction, edges corresponding to continuing forward are eliminated at 1409. Accordingly, as discussed in the example of FIG. 7D, faces 707, 708 of the 3D model may be identified which are adjacent to the stored previously traversed edge (as stored in the memory and associated with the currently selected vertex), and all candidate edges which are not adjacent to the identified faces 707, 708 are eliminated (705 in FIG. 7D) since the next traversal will be turning a corner of one of the identified faces.

Once the remaining candidate edges have been identified, either at block 1404 or 1409, the method may further include determining a best fit of the candidate edges to a traversal direction vector corresponding to the traversal direction indicated by the directional input at block 1410. If no bearing vectors are stored in the memory (e.g., if coming from block 1404), the traversal direction vector may correspond to a direction indicated by the directional input as defined within the display perspective. If one or more bearing vectors are stored in the memory (e.g., if coming from block 1409), the traversal direction vector may be set to one of the directional bearing vectors that are stored to correspond to the previously traversed direction as defined within the 3D model space, as discussed in the example of FIG. 6F.

Each candidate edge may be compared to determine which edge forms the smallest angle of difference with the traversal direction vector. Once a best fit candidate edge is identified, the vertex connected to the currently selected vertex by the best fit candidate edge may be selected as the next vertex, at block 1411.

At block 1412, information of the next vertex traversal and selection may be stored in the memory, including an identifier of the next vertex, the best fit candidate edge, the direction indicated by the directional input, one or more bearing vectors defining directions with respect to the 3D model space, and the like, as discussed in previous examples above. As discussed, the selection of the next vertex may result in appending the next vertex to a grouped selection of vertices, or in other embodiments, the next vertex may be selected and the previous vertex may be de-selected in order to traverse the topology of the 3D model. Once the desired vertex or grouped selection of vertices is selected, a user may perform one or more modeling, animation, or rigging actions on the selected vertex/vertices, as known to those of ordinary skill in the related art.

The example of the embodiment shown in FIG. 14 may also be implemented in selecting or traversing other components of a 3D model, including traversing and selecting edges and faces of the 3D model as previously discussed.

Figure 15:
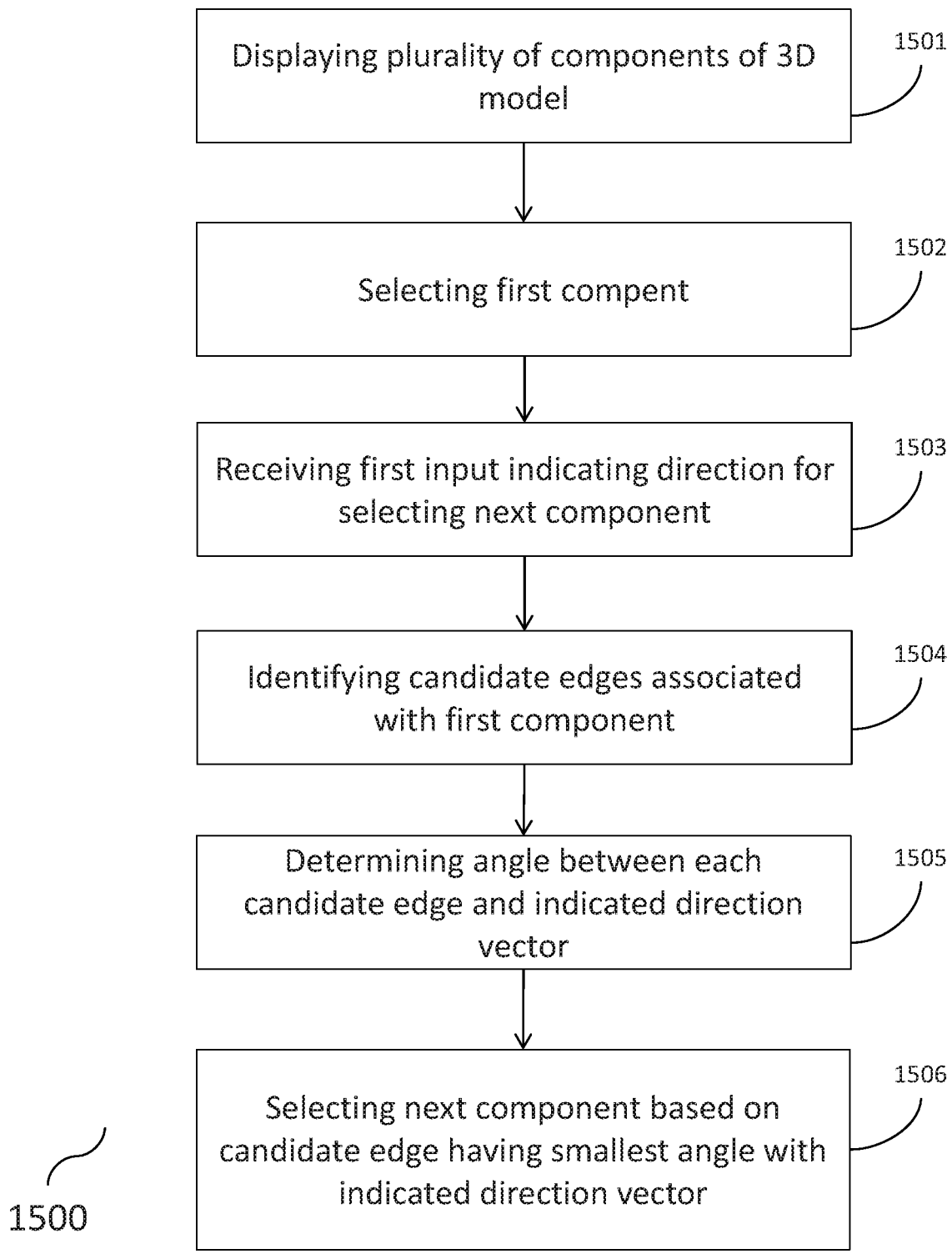
FIG. 15 is a flowchart illustration of a method for selecting components of a geometric model according to another embodiment of the present disclosure.

Referring now to FIG. 15, a flowchart depicting another embodiment of a method 1500 for selecting a next vertex based on a 3D model topology is provided. The method may include, at block 1501, displaying a plurality of components of a 3D model. For example, as discussed with respect to FIG. 1 and FIG. 2A, a terminal may display an interface for traversing, selecting, and performing rigging or other animation actions on components of a displayed 3D model.

The method may further include, at block 1502, selecting a first component of the displayed plurality of components. For example, in FIG. 2A, an initial vertex 201 may be selected by inputs such as a mouse click, keyboard selection, stylus selection, touchscreen selection, or the like, as previously discussed. In other examples, the selecting of the first component at block 1502 may correspond to a selection resulting from a traversal from another component, as in the example of FIGS. 4A-4D.

The method may further include, at block 1503, receiving a first input indicating a first direction for selecting a next component of the plurality of components, wherein the next component is connected to the first component by an edge. For example, in FIG. 2B, an up key input may be received indicating an up direction for traversing and selecting the next vertex.

The method may further include, at block 1504, identifying one or more candidate edges connected to the first component for selecting the next component. For example, in FIG. 2C, candidate edges 203, 204, 205, 206 that are connected to the selected vertex 201 may be identified as potential edges for traversing to select the next vertex.

The method may further include, at block 1505, determining an angle between an indicated direction vector corresponding to the indicated first direction and each of the one or more candidate edges. In some embodiments, the indicated direction vector may be based on the direction indicated by the directional input with respect to a displayed perspective. For example, in FIG. 2C, the indicated direction vector may correspond to the up display direction 202. In other embodiments, the indicated direction vector may set a stored directional bearing vector which is based on a previous traversal and vertex selection. The stored directional bearing vector may define and store a particular indicated direction with respect to the 3D model space.

The method may further include, at block 1506, selecting a second component as the next component, wherein the second component is connected to the first component via a particular candidate edge forming a smallest angle with the indicated direction vector among all of the one or more candidate edges. For example, in FIG. 6F, candidate edge 605 is determined to form a smaller angle with the indicated direction vector 610 than the candidate edge 606. Accordingly, the vertex 611, corresponding to the candidate edge 605, may be selected, as shown in FIG. 6G.

Figure 16:
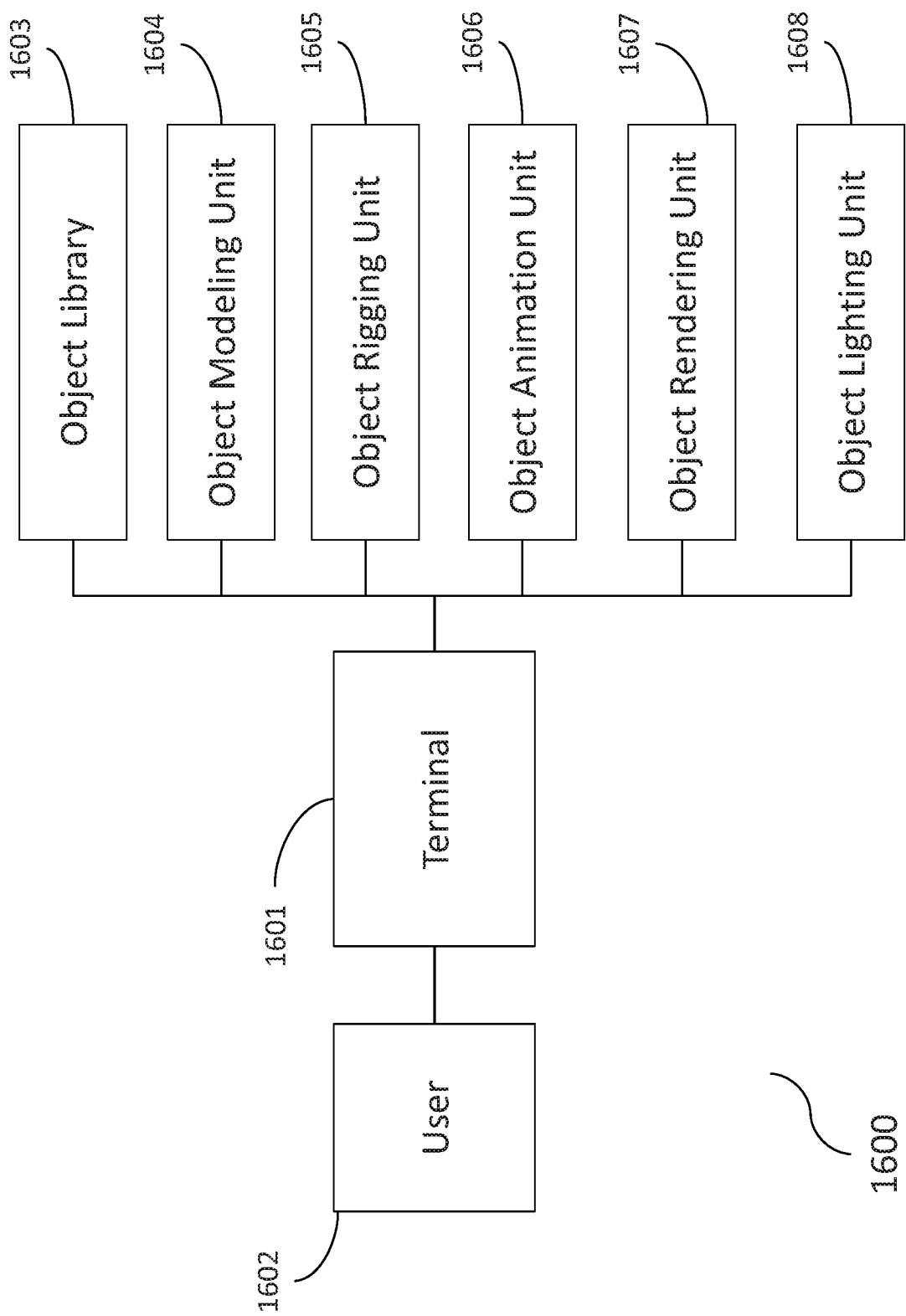
FIG. 16 is a diagram of a system which may be implemented according to an embodiment of the present disclosure.

Referring now to FIG. 16, a simplified block diagram of a system 1600 for creating computer graphics imagery (CGI) and computer-aided animation is shown that may implement or incorporate various embodiments of the present disclosure. The system 1600 may include one or more terminals 1601. The one or more terminals 1601 may include hardware and software elements configured for designing CGI and assisting with computer-aided animation. The terminals 1601 may be implemented as a single computing device or a set of one or more computing devices, corresponding to computer hardware and/or software.

Examples of terminals 1601 may be desktop computers, laptop computers, workstation computers, mainframes, cluster computing systems, cloud computing terminals, embedded computing devices, computer graphics devices, gaming devices and consoles, video media playback devices, consumer electronic devices having programmable processors, or the like. The one or more terminals 1601 may be utilized at various stages of a production process, including pre-production, modeling, designing, creating, editing, simulating, animating, rendering, post-production, finishing, publishing, and the like, to produce recordings, computer files, tangible materials, and the like, related to or comprising images, image sequences, motion pictures, video, audio, or associated effects related to CGI and animation.

In an example of system 1600, a user 1602 may utilize the one or more terminals 1601 to design, create, or modify objects within a computer-generated interface displayed on display associated with the terminal 1601.

The terminal may implement, include, or otherwise be in operable communication with, systems and units including object library 1603, object modeling unit 1604, object rigging unit 1605, object animation unit 1606, object rendering unit 1607, and object lighting unit 1608. Object library 1603 may include software and/or hardware elements configured for storing and accessing information related to objects to be accessed, requested, retrieved, and/or used by the one or more terminals 1601 to design, create, and modify 3D models of objects in the CGI and animation processes.

Object modeling unit 1604 may include software and/or hardware elements and information to be accessed, requested, retrieved, and/or used by the one or more terminals 1601 to sculpt and design the 3D model to take on the desired appearance as instructed by user 1602, or other terminal operator during the CGI and animation process.

Object rigging unit 1605 may include software and/or hardware elements and information to be accessed, requested, retrieved, and/or used by the one or more terminals 1601 to design, create, or modify components of 3D models to define articulation points and movement ranges of various elements of the 3D model.

Object animation unit 1606 may include software and/or hardware elements and information to be accessed, requested, retrieved, and/or used by the one or more terminals 1601 to design, create, or modify animation aspects of a 3D model, including specifying the motion and position of various elements of the 3D model over time during the animation, such as specifying animation paths, cues, or the like or generating key frames or intermediary frames for animated motion of the 3D model.

Object rendering unit 1607 may include software and/or hardware elements and information to be accessed, requested, retrieved, and/or used by the one or more terminals 1601 to design, create, or modify a final appearance of the animated 3D model, including generating one or more images of one or more computer-generated objects, including textures, colors, rigging, controls, and the like.

Object lighting unit 1608 may include software and/or hardware elements and information to be accessed, requested, retrieved, and/or used by the one or more terminals 1601 to design, create, or modify lighting aspects of a 3D model and animated scenes, including defining lighting sources, shading, reflections, refractions, textures, colors, and the like.

The one or more terminals 1601 may be in communication with one or more server computers which may operatively in communication with one or more data stores (e.g., databases, indexes, files, or other data structures). The one or more server computers may connect to a data communication network comprising a local area network (LAN), a wide area network (WAN) (e.g., the Internet), a telephone network, a satellite or wireless communication network, or some combination of these or similar networks.

In selected embodiments, the one or more server computers may implement one or more processes, systems, or units of the animation system, including object library 1603, object modeling unit 1604, object rigging unit 1605, object animation unit 1606, object rendering unit 1607, object lighting unit 1608, and the like. The one or more terminals 1101, the one or more server computers, or any other aspect of the system 1600, may be associated or coupled with a display configured to display information, including a displayed interface for displaying, performing, executing, instructing, reviewing, and/or selecting operations of the present disclosure.

Figure 17:
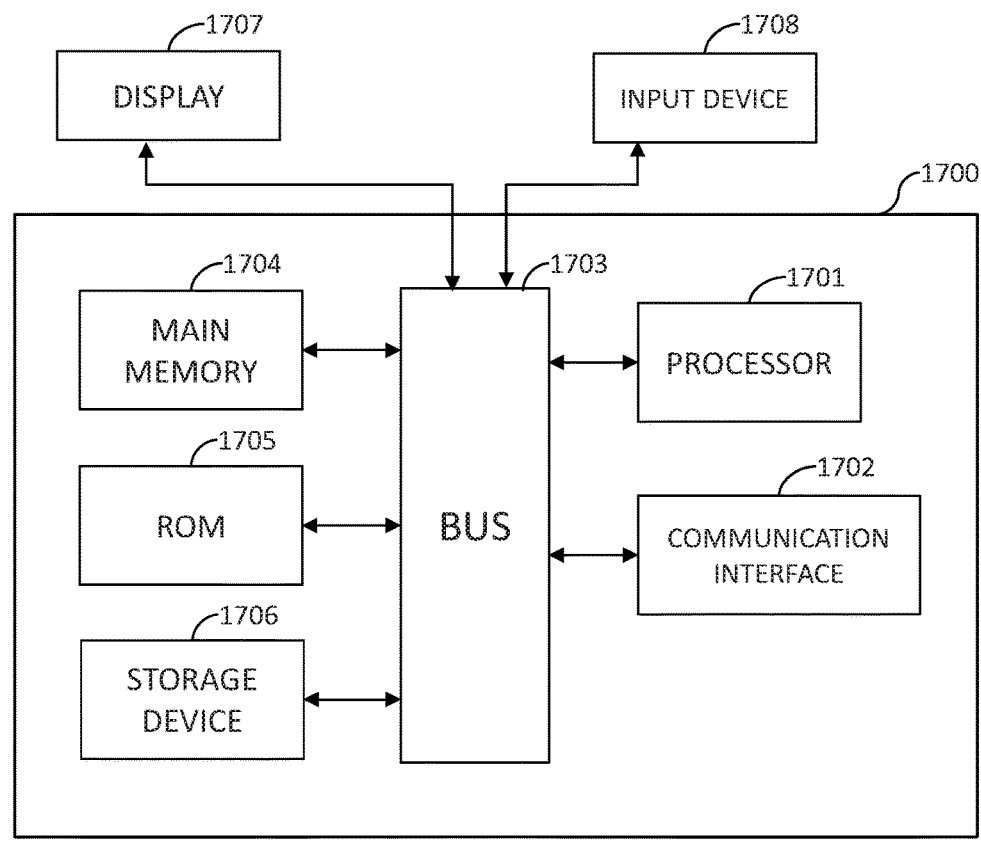
FIG. 17 is a diagram of an apparatus which may be implemented according to an embodiment of the present disclosure.

Referring to FIG. 17, an illustration of an example computer 1700 is provided. One or more of aspects of the system 1600 discussed above in FIG. 16, such as the one or more terminals 1600 or the one or more server computers, may be configured as or include such a computer 1700. In selected embodiments, the computer 1700 may include a bus 1703 (or multiple buses) or other communication mechanism, a processor 1701, main memory 1704, read only memory (ROM) 1705, one or more additional storage devices 1706, and/or a communication interface 1702, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 1703 or other communication mechanism, including multiple such buses or mechanisms, may support communication of information within the computer 1700. The processor 1701 may be connected to the bus 1703 and process information. In selected embodiments, the processor

1701 may be a specialized or dedicated microprocessor configured to perform particular tasks in accordance with the features and aspects disclosed herein by executing machine-readable software code defining the particular tasks. Main memory 1704 (e.g., random access memory—or RAM—or other dynamic storage device) may be connected to the bus 1703 and store information and instructions to be executed by the processor 1701. Main memory 1704 may also store temporary variables or other intermediate information during execution of such instructions.

ROM 1205 or some other static storage device may be connected to a bus 1703 and store static information and instructions for the processor 1701. An additional storage device 1706 (e.g., a magnetic disk, optical disk, memory card, or the like) may be connected to the bus 1703. The main memory 1704, ROM 1705, and the additional storage device 1706 may include a non-transitory computer-readable medium holding information, instructions, or some combination thereof, for example instructions that when executed by the processor 1701, cause the computer 1700 to perform one or more operations of a method as described herein. A communication interface 1702 may also be connected to the bus 1703. A communication interface 1702 may provide or support two-way data communication between a computer 1700 and one or more external devices (e.g., other devices contained within the computing environment).

In selected embodiments, the computer 1700 may be connected (e.g., via a bus) to a display 1707. The display 1707 may use any suitable mechanism to communicate information to a user of a computer 1700. For example, the display 1707 may include or utilize a liquid crystal display (LCD), light emitting diode (LED) display, projector, or other display device to present information to a user of the computer 1700 in a visual display. One or more input devices 1708 (e.g., an alphanumeric keyboard, mouse, microphone) may be connected to the bus 1703 to communicate information and commands to the computer 1700. In selected embodiments, one input device 1708 may provide or support control over the positioning of a cursor to allow for selection and execution of various objects, files, programs, and the like provided by the computer 1700 and displayed by the display 1707.

The computer 1700 may be used to transmit, receive, decode, display, or the like one or more video files. In selected embodiments, such transmitting, receiving, decoding, and displaying may be in response to the processor 1701 executing one or more sequences of one or more instructions contained in main memory 1704. Such instructions may be read into main memory 1704 from another non-transitory computer-readable medium (e.g., a storage device).

Execution of sequences of instructions contained in main memory 1704 may cause the processor 1701 to perform one or more of the procedures or steps described herein. In selected embodiments, one or more processors in a multi-processing arrangement may also be employed to execute sequences of instructions contained in main memory 1704. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 1701, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 1702 may provide or support external, two-way data communication to or via a network link. For example, a communication interface 1702 may be a wireless network interface controller or a cellular radio providing a data communication network connection. Alternatively, a communication interface 1702 may comprise a local area network (LAN) card providing a data communication connection to a compatible LAN. In any such embodiment, a communication interface 1702 may send and receive electrical, electromagnetic, or optical signals conveying information.

A network link may provide data communication through one or more networks to other data devices (e.g., one or more terminals 1601 as shown in the system 1600). For example, a network link may provide a connection through a local network of a host computer or to data equipment operated by an Internet Service Provider (ISP). An ISP may, in turn, provide data communication services through the Internet. Accordingly, a computer 1700 may send and receive commands, data, or combinations thereof, including program code, through one or more networks, a network link, and communication interface 1702. Thus, the computer 1700 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for selecting components of a geometric model, the method comprising:

displaying a plurality of components corresponding to a geometric model;

selecting a first component of the displayed plurality of components;

receiving a first input of a first next direction for selecting a next component of the plurality of components;

identifying one or more candidate edges associated with the first component for selecting the next component;

determining an angle between a next direction vector corresponding to the first next direction and each of the one or more candidate edges;

selecting a second component as the next component wherein the second component is associated with a particular candidate edge forming a smallest angle with the next direction vector among the one or more candidate edges;

storing selection history information of the selection of the second component in a memory, wherein the stored selection history information comprises an identifier of the selected second component, the particular candidate edge forming the smallest angle with the next direction vector used to select the second component, and the first next direction input for selecting the second component; and displaying an indication of the selection of the second component as the next component.

2. The method of claim 1, wherein the stored selection history information of the second component further comprises at least a first bearing vector defining a first direction relative to the second component and a second bearing vector defining a second direction relative to the second component.

3. The method of claim 1, further comprising determining whether selection history information of the first component is stored in the memory when the first input is received, wherein when selection history information of the first component is not stored in the memory, the next direction vector is set to the first next direction with respect to a display perspective of the displayed plurality of components.

4. The method of claim 1, further comprising:
receiving a second input after the second component is selected, the second input comprising a second next direction for selecting another next component of the plurality of components;

determining whether selection history information of the second component is stored in a memory;

when selection history information of the second component is stored in the memory:

determining whether the second next direction is the same as a stored direction previously input for selecting the second component as indicated by the stored selection history information of the second component; and when the second next direction is the same as the stored direction, determining that the second input is for moving forward to the another next component.

5. The method of claim 4, further comprising:
setting a direction of the next direction vector to a direction of a first bearing vector stored in the selection history information in the memory, wherein the first bearing vector defines the second next direction relative to the second component.

6. The method of claim 5, further comprising:
identifying one or more candidate edges for selecting the another next component;

determining an angle between the next direction vector and each of the one or more candidate edges; and selecting a third component as the another next component wherein the third component is associated with a particular candidate edge forming a smallest angle with the next direction vector among all of the one or more candidate edges.

7. The method of claim 4, wherein when the second next direction is the opposite of the stored direction, the method further comprises:
determining that the second input is for moving backwards to the first component; and selecting the first component as the another next component.

8. The method of claim 4, wherein when the second next direction is different from the stored direction, the method further comprises:
determining whether the second next direction is the opposite of the stored direction; and determining that the second input is for changing directions for selecting the another next component when the second next direction is not the opposite of the stored direction.

9. The method of claim 8, further comprising:
identifying one or more candidate edges associated with the second component for selecting the another next component;

eliminating, from the one or more candidate edges, a previous edge which was traversed to previously select the second component, wherein the stored selection history information of the second component comprises the previous edge;

identifying one or more face components of the geometric model which are adjacent to the previous edge;

further eliminating, from the one or more candidate edges, edges which are not adjacent to the identified one or more face components;

setting a direction of the next direction vector to a direction of a particular bearing vector stored in the selection history information in the memory which corresponds to the second next direction, wherein the particular bearing vector defines the second next direction relative to the second component;

determining an angle between the next direction vector and each of a remaining one or more candidate edges; and selecting a third component as the another next component, wherein the third component corresponds to a particular candidate edge forming a smallest angle with the next direction vector among all of the remaining one or more candidate edges.

10. The method of claim 1, wherein the second component is added to a plurality of selected components including the first component and the method further comprises displaying an indication indicating the plurality of selected components.

11. The method of claim 10, further comprising repeatedly selecting additional next components in the first next direction and adding each selected additional next component to the plurality of selected components until the first component is reached or no additional next components are available in the first next direction.

12. A machine-readable non-transitory medium having stored thereon machine-executable instructions for:
displaying a plurality of components corresponding to a geometric model;

selecting a first component of the displayed plurality of components;

receiving a first input of a first next direction for selecting a next component of the plurality of components;

identifying one or more candidate edges associated with the first component for selecting the next component;

determining an angle between a next direction vector corresponding to the first next direction and each of the one or more candidate edges;

selecting a second component as the next component wherein the second component is associated with a particular candidate edge forming a smallest angle with the next direction vector among the one or more candidate edges;

storing selection history information of the selection of the second component in a memory, wherein the stored selection history information comprises an identifier of the selected second component, the particular candidate edge forming the smallest angle with the next direction vector used to select the second component, and the first next direction input for selecting the second component; and displaying an indication of the selection of the second component as the next component.

13. The machine-readable non-transitory medium of claim 12, further having stored thereon machine-executable instructions for determining whether selection history information of the first component is stored in the memory when the first input is received, wherein when selection history information of the first component is not stored in the memory, the next direction vector is set to the first next direction with respect to a display perspective of the displayed plurality of components.

14. The machine-readable non-transitory medium of claim 12, further having stored thereon machine-executable instructions for:

receiving a second input after the second component is selected, the second input comprising a second next direction for selecting another next component of the plurality of components; and determining that the second input is for moving forward to the another next component when selection history information of the second component is stored in the memory and the second next direction is the same as a stored direction previously input for selecting the second component as indicated by the stored selection history information of the second component.

15. The machine-readable non-transitory medium of claim 14, further having stored thereon machine-executable instructions for:

setting a direction of the next direction vector to a direction of a first bearing vector stored in selection history information in the memory, wherein the first bearing vector defines the second next direction relative to the second component;

identifying one or more candidate edges for selecting the another next component;

determining an angle between the next direction vector and each of the one or more candidate edges; and selecting a third component as the another next component wherein the third component is associated with a particular candidate edge forming a smallest angle with the next direction vector among all of the one or more candidate edges.

16. The machine-readable non-transitory medium of claim 14, further having stored thereon machine-executable instructions for wherein when the second next direction is the opposite of the stored direction:

determining that the second input is for moving backwards to the first component; and selecting the first component as the another next component.

17. The machine-readable non-transitory medium of claim 14, further having stored thereon machine-executable instructions for wherein when the second next direction is different than the stored direction:

determining whether the second next direction is the opposite of the stored direction;

determining that the second input is for changing directions for selecting the another next component when the second next direction is not the opposite of the stored direction;

identifying one or more candidate edges associated with the second component for selecting the another next component;

eliminating, from the one or more candidate edges, a previous edge which was traversed to previously select the second component, wherein the stored selection history information of the second component comprises the previous edge;

identifying one or more face components of the geometric model which are adjacent to the previous edge;

further eliminating, from the one or more candidate edges, edges which are not adjacent to the identified one or more face components;

setting a direction of the next direction vector to a direction of a particular bearing vector stored as a part of selection history information in the memory which corresponds to the second next direction, wherein the particular bearing vector defines the second next direction relative to the second component;

determining an angle between the next direction vector and each of a remaining one or more candidate edges; and selecting a third component as the another next component wherein the third component is associated with a particular candidate edge forming a smallest angle with the next direction vector among all of the remaining one or more candidate edges.

18. The machine-readable non-transitory medium of claim 12, further having stored thereon machine-executable instructions for:

adding the second component to a plurality of selected components including the first component;

displaying the plurality of selected components with a highlighted indication; and repeatedly selecting additional next components in the first direction and adding each selected additional next component to the plurality of selected components until the first component is reached or no additional next components are available in the first direction.

19. A method for selecting components of a geometric model, the method comprising:

displaying a plurality of face components corresponding to a geometric model;

selecting a first face component of the displayed plurality of face components;

receiving a first input of a first next direction for selecting a next face component of the plurality of face components;

identifying one or more candidate face components adjacent to the first face component for selecting the next face component;

determining an angle between a next direction vector corresponding to the first next direction and each of one or more face vectors originating from a center of the first face component to a center of each of the one or more candidate face components;

selecting a second face component as the next face component, wherein a face vector corresponding to the second face component forms a smallest angle with the next direction vector among all of the one or more face vectors;

storing selection history information of the second face component in a memory, wherein the stored selection history information comprises an identifier of the selected second face component, a particular edge of the first face component used to select the second face component, and the first next direction input for selecting the second face component; and displaying an indication of the selection of the second face component as the next face component.

20. The method of claim 19, wherein the stored selection history information of the second face component further comprises at least a first bearing vector defining a first direction relative to the second face component and a second bearing vector defining a second direction relative to the second face component.

21. The method of claim 19, further comprising determining whether selection history information of the first face component is stored in the memory when the first input is received, wherein when selection history information of the first face component is not stored in the memory, the next direction vector is set to the first next direction with respect to a display perspective of the displayed plurality of face components.

22. The method of claim 19, further comprising:
receiving a second input after the second face component is selected, the second input comprising a second next direction for selecting another next face component of the plurality of face components;
determining whether selection history information of the second face component is stored in a memory;
when selection history information of the second face component is stored in the memory:
determining whether the second next direction is the same as a stored direction previously input for selecting the second face component as indicated by the stored selection history information of the second face component; and
when the second next direction is the same as the stored direction, determining that the second input is for moving forward to the another next face component.

23. The method of claim 22, further comprising:
setting a direction of the next direction vector to a direction of a first bearing vector stored in the selection history information in the memory, wherein the first bearing vector defines the second next direction relative to the second face component.

24. The method of claim 23, further comprising:
identifying one or more candidate face components for selecting the another next face component;
determining an angle between the next direction vector corresponding to the first next direction and each of one or more face vectors originating from a center of the second face component to a center of each of the one or more candidate face components for selecting the another next face component; and
selecting a third face component as the another next face component, wherein a face vector corresponding to the third face component forms a smallest angle with the next direction vector among all of the one or more face vectors.

25. The method of claim 22, wherein when the second next direction is the opposite of the stored direction, the method further comprises:
determining that the second input is for moving backwards to the first face component; and
selecting the first face component as the another next component.

26. The method of claim 22, wherein when the second next direction is different than the stored direction, the method further comprises:
determining whether the second next direction is the opposite of the stored direction; and
determining that the second input is for changing directions for selecting the another next face component when the second next direction is not the opposite of the stored direction.

27. The method of claim 26, further comprising:
identifying one or more candidate face components adjacent to the second face component for selecting the another next component;
eliminating a previous face component which shares a particular edge with the second face component;
further eliminating, from the one or more candidate face components, one or more face components not sharing a vertex with the particular edge;
setting a direction of the next direction vector to a direction of a particular bearing vector stored in the selection history information in the memory which corresponds to the second next direction, wherein the particular bearing vector defines the second next direction relative to the second face component;
determining an angle between the next direction vector and each of one or more face vectors originating from a center of the second face component to a center of each of a remaining one or more candidate face components; and
selecting a third component as the another next component, wherein a face vector corresponding to the third face component forms a smallest angle with the next direction vector among all of the one or more face vectors.

28. The method of claim 19, wherein the second face component is added to a selected plurality of selected face components including the first face component and the method further comprises displaying the plurality of selected face components with a highlighted indication.

29. The method of claim 28, further comprising repeatedly selecting additional next face components in the first next direction and adding each selected additional next face component to the plurality of selected face components until the first face component is reached or no additional next face components are available in the first next direction.

30. A machine-readable non-transitory medium having stored thereon machine-executable instructions for:
displaying a plurality of face components corresponding to a geometric model;
selecting a first face component of the displayed plurality of face components;
receiving a first input of a first next direction for selecting a next face component of the plurality of face components;
identifying one or more candidate face components adjacent to the first face component for selecting the next face component;

determining an angle between a next direction vector corresponding to the first next direction and each of one or more face vectors originating from a center of the first face component to a center of each of the one or more candidate face components;

selecting a second face component as the next face component, wherein a face vector corresponding to the second face component forms a smallest angle with the next direction vector among all of the one or more face vectors;

storing selection history information of the second face component in a memory, wherein the stored selection history information comprises an identifier of the selected second face component, a particular edge of the first face component used to select the second face component, and the first next direction input for selecting the second face component; and displaying an indication of the selection of the second face component as the next face component.

31. The machine-readable non-transitory medium of claim 30, further having stored thereon machine-executable instructions for determining whether selection history information of the first face component is stored in the memory when the first input is received, wherein when selection history information of the first face component is not stored in the memory, the next direction vector is set to the first next direction with respect to a display perspective of the displayed plurality of face components.

32. The machine-readable non-transitory medium of claim 30, further having stored thereon machine-executable instructions for:
receiving a second input after the second face component is selected, the second input comprising a second next direction for selecting another next face component of the plurality of face components; and
determining that the second input is for moving forward to the another next face component when selection history information of the second face component is stored in the memory and when the second next direction is the same as a stored direction previously input for selecting the second face component as indicated by the stored selection history information of the second face component.

33. The machine-readable non-transitory medium of claim 32, further having stored thereon machine-executable instructions for:
setting a direction of the next direction vector to a direction of a first bearing vector stored in the selection history information in the memory, wherein the first bearing vector defines the second next direction relative to the second face component;
identifying one or more candidate face components adjacent to the second face component for selecting the another next face component;
determining an angle between the next direction vector corresponding to the first next direction and each of one or more face vectors originating from a center of the second face component to a center of each of the one or more candidate face components for selecting the another next face component; and
selecting a third face component as the another next face component, wherein a face vector corresponding to the third face component forms a smallest angle with the next direction vector among all of the one or more face vectors.

34. The machine-readable non-transitory medium of claim 32, further having stored thereon machine-executable instructions for wherein when the second next direction is the opposite of the stored direction:
determining that the second input is for moving backwards to the first face component; and
selecting the first face component as the another next component.

35. The machine-readable non-transitory medium of claim 32, further having stored thereon machine-executable instructions for wherein when the second next direction is different than the stored direction:
determining whether the second next direction is the opposite of the stored direction;
determining that the second input is for changing directions for selecting the another next face component when the second next direction is not the opposite of the stored direction;
identifying one or more candidate face components adjacent to the second face component for selecting the another next component;
eliminating, from the one or more candidate face components, a previous face component which shares a particular edge with the second face component;
further eliminating, from the one or more candidate face components, one or more face components not sharing a vertex with the particular edge;
setting a direction of the next direction vector to a direction of a particular bearing vector stored in the selection history information in the memory which corresponds to the second next direction, wherein the particular bearing vector defines the second next direction relative to the second face component;
determining an angle between the next direction vector and each of one or more face vectors originating from a center of the second face component to a center of each of the one or more candidate face components; and
selecting a third component as the another next component, wherein a face vector corresponding to the third face component forms a smallest angle with the next direction vector among all of the one or more face vectors.

* * * * *